United States Patent [19]
Miyazaki et al.

[11] Patent Number: 5,870,376
[45] Date of Patent: Feb. 9, 1999

[54] DISK CLAMPING DEVICE FOR CLAMPING A DISK HAVING A CENTER HOLE

[75] Inventors: Benichi Miyazaki, Katano; Norikatsu Yoshida, Kadoma; Yoshikazu Goto, Hirakata, all of Japan

[73] Assignee: Matsushita Electric Industrial Co., Ltd., Osaka, Japan

[21] Appl. No.: 687,831

[22] Filed: Jul. 26, 1996

Related U.S. Application Data

[60] Continuation of Ser. No. 471,478, Jun. 6, 1995, abandoned, which is a division of Ser. No. 295,288, Aug. 24, 1994, abandoned.

[30] Foreign Application Priority Data

Aug. 24, 1993 [JP] Japan ................................ 5-209322

[51] Int. Cl.⁶ ........................................................ G11B 3/70
[52] U.S. Cl. ............................................................ 369/291
[58] Field of Search .................................. 369/291, 271, 369/270, 75.2, 77.1, 192, 77.2; 360/98.08, 99.12

[56] References Cited

U.S. PATENT DOCUMENTS

| | | | |
|---|---|---|---|
| 4,853,924 | 8/1989 | Takahashi et al. | 369/270 |
| 4,951,277 | 8/1990 | Masunaga et al. | 369/270 |
| 5,054,015 | 10/1991 | Tsukihashi et al. | 360/98.08 |
| 5,208,798 | 5/1993 | Funabashi et al. | 369/270 |
| 5,301,176 | 4/1994 | Kawachi et al. | 369/75.2 |

FOREIGN PATENT DOCUMENTS

| | | | |
|---|---|---|---|
| 240237 | 10/1987 | European Pat. Off. | 369/270 |
| 59-33682 | 2/1984 | Japan | 360/99.12 |
| 62-271244 | 11/1987 | Japan | 369/271 |
| 4 60946 | 2/1992 | Japan | 369/270 |

*Primary Examiner*—Allen T. Cao
*Attorney, Agent, or Firm*—Ratner & Prestia

[57] ABSTRACT

A tray is supported movably relative to a case to enable a second disk to be loaded into and unloaded from a second-disk holding recess. Positioning is performed by using second positioning holes formed through the case and tray. A turntable and a head are inserted through two second opening holes. A second-disk cartridge of thin construction, capable of holding therein the second disk in removable fashion, can be mounted in a recording/reproducing apparatus capable of mounting therein a first-disk cartridge.

5 Claims, 47 Drawing Sheets

FIG. 32
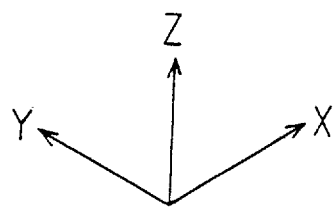
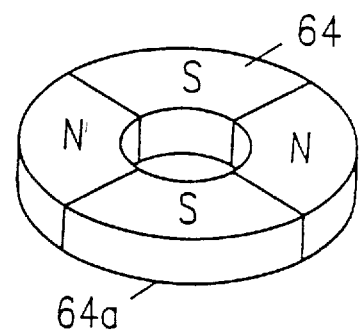
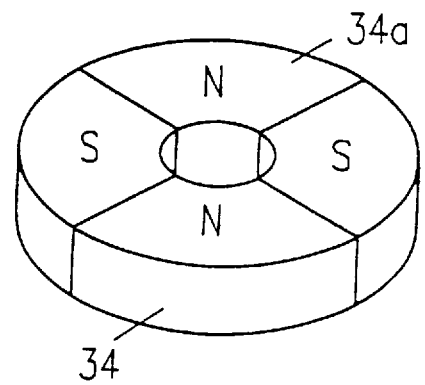

FIG.38
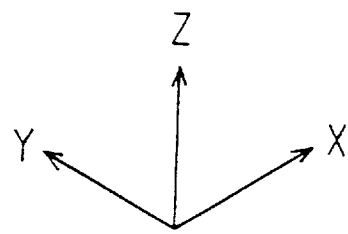
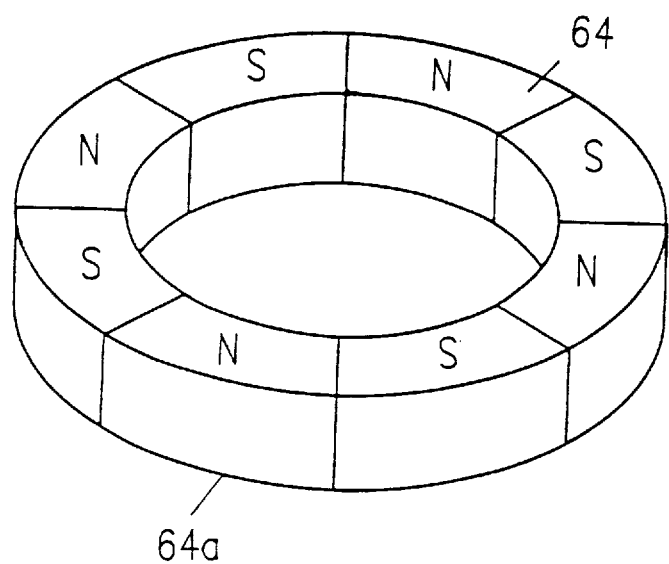
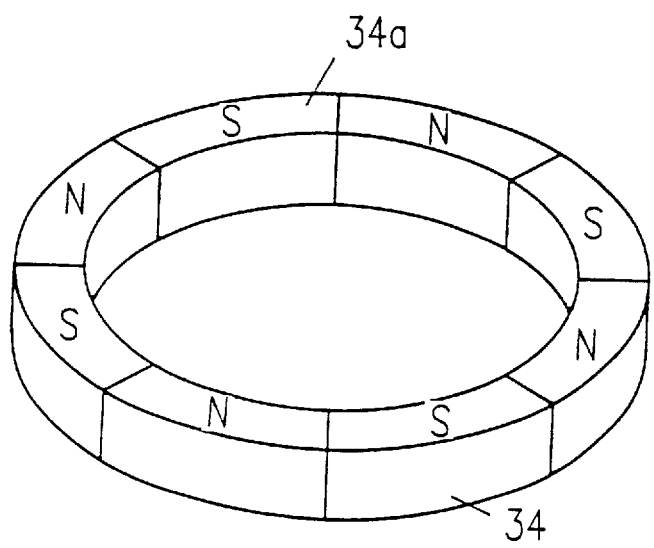

DISK CLAMPING DEVICE FOR CLAMPING A DISK HAVING A CENTER HOLE

This application is a continuation of application Ser. No. 08/471,478 filed Jun. 6, 1995 which is a division of Ser. No. 08/295,288, filed Aug. 24, 1994, now both abandoned.

BACKGROUND OF THE INVENTION

1. Field of the Invention

The present invention relates to a disk cartridge for holding therein a disk used in a recording or reproducing apparatus for recording and reproducing business-application graphics files, computer data files, etc., or in a playback-only CD player or the like, and also relates to a disk clamping device for clamping such a disk. More particularly, the invention relates to a disk cartridge with a sliding cover, which, with a disk contained therein, is loaded into a recording or reproducing apparatus designed for use with such a cartridge, and also relates to a disk clamping device capable of clamping a disk regardless of whether the disk has a hub or not.

2. Description of the Related Art

Generally, conventional disks having a center hole therein, exemplified in particular by compact disks and laser disks, are inserted into recording or reproducing apparatus (hereinafter simply referred to as recording/reproducing apparatus) without using a protective case (such disks are hereinafter generally called the second disk). The second disk is therefore susceptible to damage due to dust, fingerprints, etc., which may make the recorded information unable to be read out. The second disk has the further disadvantage that it is not easy to handle when loading it into a recording/reproducing apparatus. Furthermore, since the second disk has a center hole only (hereinafter called the second center hole) that can be used for mounting, the recording/reproducing apparatus needs to be equipped with a disk clamping device for clamping the second disk in place. This not only makes the construction of the recording/reproducing apparatus complex, but increases the height of the construction.

In view of these problems, disks for newly developed and commercialized recording/reproducing apparatus (such disks are hereinafter generally called the first disk) are encased in disk cartridges (hereinafter called the first-disk cartridge) to prevent damage due to dust, fingerprints, etc. and to enhance the ease of handling. The first disk has a center hub made of magnetic metal; this serves to simplify the construction and reduce the height of the recording/reproducing apparatus. The center hole of the hub (thereinafter called the first center hole) is made to engage on the motor shaft that drives the turntable provided in the recording/reproducing apparatus, and the hub is attracted by a magnet fixed to the turntable, to clamp the first disk in place.

However, the second disk and the recording/reproducing apparatus designed for use with it have already established a large market, for example, in the form of CD players and laser disk players, and as data storage media for business-application graphics files, computer data files, etc. Therefore, in developing and commercializing new recording/reproducing apparatus having increased performance such as higher recording density, preserving compatibility with the second disk in reproduction or in both recording and reproduction becomes a major design consideration. To achieve this, the recording/reproducing apparatus needs to be designed so that the second disk, as well as the first disk encased in the first-disk cartridge, can be mounted and positioned in place.

The following three constructions, for example, are known in the prior art for enabling the second disk to be recorded or reproduced using the same apparatus designed for the first disk.

(1) In Japanese Laid-Open Patent Publication No. 4-362560 (the first prior art), a recording/reproducing apparatus is described that uses two different loading mechanisms, one for loading the second disk into a prescribed position and the other for loading the first-disk cartridge containing the first disk into a prescribed position.

(2) In Japanese Laid-Open Patent Publication No. 4-356766 (the second prior art), a second-disk cartridge is proposed that uses an adapter hub designed to be compatible with the hub of the first disk in loading and unloading; this adapter hub is manually attached to the second disk which is then loaded removably into the second-disk cartridge. According to the construction of the second prior art, either type of disk, the first disk with a hub or the second disk without a hub, can be mounted properly on the turntable in the recording/reproducing apparatus.

(3) In Japanese Utility Model Publication No. 3-25336 (the third prior art), there is proposed a second-disk holding device called a disk holder, not a disk cartridge, that is capable of removably holding the second disk, the construction being such that the second disk held in the holder is delivered onto the turntable when the holder case is loaded into a recording/reproducing apparatus. The holder case consists essentially of a first moving member, which is mounted directly onto a mounting part in a recording/reproducing apparatus, and a second moving member movable relative to the first moving member. In this disk holder, a tray on which the second disk is directly mounted, and which has an opening hole (hereinafter called the second opening hole) that permits the insertion therethrough of the turntable and head of the recording/reproducing apparatus, is installed, for example, in rotatable fashion, to the second moving member. When playing back the second disk, for example, the tray holding the second disk thereon is moved to the turntable of the recording/reproducing apparatus for reproduction, etc. This disk holder is so designed as to preserve mounting compatibility with a disk holder having, for example, six trays similar in construction to the above-described tray, and capable of holding a plurality of second disks, each tray being arranged, for example, in rotatable fashion in the case that is mounted on the mounting part in the recording/reproducing apparatus.

The above prior art constructions, however, have the following problems.

(1) In the first prior art, the recording/reproducing apparatus needs to be equipped with two loading mechanisms, one for loading the second disk and the other for loading the first disk. Furthermore, the first prior art requires that a disk clamping device for clamping the second disk from both sides thereof be provided in the recording/reproducing apparatus at a position opposite the turntable. This makes the construction of the recording/reproducing apparatus complex, and increases the size and cost of the apparatus.

In recent years, the demand for a built-in type recording/reproducing apparatus has been increasing rapidly for use in portable personal computers or the like, and with this trend, reducing the apparatus height has become an important design consideration. The first prior art, however, requires the provision of a disk clamping device, which tends to increase the height of the recording/reproducing apparatus, and hence has the problem of being unable to reduce the apparatus height.

(2) In the second prior art, no mention is made of how the mounting compatibility can be achieved between the second-disk cartridge capable of removably holding the second disk and the first-disk cartridge containing the first disk. For example, no description is given of how the positioning means, opening means for an externally exposed shutter, etc. can be designed compatible between the first-disk and second-disk cartridges.

Also, in the second prior art, the second-disk cartridge ejected from the recording/reproducing apparatus must be removed from the apparatus and be manually opened to remove the second disk contained therein. Furthermore, the second prior art requires that the adapter hub having mounting compatibility with the hub of the first disk be manually attached to the second disk. As a result, the user may have to spend much time trying to attach the hub properly, or may not be able to attach it because he has not acquired enough skill to do so. Thus the second prior art has the problem that the convenience of operation is greatly sacrificed.

(3) In the third prior art, the holder case is not provided with an opening hole that is exposed to the exterior thereof and that permits the insertion therethrough of the turntable and head of the recording/reproducing apparatus. The third prior art therefore has the problem that unlike a disk cartridge, the second disk as contained in the case cannot be directly placed in the recording or reproduction position for recording or reproduction.

In the disk holder of the third prior art, a spring or-like component, as a driving means for moving the second moving member relative to the first moving member, is installed between the first and second moving members, while the tray capable of directly holding the second disk thereon is attached rotatably to the second moving member. This essentially requires a relatively large number of component parts arranged in the height direction of the disk holder. Furthermore, the disk holder, though designed to accommodate one second disk, is constructed to have approximately the same size as the disk holder capable of containing a plurality of second disks, in order to achieve mounting compatibility between them. The third prior art therefore has the problem that the height of the disk holder cannot be reduced because of its construction.

Generally, to save the storing space when not in use, and to provide the convenience of portability, it is desirable that the disk cartridge height be reduced as much as possible while securing a sufficient space to allow the disk to rotate therein when the cartridge is mounted and positioned in the recording/reproducing apparatus. For example, for disks about 120 mm in diameter, the cartridge height usually is reduced to 10 mm or less. In the third prior art, however, in addition to the first and second moving members, such component parts as a spring and tray are placed one on top of another across the height of the disk holder, as described above. The third prior art therefore has the problem that it is extremely difficult to reduce the cartridge height to an optimum value, e.g. 10 mm or less for disks about 120 mm in diameter.

The third prior art has the further problem that unlike disk cartridges, the second disk as contained in the disk holder cannot be directly placed in the recording or reproduction position for recording or reproduction.

Furthermore, the following problem generally exists for the first-disk or second-disk clamping.

The recent trend in design is to reduce the diameter of the turntable to increase the recording area near the disk center and thereby provide larger recording capacity. This, however, reduces the size of the magnet built into the turntable and decreases the clamping force; the resulting problem is that the second disk, etc. cannot be clamped firmly on the turntable, causing disk slippage, and leading to trouble.

SUMMARY OF THE INVENTION

The second-disk cartridge of this invention is for use in a recording or reproducing apparatus capable of mounting and positioning therein a first-disk cartridge in which a first disk is rotatably held in a first-disk holding recess formed in a first casing, and for holding therein a second disk having an outer diameter equal to or smaller than an outer diameter of said first disk. The second-disk cartridge comprises: a second casing having a second-disk holding recess for holding rotatably said second disk, and capable of being set in either of first and second positions, the first position that allows loading and unloading of said second disk with respect to said second-disk holding recess, and the second position that allows mounting and positioning of said second disk with respect to said recording or reproducing apparatus; second positioning means formed at least on one side face of said second casing set in said second position, and identical in form to first positioning means for mounting and positioning said first-disk cartridge in said recording or reproducing apparatus; and a second opening hole formed corresponding to a first opening hole formed in said first casing for permitting inserting therethrough of a head and a turntable of said recording or reproducing apparatus, a size of said second opening hole being the same as said first opening hole or larger than said first opening inclusive.

In one embodiment of the invention, said second casing comprises a case having a second sub-opening hole of a size not smaller than the size of said second opening hole, and having therein a tray holding recess, and a tray having said second-disk holding recess formed therein, and having another second sub-opening hole for exposure to exterior thereof through the first-said second sub-opening hole in said second position, said tray being supported in said tray holding recess movably in directions parallel to direction of insertion into said recording or reproducing apparatus. Said second casing is set either in said first position or in said second position by moving said tray in the directions parallel to the direction of insertion into said recording or reproducing apparatus.

In another embodiment of the invention, the disk cartridge further comprises: a locking means for locking said tray in said second position; and driving means for driving said tray into said first position in interlocking fashion with an unlocking action of said locking means.

In still another embodiment of the invention, at least a portion of said case is formed from a metal plate.

In still another embodiment of the invention, the disk cartridge further comprises: centering means, supported rotatably in said second casing at a position opposite said turntable of said recording or reproducing apparatus, for concentrically engaging a second center hole formed in said second disk onto a motor shaft that drives said turntable for rotation; and a magnetic member, formed from a magnetic material, fixed to said centering means and attracted by a magnet provided in said turntable, wherein said centering means and said magnetic member do not protrude beyond an externally exposed surface of said second casing.

In still another embodiment of the invention, said centering means includes a clamp base supported rotatably in said second casing at a position opposite said turntable of said recording or reproducing apparatus, and an elastic member, fixed to said clamp base and capable of elastic deformation in a thickness direction of said second disk, for holding said second disk against said turntable, and at least one of said clamp base and said magnetic member is provided with a centering part that engages in said second center hole of said second disk, and a center hole that is formed concentrically with said centering part and that engages concentrically on said motor shaft.

Alternately, the second-disk cartridge for holding therein a second disk of the invention, comprises: a case having a second sub-opening hole for permitting insertion therethrough of a head and a turntable of a recording or reproducing apparatus, and having therein a tray holding recess, and a tray having a second-disk holding recess for holding rotatably said second disk, said tray being supported in said tray holding recess and movable in directions parallel to a direction of insertion into said recording or reproducing apparatus to enable setting in either of first and second positions, the first position that allows loading and unloading of said second disk with respect to said second-disk holding recess, and the second position that allows mounting and positioning of said second disk with respect to said recording or reproducing apparatus, said tray further including another second sub-opening hole for exposure to exterior thereof through the first-said second sub-opening hole in said second position. At least one of said case and said tray is provided with second positioning means for achieving positioning thereof for mounting in said recording or reproducing apparatus.

In one embodiment of the invention, the disk cartridge further comprises: a locking means for locking said tray in said second position; and driving means for driving said tray into said first position in interlocking fashion with an unlocking action of said locking means.

In another embodiment of the invention, the disk cartridge further comprises: centering means, supported rotatably in said case at a position opposite said turntable of said recording or reproducing apparatus, for concentrically engaging a second center hole formed in said second disk onto a motor shaft that drives said turntable for rotation; and a magnetic member, formed from a magnetic material, fixed to said centering means and attracted by a magnet provided in said turntable, wherein said centering means and said magnetic member do not protrude beyond an externally exposed surface of said case.

In still another embodiment of the invention, said centering means includes a clamp base supported rotatably in said case at a position opposite said turntable of said recording or reproducing apparatus, and an elastic member, fixed to said clamp base and capable of elastic deformation in a thickness direction of said second disk, for holding said second disk against said turntable, and at least one of said clamp base and said magnetic member is provided with a centering part that engages in said second center hole of said second disk, and a center hole that is formed concentrically with said centering part and that engages concentrically on said motor shaft.

In still another embodiment of the invention, at least a portion of said case is formed from a metal plate.

According to another aspect of the invention, the disk clamping device for enabling a second disk with a second center hole to be mounted on a turntable of a recording or reproducing apparatus capable of mounting thereon a first disk with a hub formed from a magnetic material and having a first center hole smaller than said second center hole, comprises: a clamp base supported rotatably at a position opposite said turntable; an elastic member, fixed to said clamp base, for holding said second disk against said turntable; and a magnetic member, formed from a magnetic material, fixed to said clamp base and attracted by a magnet provided in said turntable to attract said hub. At least one of said clamp base and said magnetic member is provided with a centering part that engages in said second center hole of said second disk, and a center hole that is formed concentrically with said centering part and that engages concentrically on a motor shaft that drives said turntable for rotation.

According to another aspect of the invention, the disk clamping device for enabling a second disk to be mounted on a turntable of a recording or reproducing apparatus having a magnet that consists of two or an even number of regions greater than two, adjacent regions being magnetized in opposite directions, said disk clamping device comprises: a clamp base, supported rotatably at a position opposite said turntable, for holding said second disk against said turntable; a magnetic member having a permanent magnet that is fixed to said clamp base and opposite said magnet, and consists of the same number of regions as the even number of regions of said magnet, adjacent regions being magnetized in opposite directions.

In one embodiment of the invention, the disk clamping device further comprises an elastic member fixed to said clamp base and capable of elastic deformation in a thickness direction of said second disk, wherein at least one of said clamp base and said magnetic member is provided with a centering part that engages in a second center hole formed in said second disk, and a center hole that is formed concentrically with said centering part and that engages concentrically on a motor shaft that drives said turntable for rotation.

Thus, the invention described herein makes possible the advantages of (1) providing a second-disk cartridge which enables a second disk to be mounted and positioned in a recording/reproducing apparatus capable of mounting and positioning therein a first-disk cartridge containing a first disk, and which is as thin as the first-disk cartridge and is capable of holding the second disk in removable fashion, without increasing the structural complexity and the size and cost of the recording/reproducing apparatus; (2) providing an second-disk cartridge which enables a second disk as contained in the case to be mounted directly into recording or reproduction position in a recording/reproducing apparatus, and which is as thin as a first-disk cartridge and is easy to handle, the second disk being able to be loaded in or unloaded from the second-disk cartridge not only by manual operation but in interlocking fashion with an eject action of the recording/reproducing apparatus; (3) providing, in addition to the feature described in above (2), a second-disk cartridge which can be automatically set into position to allow the loading and unloading of the second disk, just by pushing either manually or using a pin or the like provided in the recording/reproducing apparatus a locking unit that locks the casing into the retracted position to allow the mounting and positioning of the second disk in the recording/reproducing apparatus, and which enhances the ease of operation and permits further simplification of the construction of the recording/reproducing apparatus; (4) providing a disk cartridge having a disk clamping device which is capable of automatically centering and clamping a second disk with no hub onto the turntable of a recording/reproducing apparatus, and allows a reduction in the height of the recording/reproducing apparatus, without increasing the structural complexity, cost, etc. of the recording/ reproducing apparatus; (5) providing a disk clamping device which is capable of automatically centering and clamping a second disk with no hub onto the turntable of a recording/reproducing apparatus capable of clamping a first disk with a hub by magnetic attraction; and (6) providing a disk clamping device which is capable of centering a second disk while increasing the clamping force to clamp the second disk, without increasing the size of the turntable, etc.

These and other advantages of the present invention will become apparent to those skilled in the art upon reading and understanding the following detailed description with reference to the accompanying figures.

BRIEF DESCRIPTION OF THE DRAWINGS

FIG. 32 is a perspective view showing a magnet and a magnetic member in Example 4.

FIG. 38 is a perspective view showing a magnet and a magnetic member in Example 6.

DESCRIPTION OF THE PREFERRED EMBODIMENTS

The preferred examples of the present invention will be described below with reference to the accompanying drawings.

EXAMPLE 1

A disk cartridge and a disk clamping device according to Example 1 of the invention will be described with reference to FIGS. 1 to 27. The present example concerns a construction that enables a second disk to be mounted and positioned in a recording/reproducing apparatus in which a first-disk cartridge containing a first disk can be mounted and positioned, and provides a second-disk cartridge which is as thin as a first-disk cartridge and is capable of holding a second disk in removable fashion.

(1) First-disk cartridge

Figure 1:
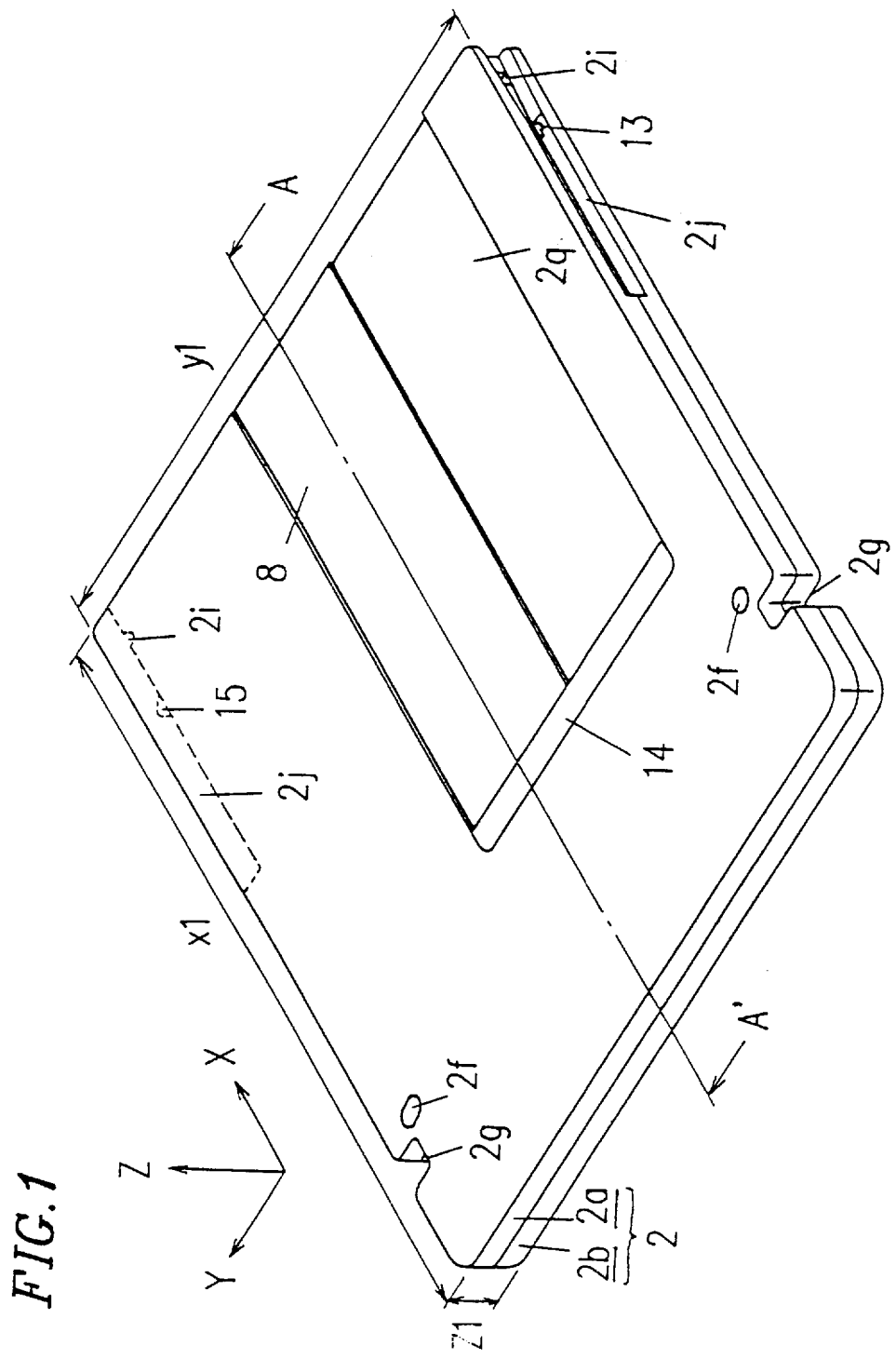
FIG. 1 is a perspective view of a first-disk cartridge according to Example 1 of the invention, showing a condition in which the first-disk cartridge is not mounted in a recording/reproducing apparatus.
Figure 2:
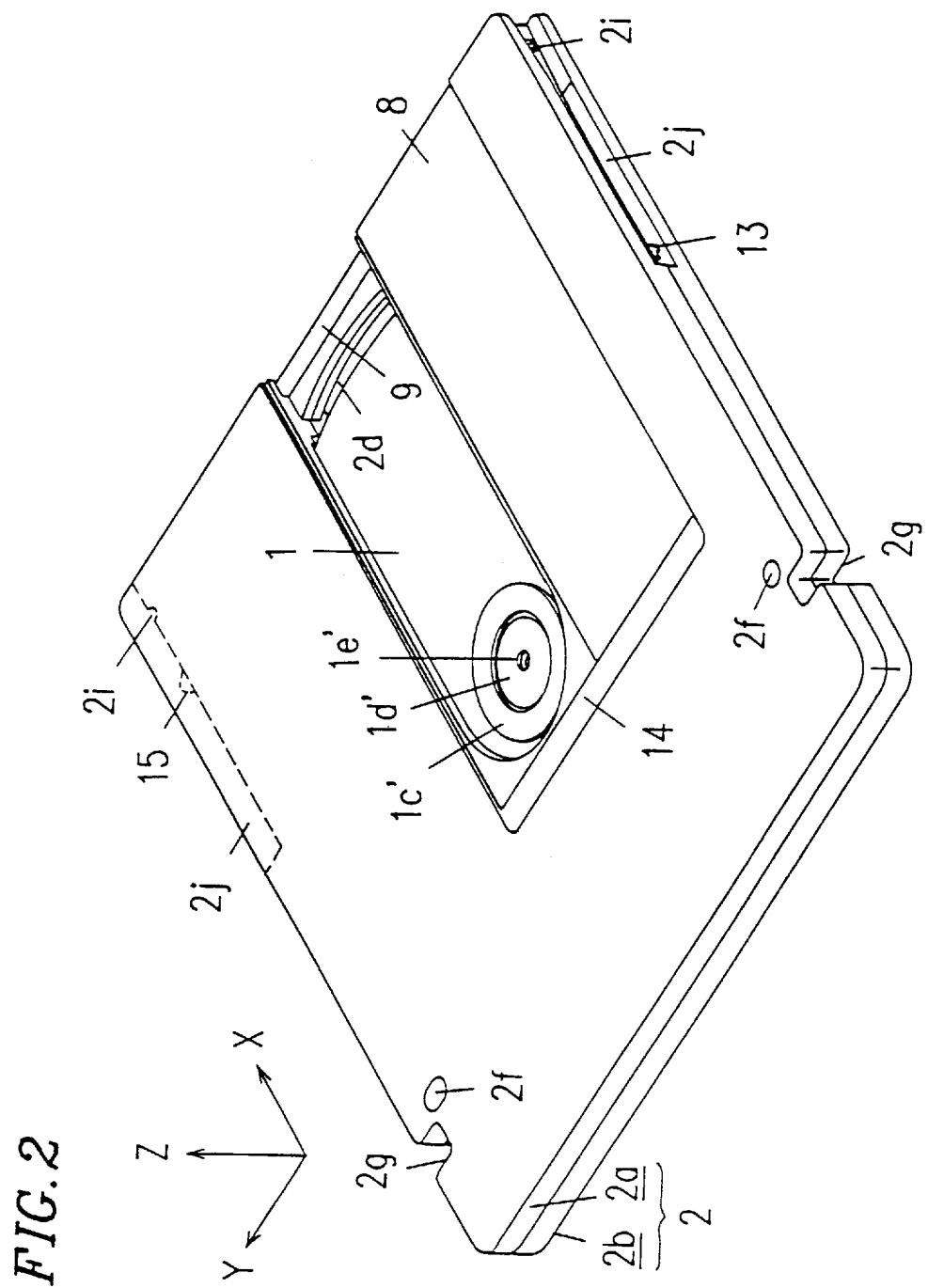
FIG. 2 is a perspective view of the first-disk cartridge according to Example 1, showing the condition in which the first-disk cartridge is mounted and positioned in a recording/reproducing apparatus.
Figure 3:
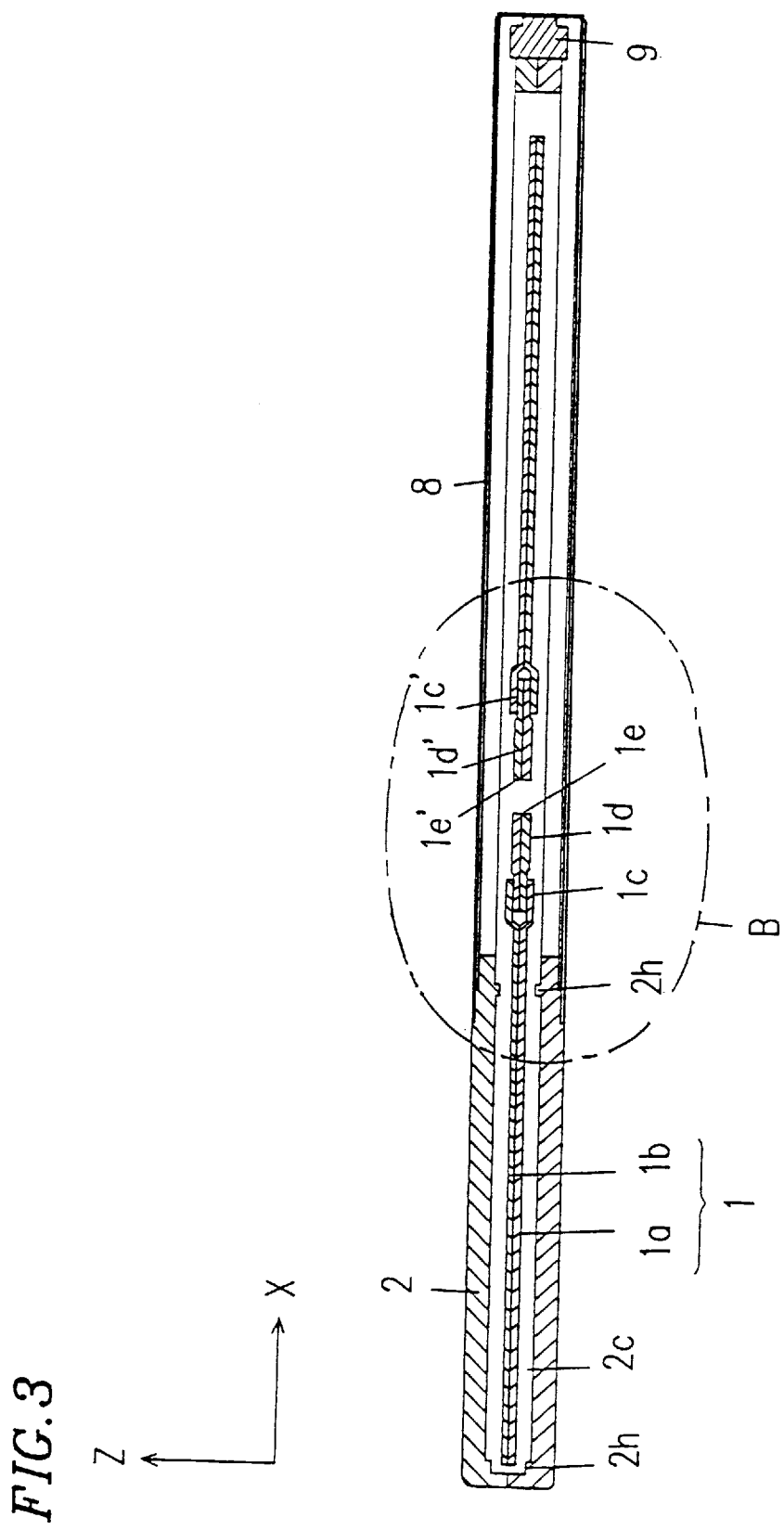
FIG. 3 is a cross-sectional view of the first-disk cartridge of Example 1 taken along line A–A' in FIG. 1.

FIGS. 1 and 2 show perspective views of the first-disk cartridge of Example 1, and FIG. 3 shows a cross section of the same. As shown in FIGS. 2 and 3, a first disk 1 is contained in the first-disk cartridge shown in FIG. 1. The following description deals with the construction of the first disk 1 and of the first-disk cartridge.

First, the first disk 1 will be described. As shown in FIG. 3, the first disk 1 is a double-sided optical disk, about 120 mm in overall diameter, consisting of substrates 1a and 1b, each having a recording surface on the side thereof facing inward, bonded together by UV adhesive or the like. The substrates 1a and 1b are each formed from a colorless, transparent resin or glass. The thickness of the substrates 1a and 1b where the recording surfaces are formed is about 0.6 mm which is half the thickness (about 1.2 mm) of a second disk 51 that will be described later. Mounting faces 1c and 1c', which are to be placed in contact with a turntable surface 32a (FIG. 5) of a turntable 32 in a recording/reproducing apparatus described later, are each formed in a raised shape.

The first disk 1 has hubs 1d, 1d' at its center. The hubs 1d, 1d' are made of magnetic stainless steel and bonded to the substrates 1a and 1b. First center holes 1e, 1e' are opened in the center of the respective hubs 1d, 1d'. The first center holes 1e, 1e' have a diameter (about 3 mm) slightly larger than that of a motor shaft 33 (FIG. 5) to be described later. The first center holes 1e, 1e' therefore fit concentrically onto the motor shaft 33 with good accuracy, and the first disk 1 is mounted onto the turntable 32 by the attraction of a magnet 34 to be described later. The hubs 1d, 1d' are bonded, using a microscope or the like, so that the first center holes 1e, 1e' are concentric with the spiral-shaped or concentric information tracks formed on the recording surfaces of the substrates 1a, 1b. The construction is such that when the first disk 1 is mounted on the turntable 32, the motor shaft 33 contacts only one first center hole (the first center hole 1e in FIG. 5) that is nearer to the turntable 32.

Figure 5:
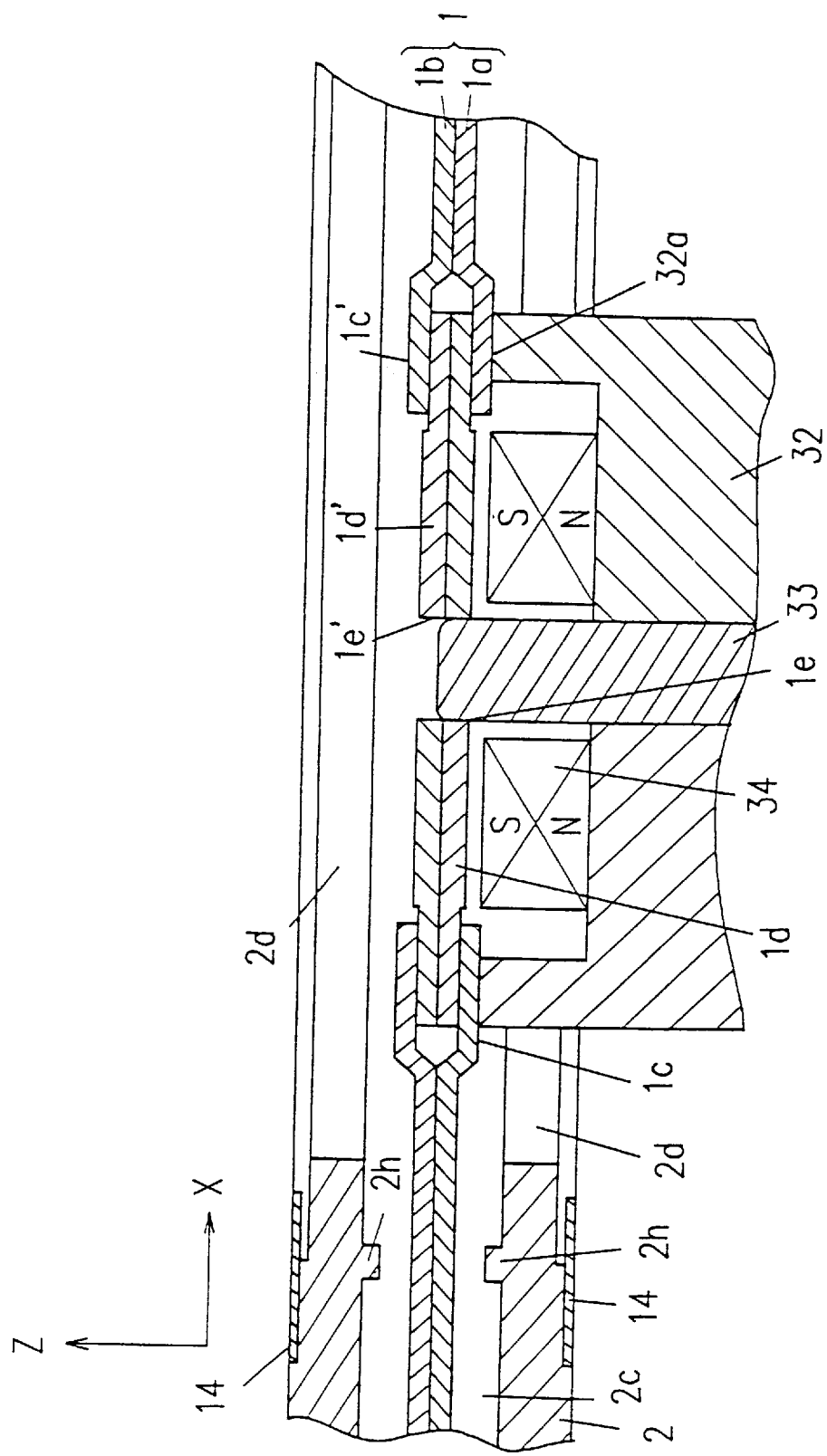
FIG. 5 is an enlarged cross-sectional view showing an essential portion (portion B in FIG. 3) of the first-disk cartridge mounted and positioned in the recording/reproducing apparatus, according to Example 1.

Next, the first-disk cartridge will be described. As shown in FIG. 1, the first-disk cartridge includes a first casing 2. The first casing 2 has a first opening hole 2d, as shown in FIGS. 2 and 5. The first-disk cartridge has a first shutter 8 for opening and closing the first opening hole 2d, as shown in FIGS. 1 and 2. A shutter open/close member 13, connected to the first shutter 8, is operated to open and close the first shutter 8. When the first-disk cartridge is not mounted in the recording/reproducing apparatus, the first shutter 8 is locked in the closed position by means of a shutter locking member 15.

The depth x1, the width y1 and the height z1 of the first-disk cartridge are about 133 mm, about 124 mm and about 8 mm, respectively.

Each component part of the thus constructed first-disk cartridge will be described in detail below.

First, the construction of the first casing 2 will be described. The first casing 2 consists of an upper half 2a and lower half 2b formed from ABS resin. The upper half 2a and lower half 2b are joined together by screws or by heat welding. Inside the first casing 2 is formed a first-disk holding recess 2c capable of holding the first-disk 1, as shown in FIG. 3. When not in use, the first disk 1 is supported on protrusions 2h formed at positions corresponding to the non-data areas around the inner and outer circumferences of the first disk 1. The diameter of the first-disk holding recess 2c is made slightly larger than the outer diameter of the first disk 1, and is set, for example, at about 122 mm. The first opening hole 2d allows the insertion therethrough the turntable 32 and head provided in the recording/reproducing apparatus, as will be described later.

In the upper half 2a and lower half 2b, there are formed a pair of first positioning holes 2f that act as first positioning means, as shown in FIGS. 1 and 2 (the positioning holes in the lower half 2b are not shown). One of the first positioning holes 2f is a round hole, while the other is an elongated hole, in compliance with a known positioning technique. The first positioning holes 2f enable the first casing 2 to be positioned in place when the first-disk cartridge is inserted into the recording/reproducing apparatus.

Furthermore, recesses 2j are formed in respective end portions of +Y and −Y sides of the first casing 2, as shown in FIGS. 1 and 2. Engaging with these recesses 2j, levers (not shown) provided on +Y and −Y sides in the recording/reproducing apparatus are moved in X directions to drive the first shutter locking member 15 and first shutter open/close member 13.

The first-disk cartridge may be constructed to have positioning recesses 2g, as shown in FIGS. 1 and 2. This construction enables the first-disk cartridge to be chucked by an automatic loading device, allowing the use with a so-called stocker type recording/reproducing apparatus. A stocker type recording/reproducing apparatus is a recording/reproducing apparatus of the type in which a plurality of first-disk cartridges are accommodated, each disk cartridge being automatically mounted and ejected. Each of the recesses 2j is provided with a semi-circular positioning recess 2i. These positioning recesses 2i enable the first-disk cartridge to be chucked when inserted into the recording/reproducing apparatus.

Further, the upper half 2a and lower half 2b are each provided with a recess 2q in which the first shutter 8 is mounted slidably along Y directions, as shown in FIG. 1.

Next, the first shutter 8 and its associated parts will be described below. As shown in FIG. 1, when the first-disk cartridge is not mounted in the recording/reproducing apparatus, i.e., when the first-disk cartridge is not in use, the first shutter 8 is set in the closed position by a spring or the like (not shown) to close the first opening hole 2d. The first shutter 8 is secured to a first-shutter guide 9 by screws or other means, and is mounted in the first casing 2 slidably along Y directions. For the first shutter guide 9, a material such as a polyacetal resin is preferable; more specifically, a resin that has a small sliding resistance and high wear and chafing resistance against the mating resin (in this example, the first casing 2 made of ABS resin) is desirable.

The first shutter 8 is connected to the first-shutter open/close member 13 by a belt or the like (not shown). A first-shutter holder 14 is fixed by adhesion or other means to the positioning recess 2q in the first casing 2, as shown in FIGS. 1 and 2. The first-shutter holder 14 holds one end of the first shutter 8 against the recess 2q in the first casing 2, as shown in FIG. 5, to prevent the end of the first shutter 8 from lifting in Z direction.

The first-shutter locking member 15 is movable in Y directions, as shown in FIGS. 1 and 2, and is urged toward the +Y side by a spring or the like (not shown) so as to protrude into the recess 2j. In this condition, the first-shutter locking member 15 engages with an engaging portion (not shown) of the first-shutter guide 9. The first-shutter locking member 15 thus locks the first shutter 8 in position.

The first disk 1 can be mounted on the turntable 32 whether the first-disk cartridge is inserted with the substrate 1a (i.e., the lower half 2b) facing the turntable 32 or with the substrate 1b (i.e., the upper half 2a) facing the turntable 32.

Figure 4:
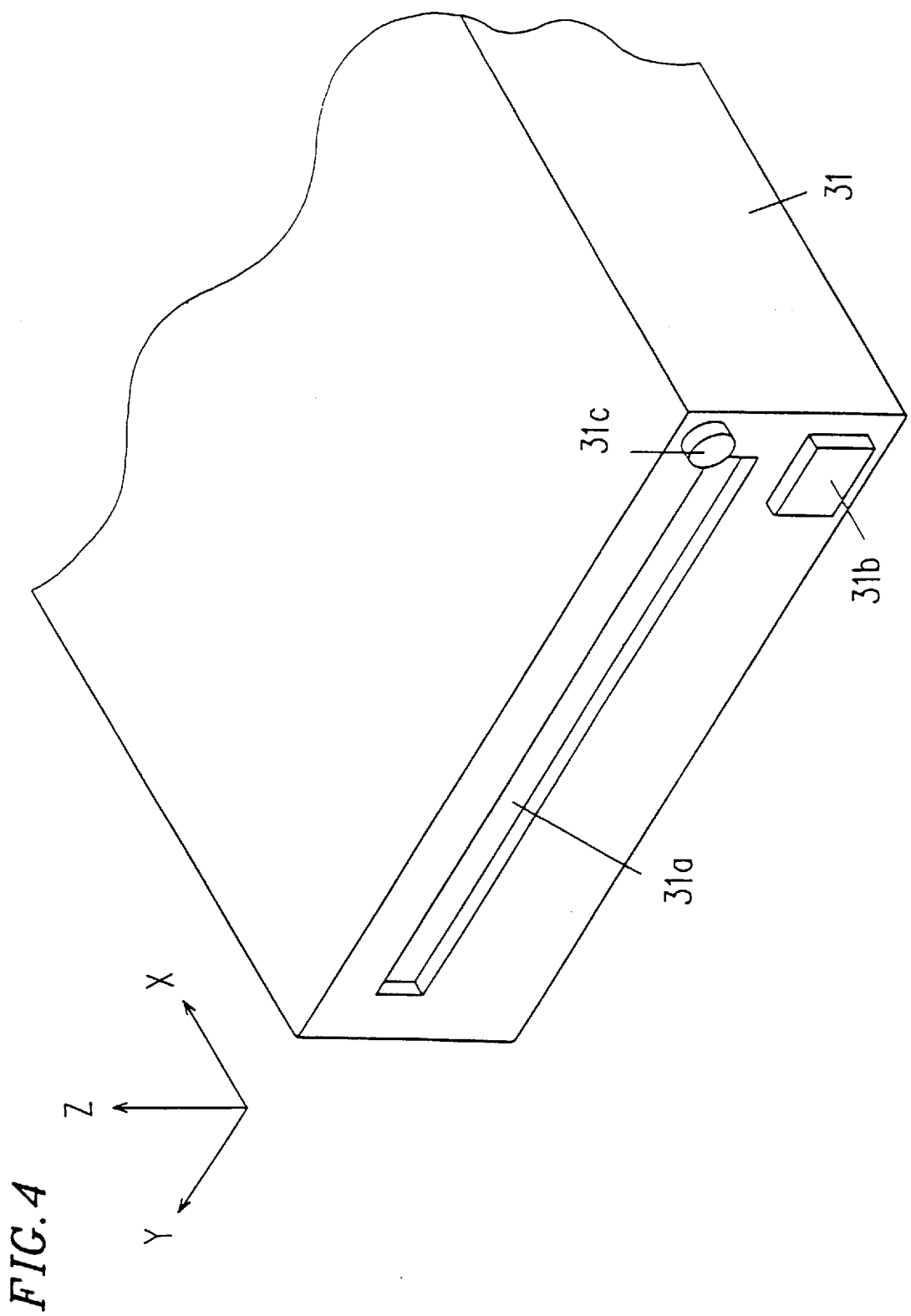
FIG. 4 is a perspective view showing the external appearance of a recording/reproducing apparatus according to Example 1.

FIG. 4 is a perspective view showing a portion of the recording/reproducing apparatus in which the first-disk cartridge is used, and FIG. 5 is a cross-sectional view showing the first-disk cartridge mounted and positioned in the recording/reproducing apparatus. The recording/reproducing apparatus will be described below with reference to FIGS. 4 and 5.

As shown in FIG. 4, an outer housing 31 of the recording/reproducing apparatus has an insertion slot 31a in the front thereof (on the −X side), through which the first-disk cartridge or the second-disk cartridge hereinafter described can be inserted. The recording/reproducing apparatus has two eject buttons 31b and 31c. The eject button 31b is used to eject the first-disk cartridge or eject the second-disk cartridge with its second casing locked in retracted position. The eject button 31c is used to eject the second-disk cartridge with its second casing in extended position. The second-disk cartridge is thus capable of being set in one of two positions, with the second casing in retracted position or in extended position. This operation will be described in detail later.

In this example, the tray eject button 31c is provided in addition to the usual eject button 31b so that the second-disk cartridge can be ejected with the casing either in retracted position or in extended position as desired. Another method may be used. For example, it may be so constructed that using only one eject button 31, the cartridge is ejected with the casing in retracted position when the button is pressed only once, and ejected with the casing in extended position when the button is pressed two or more times.

The recording/reproducing apparatus contains therein the turntable 32, motor shaft 33, and magnet 34 shown in FIG. 5. The turntable 32 is fixed integrally to the motor shaft 33. The turntable 32 is driven to rotate the first disk 1 or the hereinafter described second disk 51 mounted on the turntable surface 32a. The motor shaft 33 has a diameter of about 3 mm, and fits in the first center hole 1e, 1e' of the hub 1d, 1d' of the first disk 1 as well as in a center hole 64a opened through a magnetic member 64 of the second disk 51 to be described later. The magnet 34 is a cylindrically shaped magnet fixed to the turntable 32. The magnet 34 is, for example, divided into four regions 90 degrees apart and magnetized alternately in +Z and −Z directions (i.e., four poles).

The recording/reproducing apparatus further includes a head (not shown) movable in X directions for information recording and reproduction for both the first disk 1 and the second disk 51 whose substrates have different thickness from each other.

The following describes how the thus constructed first-disk cartridge is used with the recording/reproducing apparatus.

First, the operation for loading the first-disk cartridge into the recording/reproducing apparatus will be described.

When the first-disk cartridge, with its −X side held by hand, is inserted in the insertion slot 31a provided in the outer housing 31 of the recording/reproducing apparatus, the positioning recesses 2i formed in the first casing 2 are chucked by holder pins (not shown) of a loading mechanism provided in the recording/reproducing apparatus, and the first-disk cartridge is guided in the +X direction.

As the first casing 2 is moved in the +X direction, the first-shutter locking member 15 is pushed toward the −Y side by a lever (not shown) provided on the +Y side in the recording/reproducing apparatus, and the lock is released. At the same time, the first-shutter open/close member 13 is engaged by a lever (not shown) provided on the −Y side in the recording/reproducing apparatus; as the first casing 2 is moved in the +X direction, the first-shutter open/close member 13 is pushed in the −X direction relative to the first casing 2, as can be seen from FIGS. 1 and 2. As a result, the first shutter 8 is moved in the −Y direction to fully open the first opening hole 2d.

After that, the first-disk cartridge is moved in the −Z direction by the loading mechanism, and using the first positioning holes 2f (not shown) on the −Z side (in the lower half 2b), the first casing 2 is accurately positioned with positioning pins or the like in the recording/reproducing apparatus. At the same time, the turntable 32, etc. of the recording/reproducing apparatus are inserted through the first opening hole 2d, and the first center hole 1e of the hub 1d engages on the motor shaft 33, as shown in FIG. 5. As a result, the mounting face 1c is made to contact with the turntable surface 32a; thus, the first disk 1 is mounted on the turntable 32 concentrically with the motor shaft 33. Further, a head (not shown) is inserted from the −Z side of the first opening hole 2d. With the above operation, the first disk 1 is now set ready for information recording, reproduction, or erasure.

Figure 6:
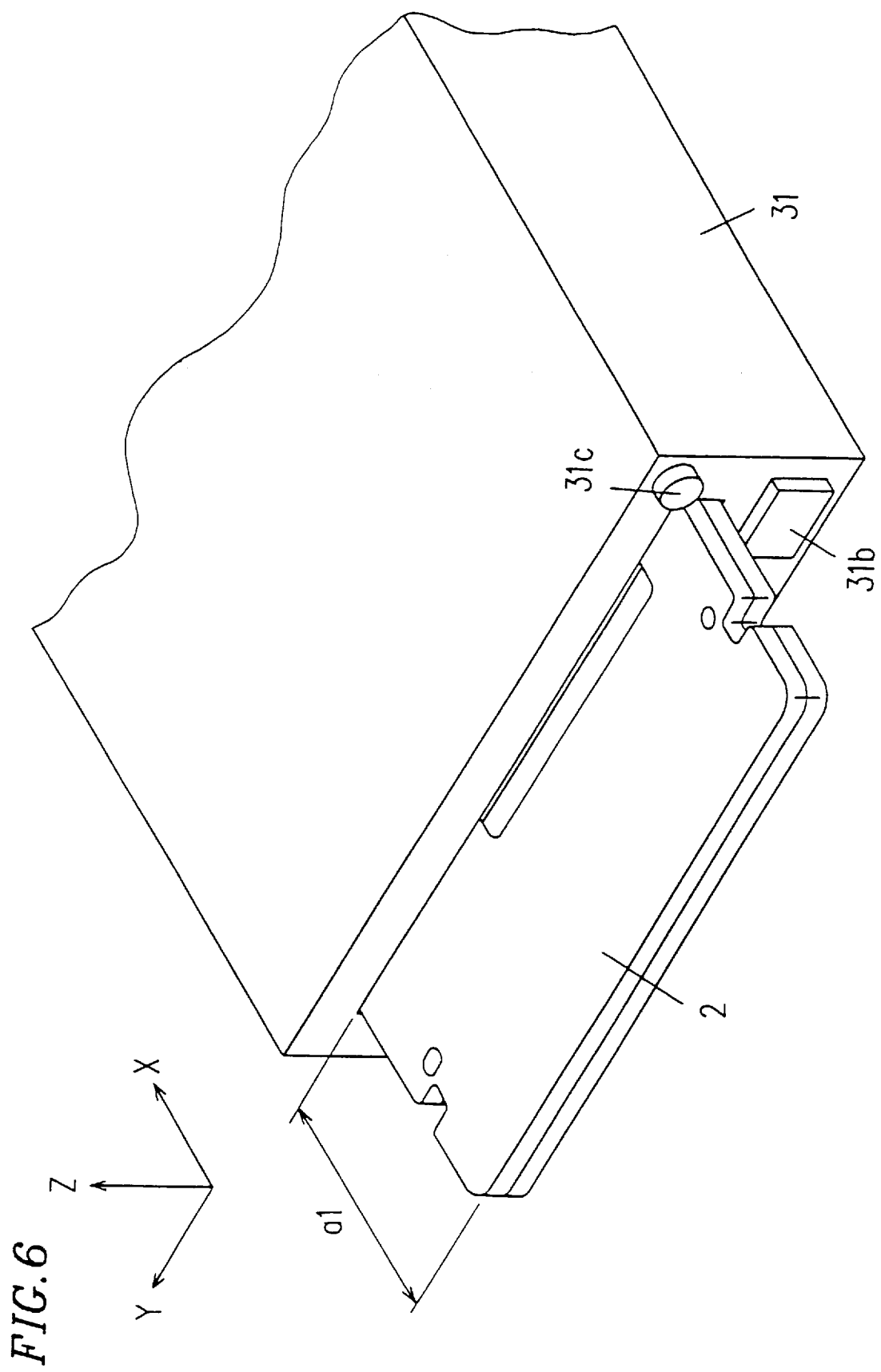
FIG. 6 is a perspective view showing the first-disk cartridge of Example 1 ejected from the recording/reproducing apparatus.

Next, the operation for ejecting the first-disk cartridge from the recording/reproducing apparatus will be described below. FIG. 6 is a perspective view showing the first-disk cartridge ejected from the recording/reproducing apparatus.

When the eject button 31b on the recording/reproducing apparatus is pushed by a finger, the first-disk cartridge is moved by the loading mechanism in the +Z direction, disengaging the first casing 2 from the position set by the first positioning holes 2f on the −Z side. At the same time, the turntable 32, etc. of the recording/reproducing apparatus are disengaged from the first opening hole 2d.

Then, the first-disk cartridge is ejected through the same path that it was loaded, but in the reverse direction. In the ejecting process, the positioning recesses 2i of the first casing 2 are unchucked, and the lever on the recording/reproducing apparatus side is disengaged from the first-shutter open/close member 13. As a result, the first-shutter 8 is moved in the +Y direction by the restoring force of a spring or the like to fully close the first opening hole 2d, while at the same time, the first shutter open/close member 13 is moved in the +X direction. At the same time, the first-shutter locking member 15 engages with the engaging portion of the first-shutter guide 9, thus locking the first shutter 8 in position.

As a result, the first-disk cartridge is guided in the −X direction, and ejected through the insertion slot 31a, as shown in FIG. 6. The dimension al by which the first-disk cartridge is ejected in the −X direction is chosen to be about 50 mm.

In the condition shown in FIG. 6, the first-disk cartridge can be removed from the recording/reproducing apparatus by holding the −X side of the cartridge.

(2) Second-disk cartridge

Figure 7:
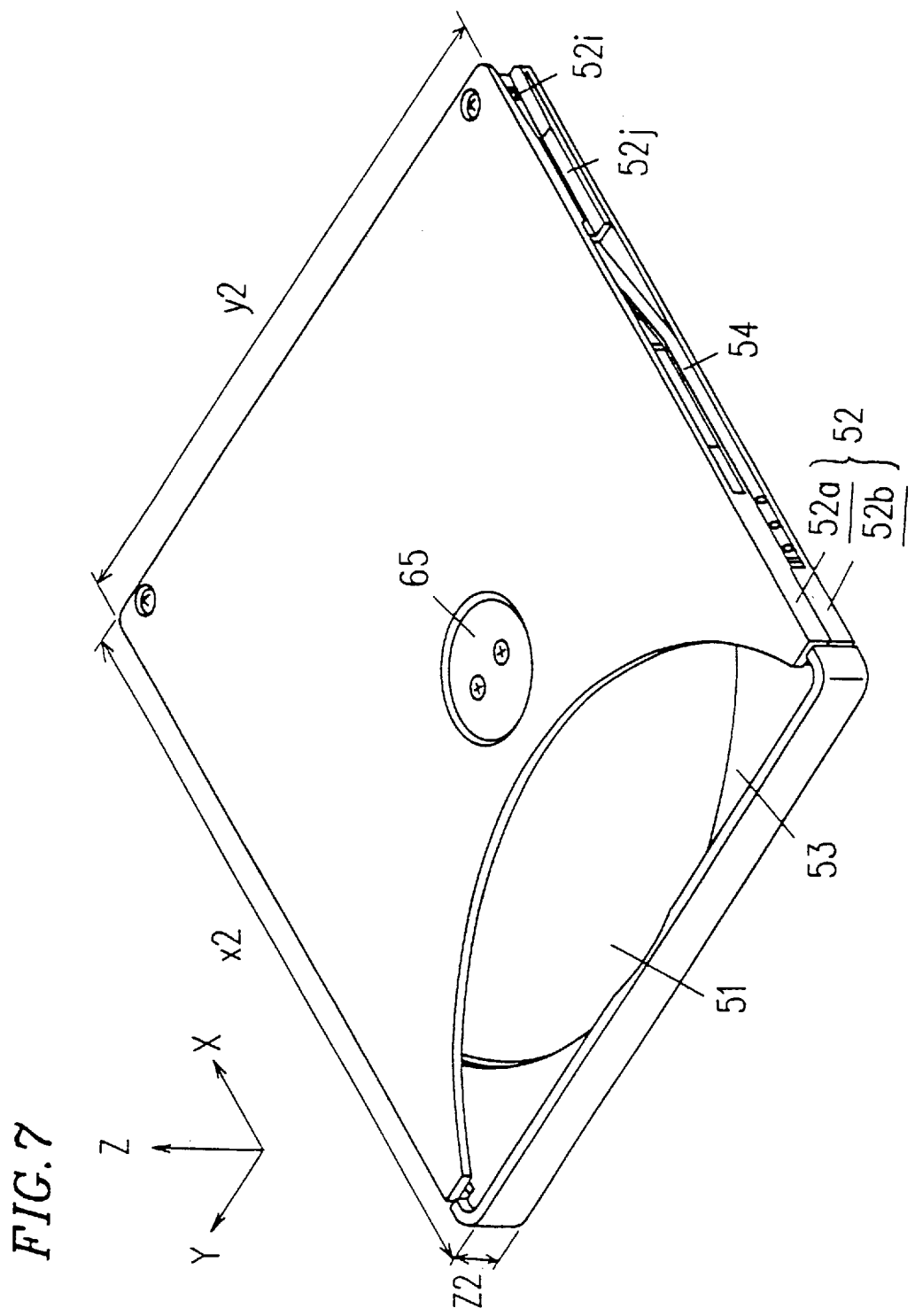
FIG. 7 is a perspective view of a second-disk cartridge, with a tray in a retracted position, according to Example 1.
Figure 8:
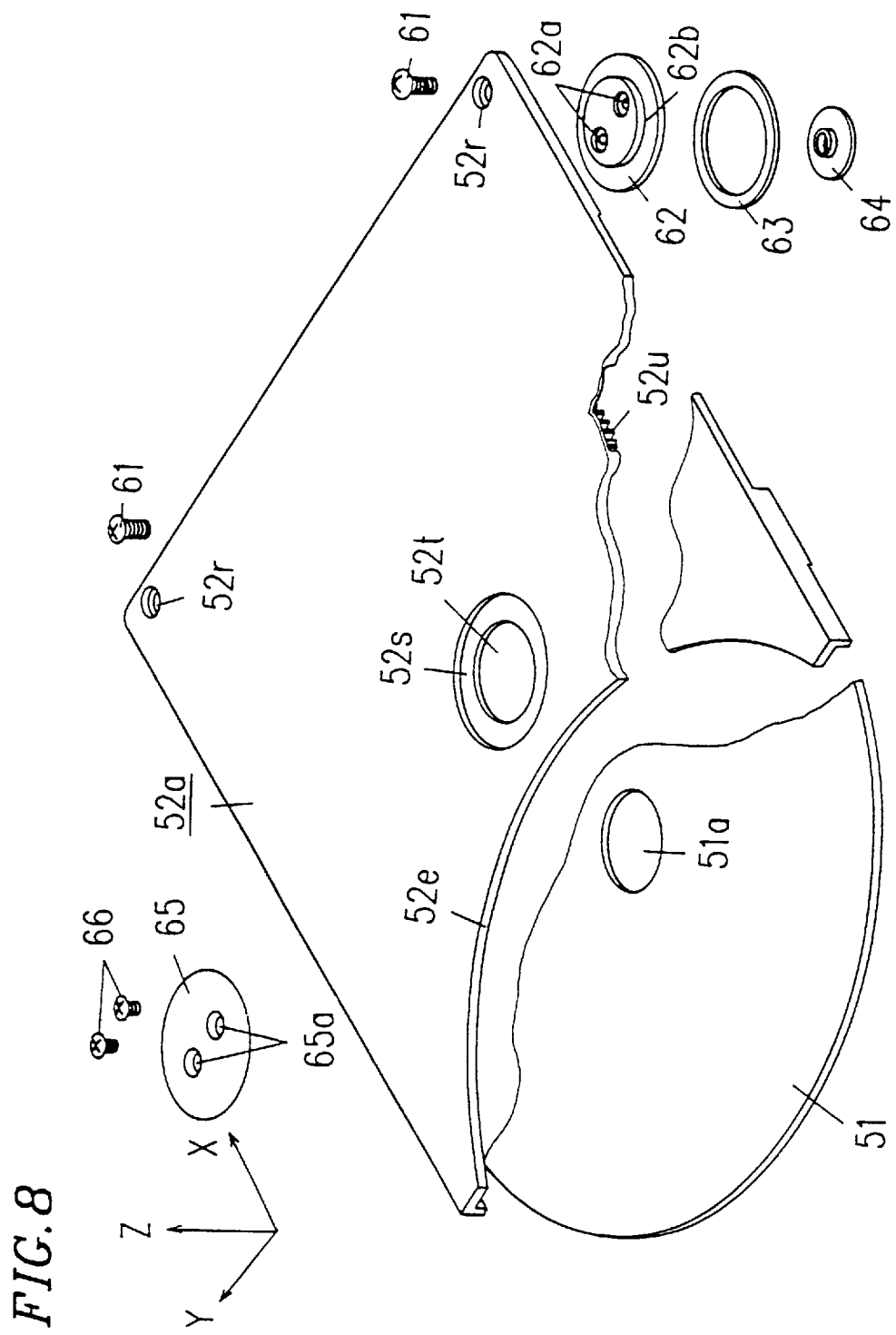
FIG. 8 is an exploded perspective view of a portion of the second-disk cartridge, with some parts broken away, according to Example 1.
Figure 9:
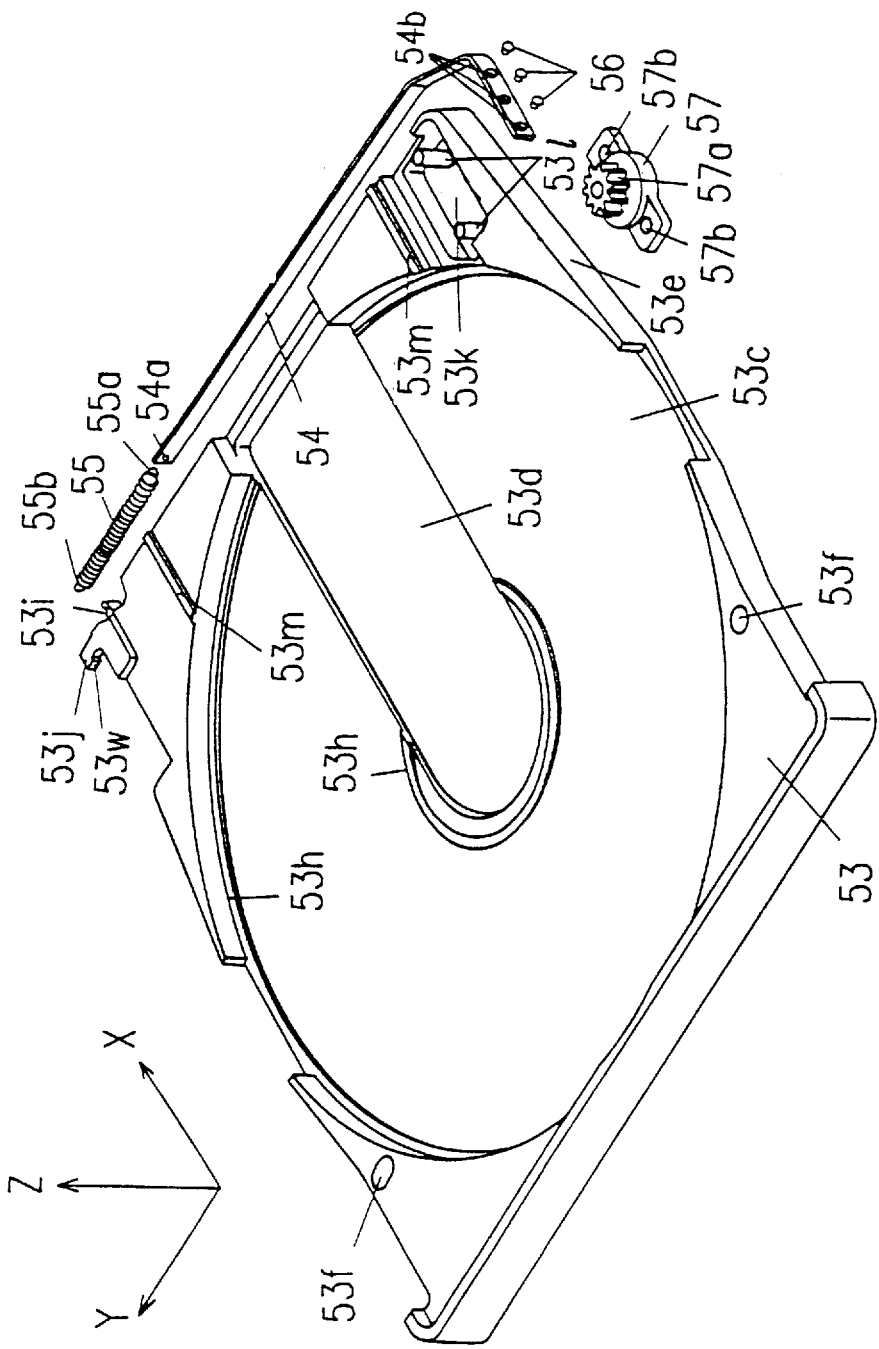
FIG. 9 is a perspective view of a portion of the second-disk cartridge, with some parts broken away, according to Example 1.
Figure 10:
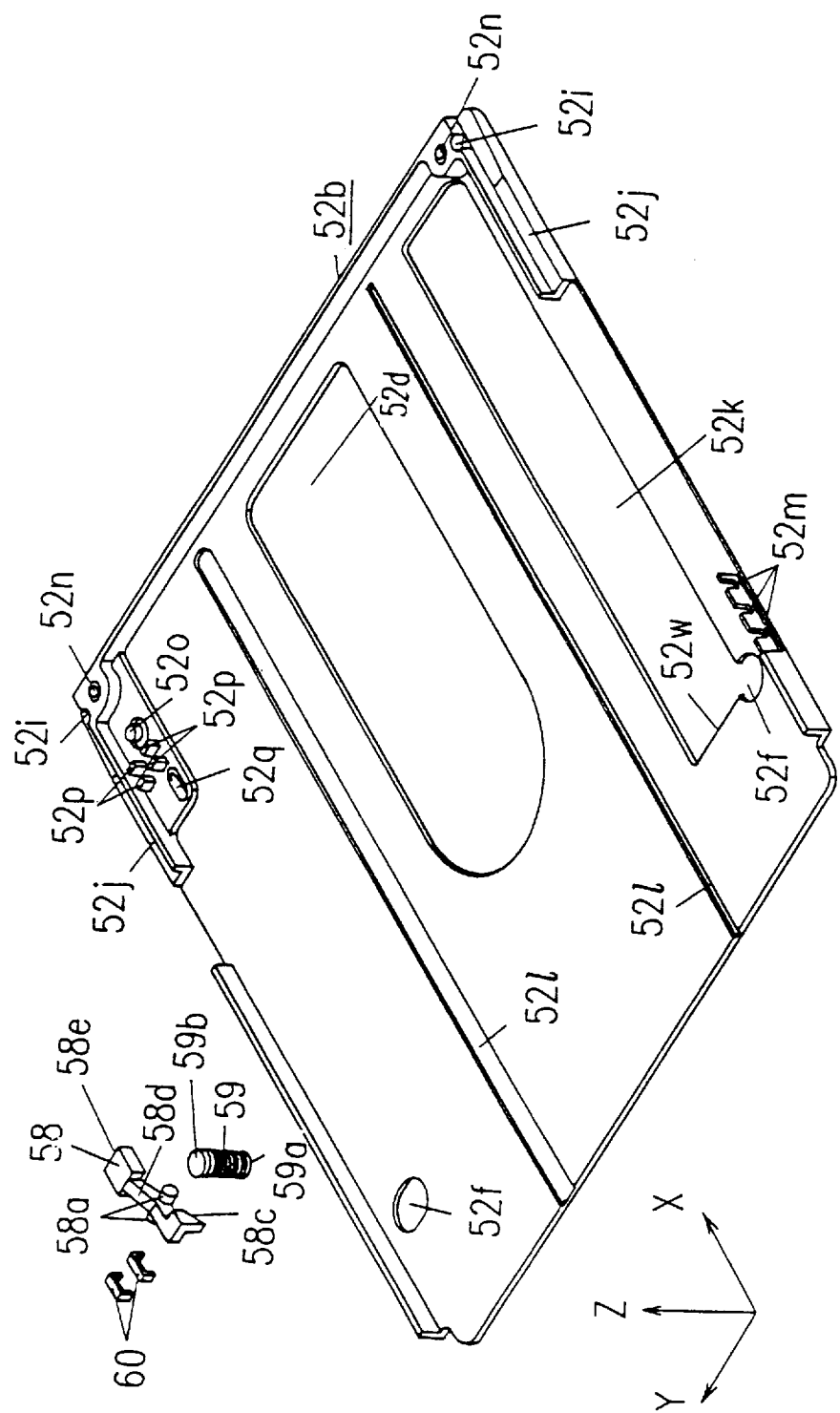
FIG. 10 is a perspective view of a portion of the second-disk cartridge, with some parts broken away, according to Example 1.

FIG. 7 shows a perspective view of a second-disk cartridge according to the present example, and FIGS. 8 to 10 show perspective views of the second-disk cartridge with some parts broken away for clarity. As shown, a second disk 51 is loaded in the second-disk cartridge. The construction and operation of the second disk 51, the second-disk cartridge, and the disk clamping device built into the second-disk cartridge will be described below.

First, the second disk 51 will be described. The second disk 51 is a single-sided optical disk having an overall diameter of about 120 mm, which is the same as that of the first disk 1, and consisting of a single substrate having a recording surface on the +Z side in the figure. A second center hole 51a, about 15 mm in diameter, is formed in the center of the second disk 51, as shown in FIG. 8. The substrate forming the second disk 51 is made of colorless, transparent resin or glass, and has a thickness of about 1.2 mm. The second center hole 51a is formed by molding, for example, such that it is concentric with the spiral-shaped track or concentric tracks formed on the recording surface.

Next, the second-disk cartridge will be described. As shown in FIG. 7, etc., the second-disk cartridge includes a case 52 and a tray 53. The case 52 and tray 53 together constitute a second casing that forms the outer shape of the second-disk cartridge. The outer dimensions of the second-disk cartridge, i.e., the depth x2, the width y2, and the height z2, are the same as the corresponding dimensions of the first-disk cartridge; that is, the depth x2 is about 133 mm, the width y2 about 124 mm, and the height z2 about 8 mm.

Figure 21:
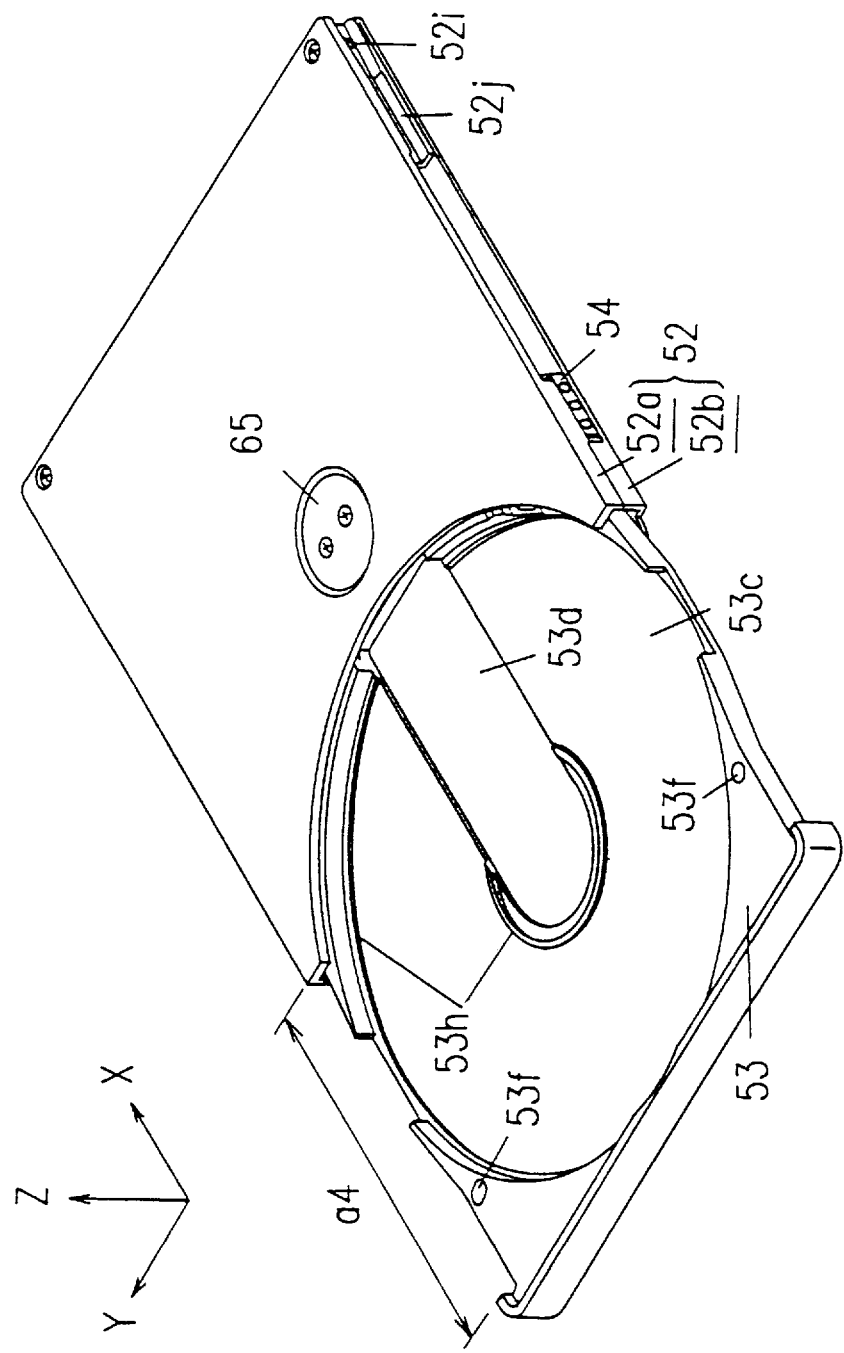
FIG. 21 is a perspective view showing the second-disk cartridge, with the tray in ejected position, according to Example 1.
Figure 22:
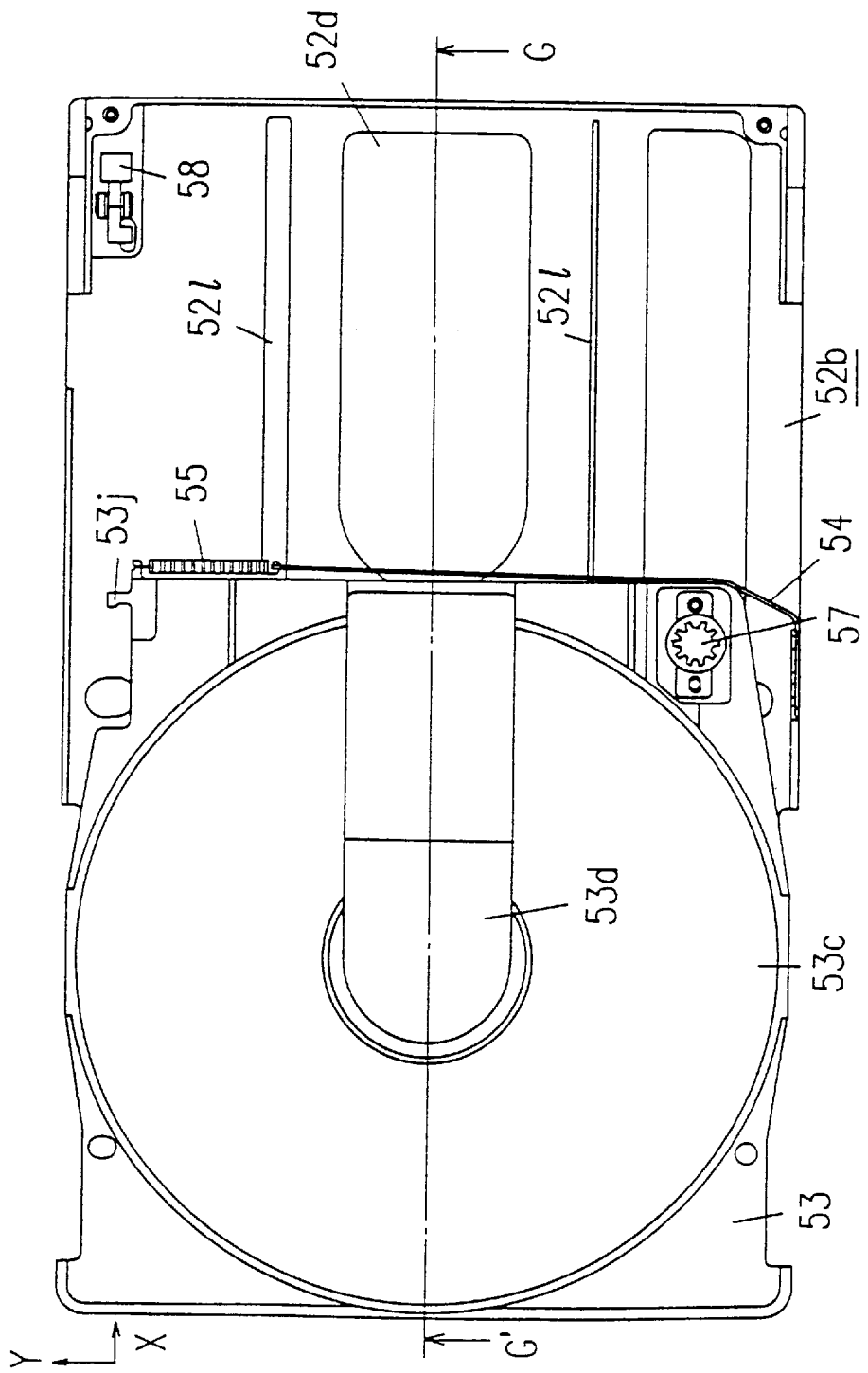
FIG. 22 is a plan view of the second-disk cartridge, with the tray in ejected position and the upper half removed, according to Example 1.
Figure 23:
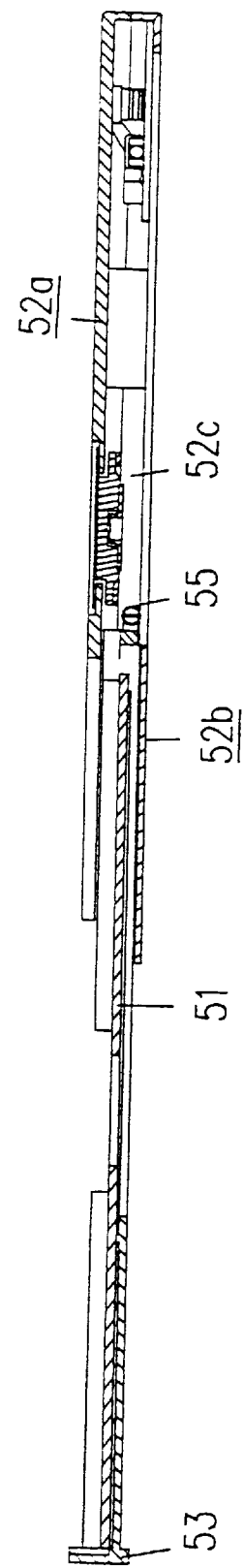
FIG. 23 is a cross-sectional view of the second-disk cartridge of Example 1 taken along line G–G' in FIG. 22.

In this specification, "the extended position of the second casing" indicates the condition in which the tray 53 is ejected from the case 52, as shown in FIGS. 21 to 23, while "the retracted position of the second casing" indicates the condition in which the tray 53 is drawn inside the case 52, as shown in FIG. 7. A belt 54 and a spring 55, shown in FIG. 9, constitute means for driving the second casing from the retracted position to the extended position.

Each component part of the thus constructed second-disk cartridge will be described in detail below.

First, the construction of the second casing will be described. The case 52 consists of an upper half 52a and lower half 52b formed from ABS resin. The upper half 52a and lower half 52b are joined together at their ends, forming an integral construction inside of which is formed a tray holding recess 52c, as shown in FIG. 23. The tray 53 is housed movably inside the tray holding recess 52c. The upper half 52a and lower half 52b may be secured together by screws 61 shown in FIG. 8 which are screwed through screw holes 52r in the upper half 52a shown in FIG. 8 and screw holes 52n in the lower half 52b shown in FIG. 10. Alternatively, they may be joined together by heat welding.

The upper half 52a has an arc-shaped notch 52e on its −X side, as shown in FIGS. 7 and 8. The notch 52e has a diameter of about 124 mm which is slightly larger than the outer diameter (about 120 mm) of the first disk 1 or second disk 51.

As shown in FIG. 10, the lower half 52b has a second sub-opening hole (hereinafter called the second opening hole, for simplicity) 52d in the position corresponding to the position of the first opening hole 2d formed in the first-disk cartridge. The second sub-opening hole 52d is made slightly larger than a second opening hole (hereinafter called the second opening hole, for simplicity) 53d, to be described later, formed in the tray 53, and allows the turntable 32 and head provided in the recording/reproducing apparatus to be inserted therethrough.

As shown in FIG. 10, the lower half 52b further includes a pair of second positioning holes 52f that act as second positioning means. The second positioning holes 52f are formed in the positions corresponding to the positions of the first positioning holes 2f formed in the first-disk cartridge, and are made slightly larger than second positioning holes 53f, to be described later, formed as second positioning means in the tray 53. One of the second positioning holes 52f is a round hole, and the other is an elongated hole, as practiced by a known positioning technique. The second positioning holes 52f serve to set the second casing 52 in position when the second-disk cartridge is inserted into the recording/reproducing apparatus. The lower half 52b also has a hole 52k to permit the protrusion 53o of the tray 53, to be described later, to move in X directions. The second positioning hole 52f on the −Y side is formed continuously with the hole 52k.

Figure 12:
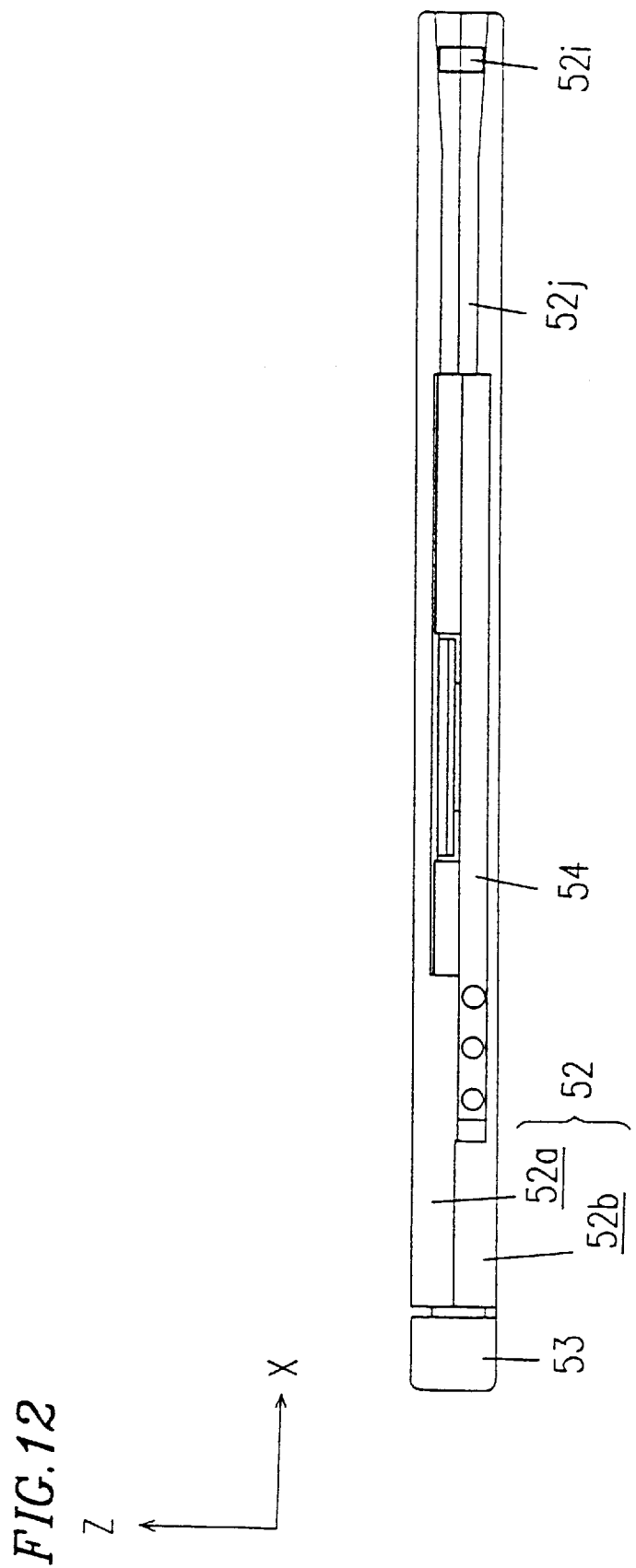
FIG. 12 is a right side view of the second-disk cartridge, with the tray in retracted position, according to Example 1.

Furthermore, recesses 52j are formed in respective end portions of +Y and −Y sides of the case 52, as shown in FIGS. 7, 10, and 12. The recesses 52j are formed in the positions corresponding to the positions of the recesses 2j formed in the first-disk cartridge, and have corresponding shapes. These recesses 52j serve to avoid the levers (not shown) that are provided on the +Y and −Y sides in the recording/reproducing apparatus to drive the first-shutter locking member 15 and first-shutter open/close member 13 of the first-disk cartridge. Inside the recesses 52j of the case 52 are formed semi-circular positioning recesses 52i in the positions corresponding to the positions of the positioning recesses 2i formed in the first-disk cartridge, the recesses 52i being similar in shape to the recesses 2i. The provision of the positioning recesses 52i enables the second-disk cartridge to be chucked when the second-disk cartridge is inserted into the recording/reproducing apparatus.

The tray 53, together with the upper half 52a and lower half 52b forming the case 52, constitutes the second casing. The tray 53 has on its −Z side a pair of parallel protrusions (not shown) extending in an X direction which fit in a pair of parallel recesses 52l formed in the lower half 52b shown in FIG. 10. The tray 53 is thus made free to move in X directions relative to the case 52. The movement of the tray 53 in Y directions is restricted by the −Y side protrusion of the tray 53 fitted into the −Y side recess 52l of the lower half 52b, while the +Y side recess 52l is formed to leave a clearance in Y directions when the −Y side protrusion is fitted. That is, the movement of the tray 53 in Y directions is limited only by the −Y side recess 52l and its mating protrusion. As for the restriction of movements in Z directions, the bottom faces of the protrusions and recesses 52l serve to limit the movement of the tray 53 in the −Z direction, while the movement of the tray 53 in the +Z direction is limited by the upper faces of protrusions 53m and the inner surface (not shown) of the upper half 52a. For the tray 53, especially the sliding portions thereof, a material such as a polyacetal resin is preferable; more specifically, a resin that has a small sliding resistance and high wear and chafing resistance against the mating resin (in this example, the case 52 made of ABS resin) is desirable.

Inside the tray 53 is formed a second-disk holding recess 53c capable of holding a second disk 51, as shown in FIG. 9. When not in use, the second disk 51 is supported on protrusions 53h formed at positions corresponding to the non-data areas around the inner and outer circumferences of the second disk 51. As in the case of the first-disk holding recess 2c, the second-disk holding recess 53c has a diameter of about 122 mm, for example, which is slightly larger than the outer diameter of the second disk 51. When the second casing is in the retracted position, the center position of the second-disk holding recess 53c is substantially coincident with the corresponding position of the first-disk holding recess 2c.

The tray 53 has a second opening hole 53d, as shown in FIG. 9. The second opening hole 53d corresponds in position and shape to the first opening hole 2d formed in the first-disk cartridge. The second opening hole 53d allows the turntable 32 and head provided in the recording/reproducing apparatus to be inserted therethrough.

The tray 53 has a pair of second positioning holes 53f that act as second positioning means. The second positioning holes 53f correspond in position and shape to the positioning holes 52f formed in the lower half 52b. That is, one of the second positioning holes 53f is a round hole, and the other an elongated hole. These positioning holes 53f enable the tray 53 to be set in position when the second-disk cartridge is inserted into the recording/reproducing apparatus.

When the second casing is in the extended position, an end face 53p (FIG. 16) of the protrusion 53o is engaged with an end face 52w of the hole 52k formed in the lower half 52b shown in FIG. 10, thereby limiting the further movement of the tray 53. The X-direction stroke that the tray 53 travels from the retracted position to the ejected position is chosen to be about 80 mm.

Figure 11:
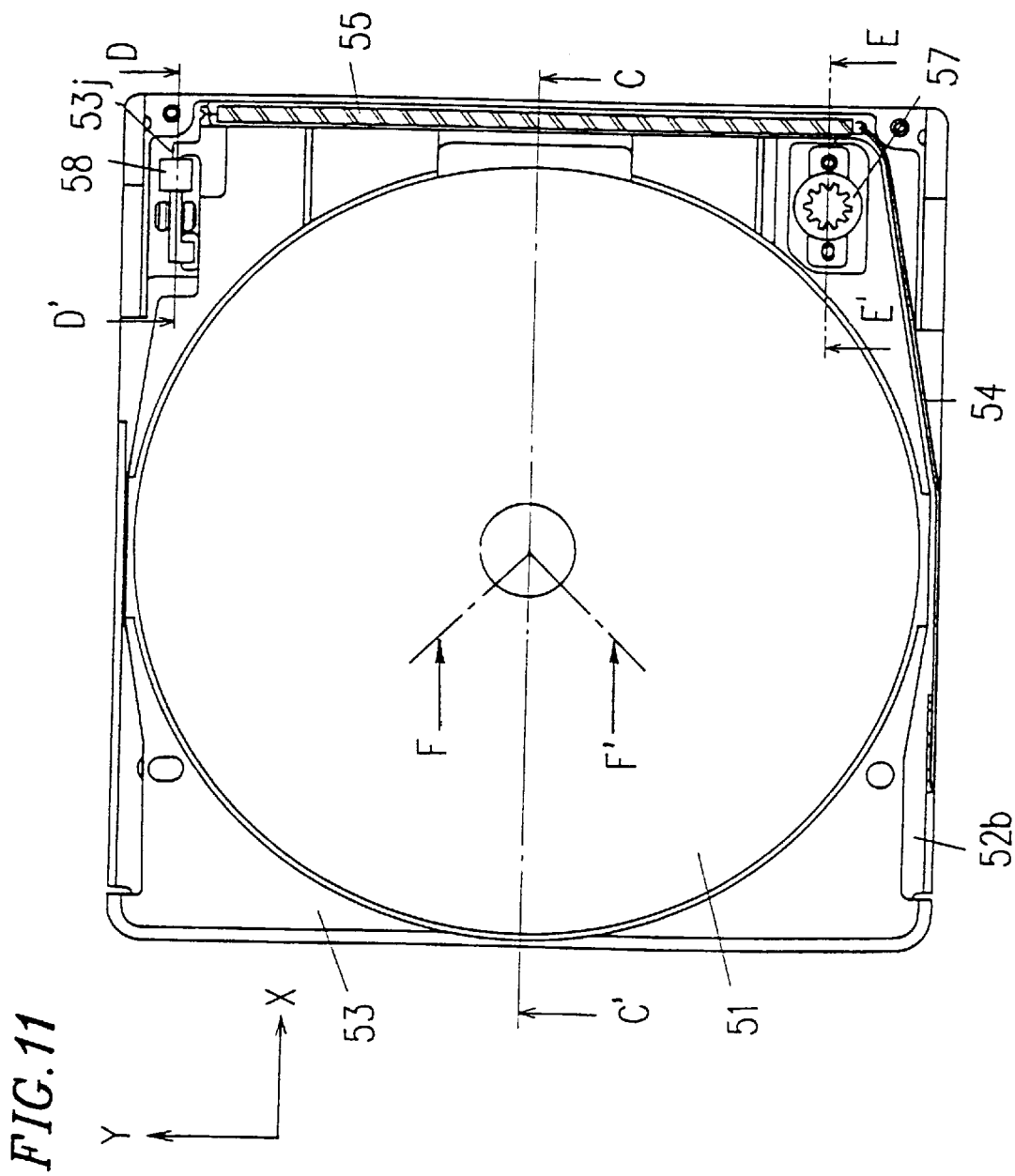
FIG. 11 is a plan view of the second-disk cartridge, with the tray in retracted position and the upper half removed, according to Example 1.

Next, the belt 54 will be described. FIG. 11 is a plan view showing the tray 53 loaded into the case 52 with the upper half 52a removed for clarity. As shown in FIG. 11, the belt 54 is guided along a side face 53e of the tray 53, and is fixed at one end to the spring 55 and at the other to the case 52. The case 52 and the tray 53 are thus connected via the spring 55. The spring 55 is a tension spring. As shown in FIG. 9 in which component parts are broken away for clarity, one end 55a of the spring 55 is passed through a hole 54a of the belt 54, and the other end 55b is hooked on a spring hook 53i formed on the tray 53. The spring 55 urges the tray 53 in the −X direction relative to the case 52 via the belt 54. That is, using its restoring force, the spring 55 acts to move the tray 53 from the retracted position shown in FIG. 7 (the retracted position of the second casing) to the ejected position shown in FIGS. 21 to 23 (the extended position of the second casing). Since the belt 54 and spring 55 are installed along the +X and −Y side faces of the tray 53 in such a manner as to overlap the locus of the moving tray 53, the provision of the belt 54 and spring 55 does not involve an increase in the height of the second-disk cartridge. Pins 56, shown in FIG. 9, which are used to retain the belt 54 to the case 52, are inserted through holes 54b formed in the belt 54, and secured by adhesion or other means to positioning recesses 52m formed in the case 52 shown in FIG. 10. The pins 56 may be formed integral with the belt 54 by molding or other technique.

Other components parts forming the second-disk cartridge will be described below.

Figure 16:
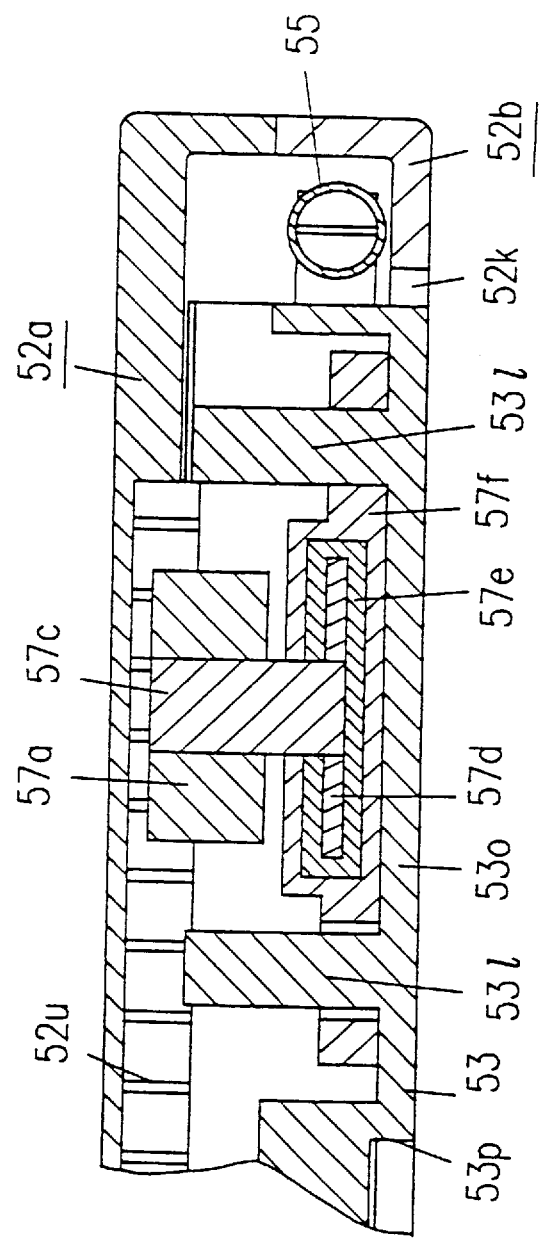
FIG. 16 is an enlarged cross-sectional view of the second-disk cartridge of Example 1 taken along line E–E' in FIG. 11.

Description will be given below of a damper 57 provided to smoothen the movement of the tray 53 in X directions relative to the case 52. FIG. 16 is an enlarged cross-sectional view taken along line E–E' in FIG. 11, showing the damper 57 and its adjacent parts. The damper 57 includes a pinion 57a, a shaft 57c, a damping plate 57d, a fluid 57e, and a base 57f through which holes 57b are opened (see the damper 57 broken away from the second-disk cartridge shown in FIG. 9). The shaft 57c to which the pinion 57a is fixed is supported rotatably on the base 57f. The fluid 57e such as silicone oil is filled inside the base 57f in such a manner as to surround the disc-shaped damping plate 57d fixed to the shaft 57c. The damper 57 is fixed in place by adhesion or other means with its holes 57b engaging on the pins 531 formed in the recess 53k (FIG. 9) of the tray 53. The pinion 57a of the damper 57 engages with the rack 52u (also see FIG. 8) formed on the upper half 52a.

Figure 15:
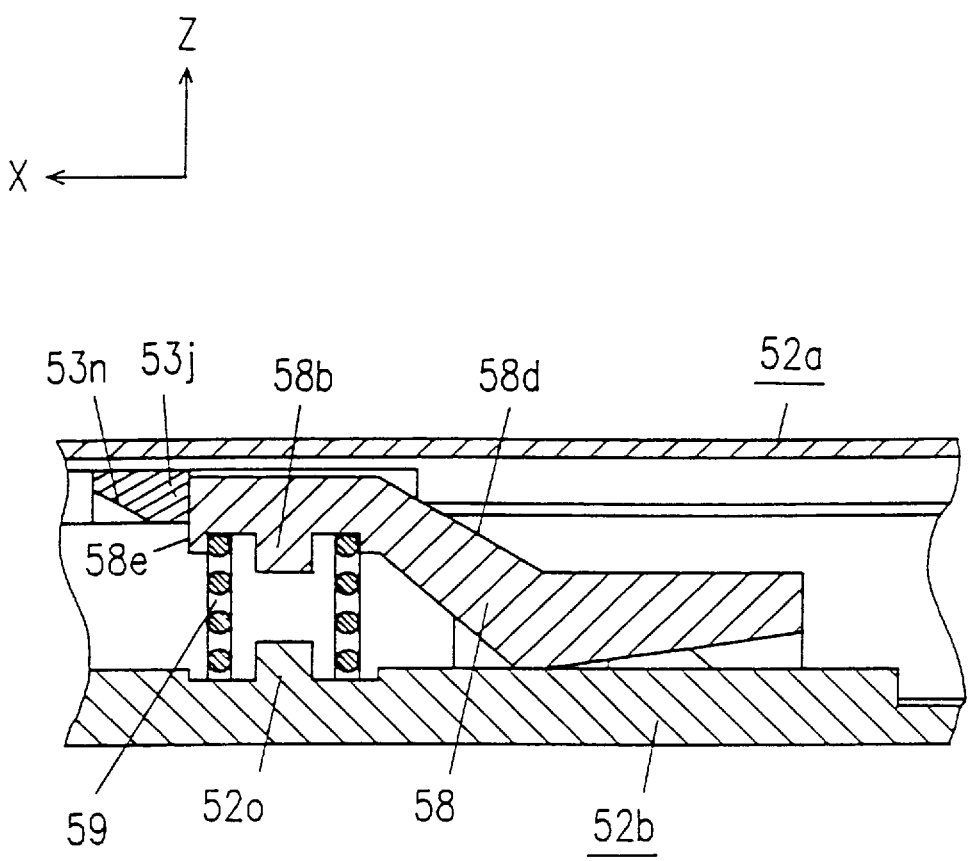
FIG. 15 is an enlarged cross-sectional view of the second-disk cartridge of Example 1 taken along line D–D' in FIG. 11.

Next, a locking unit for locking the tray 53 in the case 52 into the retracted position shown in FIG. 7 will be described. The locking unit consists of a locking pawl 58, a spring 59, and retaining plates 60, as shown in FIG. 10. FIG. 15 is an enlarged cross-sectional view taken along line D–D' in FIG. 11, showing the locking unit in locked position and its adjacent parts. FIG. 19 is an enlarged view FIG. 11 of portion H showing the locking unit in FIG. 18 that shows a perspective view of the second-disk cartridge as viewed from the lower half 52b side.

Figure 13:
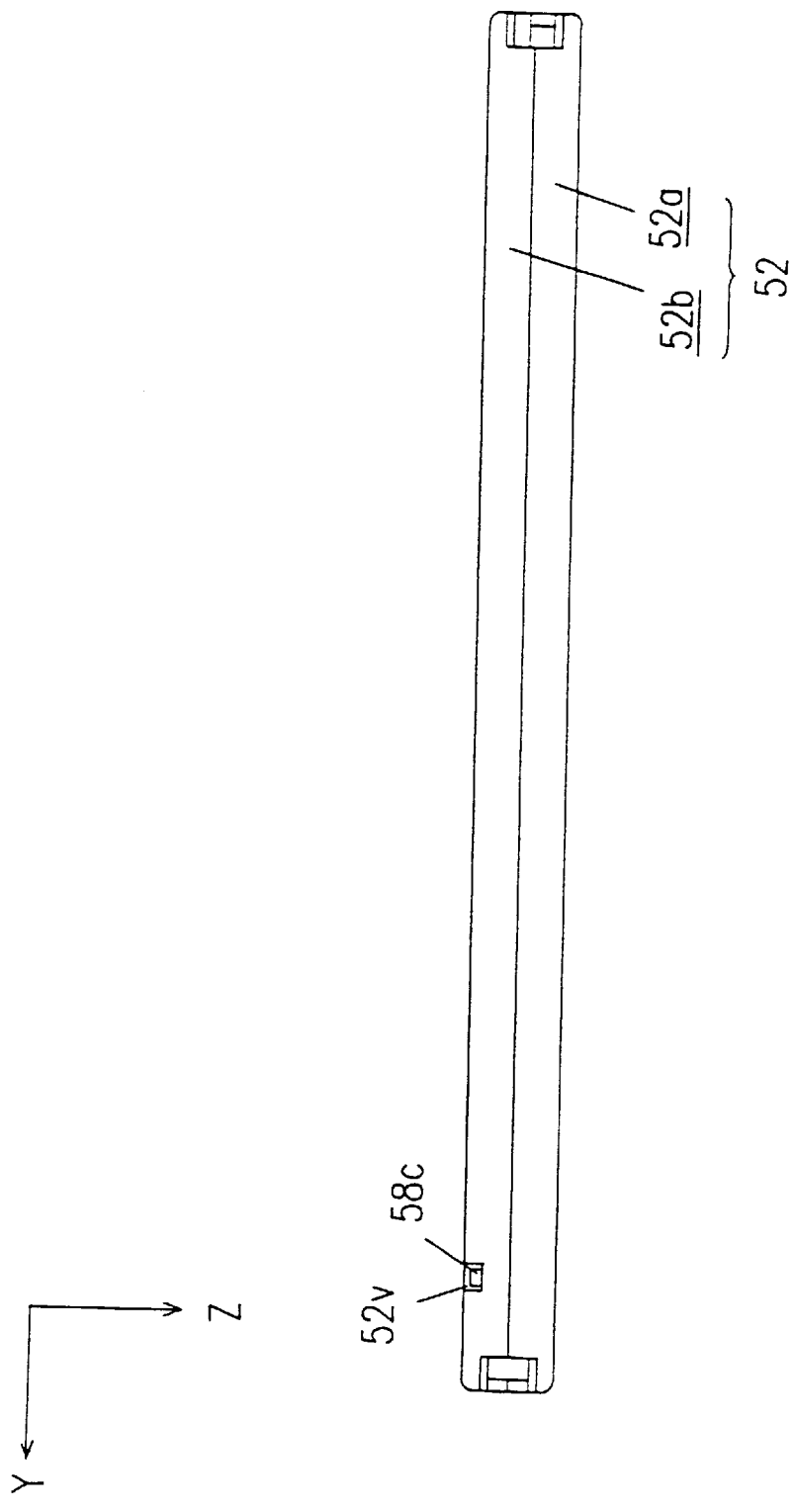
FIG. 13 is a rear view of the second-disk cartridge, with the tray in retracted position, according to Example 1.

The locking pawl 58 consists of a first shaft 58a, a second shaft 58b (FIG. 15), and a lock release 58c, as shown in FIG. 10. The lock release 58c is inserted in a hole 52q formed in the lower half 52b, while the shaft 58a is inserted in between guide portions 52p formed on the lower half 52b and rotatably supported thereon. Using the thus constructed locking unit, the tray 53 is locked into the retracted position in the case 52. The end of the lock release 58c protrudes on the lower half 52b side as shown in FIG. 19. An end face 58e of the locking pawl 58 engages with an end face 53w of a locking portion 53j on the tray 53, to accomplish the locking condition shown in FIG. 15. The lock release 58c is exposed in a slit-like recess 52v formed in the −Z side of the lower half 52b, as shown in FIG. 13.

The spring 59 is a compression spring, as shown in FIG. 15, one end 59a (FIG. 10) of which is fitted onto a shaft 52o formed on the lower half 52b; the other end 59b (FIG. 10) is fitted onto the shaft 58b of the locking pawl 58. In this arrangement, the spring 59 urges the shaft 58b of the locking pawl 58 in the +Z direction at all times.

With the shaft 58a of the locking pawl 58 inserted in between the guide portions 52p of the lower half 52b, the retaining plates 60 are fixed to the upper faces of the guide portions 52p by adhesion or other means. This limits the movement of the shaft 58a of the locking pawl 58 in the +Z direction.

Figure 17:
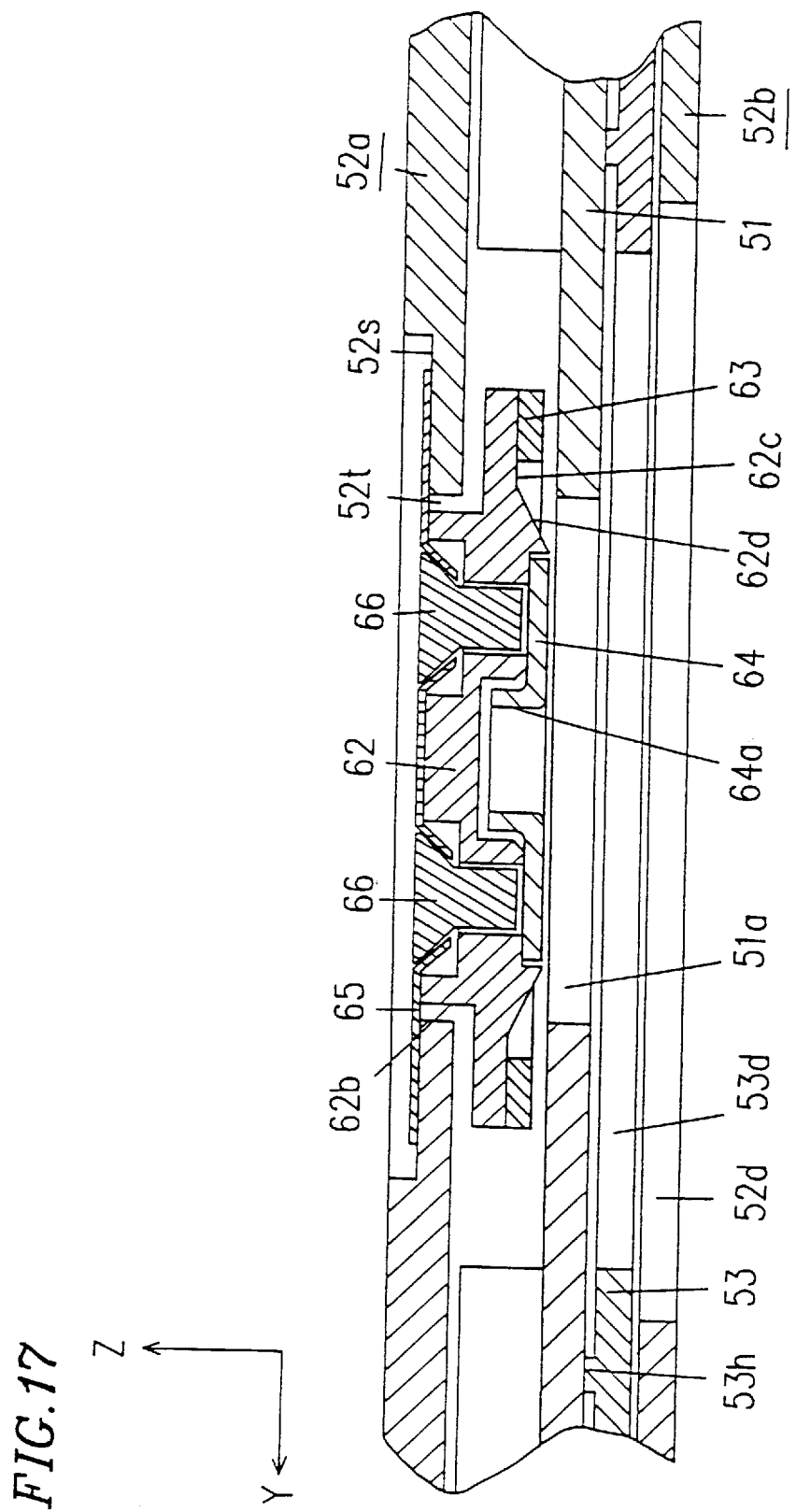
FIG. 17 is an enlarged cross-sectional view taken along line F–F' in FIG. 11, showing a disk clamping device built into the second-disk cartridge according to Example 1.

Next, the construction of the disk clamping device built into the second-disk cartridge will be described. FIG. 17 shows a cross section of the disk clamping device taken along line F–F' in FIG. 11. The disk clamping device consists of a clamp base 62, an elastic member 63, a magnetic member 64, and a clamp supporting plate 65, as shown in broken away form in FIG. 8.

The clamp base 62 includes a centering part 62d that can fit into the second center hole 51a of the second disk 51. The clamp base 62 is fixed to the clamp supporting plate 65, with a cylindrical portion 62b inserted in a hole 52t formed in the upper half 52a (also see FIG. 8). The clamp base 62 and the clamp supporting plate 65 may be joined together by screwing flush head screws 66 through screw holes 62a in the clamp base 62 and screw holes 65a in the clamp supporting plate 65, as shown in FIG. 8, or may be bonded together by adhesion or other means. The clamp supporting plate 65 is inserted in an arc-shaped recess 52s (also see FIG. 8) formed in the upper half 52a, and supports the clamp base 62, etc. in rotatable fashion.

The elastic member 63 is a disc-shaped sponge, which is, as shown in FIG. 17, fixed to a mounting face 62c of the clamp base 62. Any elastic material, such as rubber, for example, may be used to form the elastic member 63.

Like the hubs 1d, 1d' of the first disk 1, the magnetic member 64 is formed from a magnetic stainless steel. The center hole 64a opened through the magnetic member 64 shown in FIG. 17 has a slightly larger diameter (about 3 mm) than that of the motor shaft 33. The center hole 64a therefore fits concentrically onto the motor shaft 33 with good accuracy, to clamp the second disk 51 against the turntable 32 by being attracted by the magnet 34. Using a microscope or the like, the magnetic member 64 is fixed to the clamp base 62 by adhesion or other means with the center hole 64a aligned concentrically with the centering part 62d. As described, the centering unit consists of the clamp base 62, elastic member 63, centering part 62d, and center hole 64a.

The second-disk cartridge is constructed so that the second disk 51 can be mounted on the turntable 32 only when the second-disk cartridge is inserted in the recording/reproducing apparatus with the lower half 52d facing the turntable 32.

Figure 20:
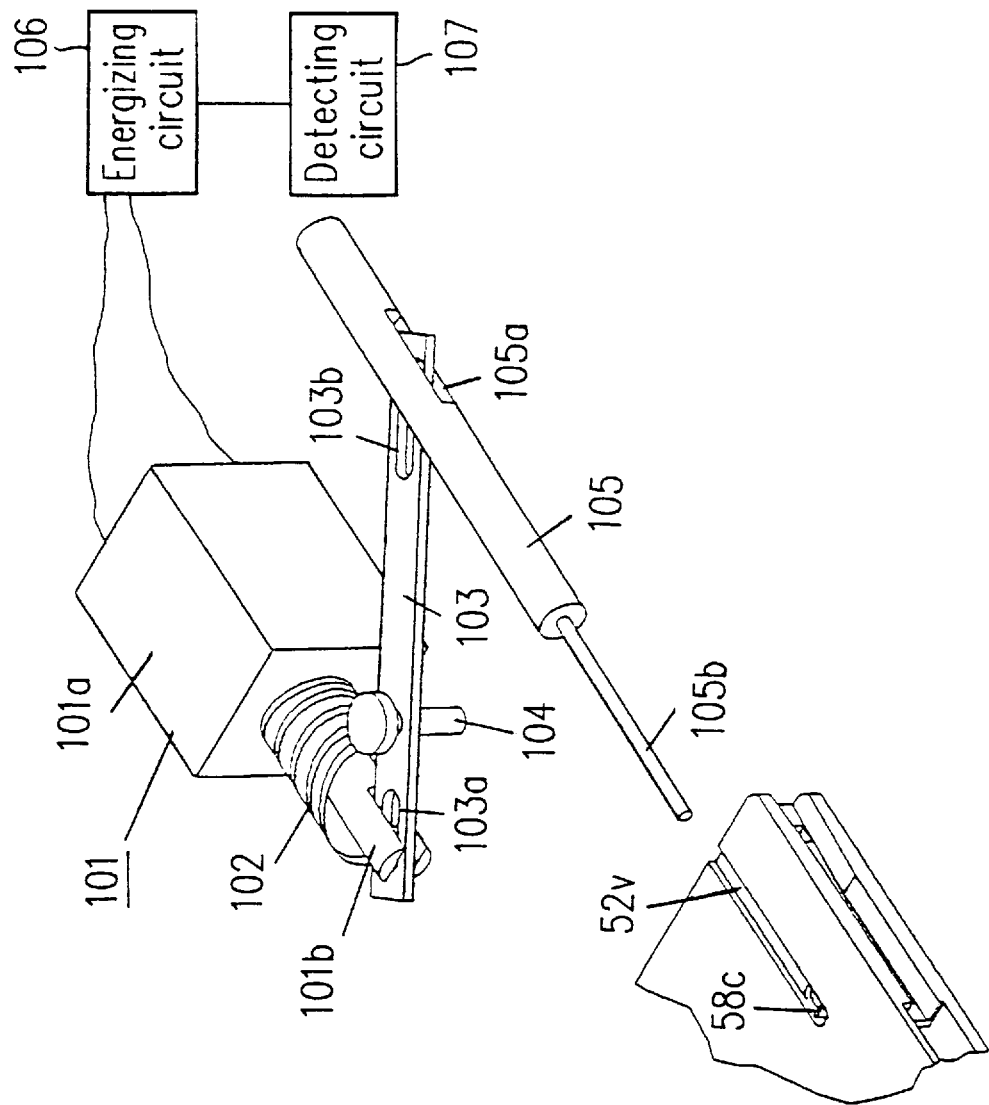
FIG. 20 is a perspective view of an unlocking unit, in deactivated position, built into the recording/reproducing apparatus according to Example 1.
Figure 24:
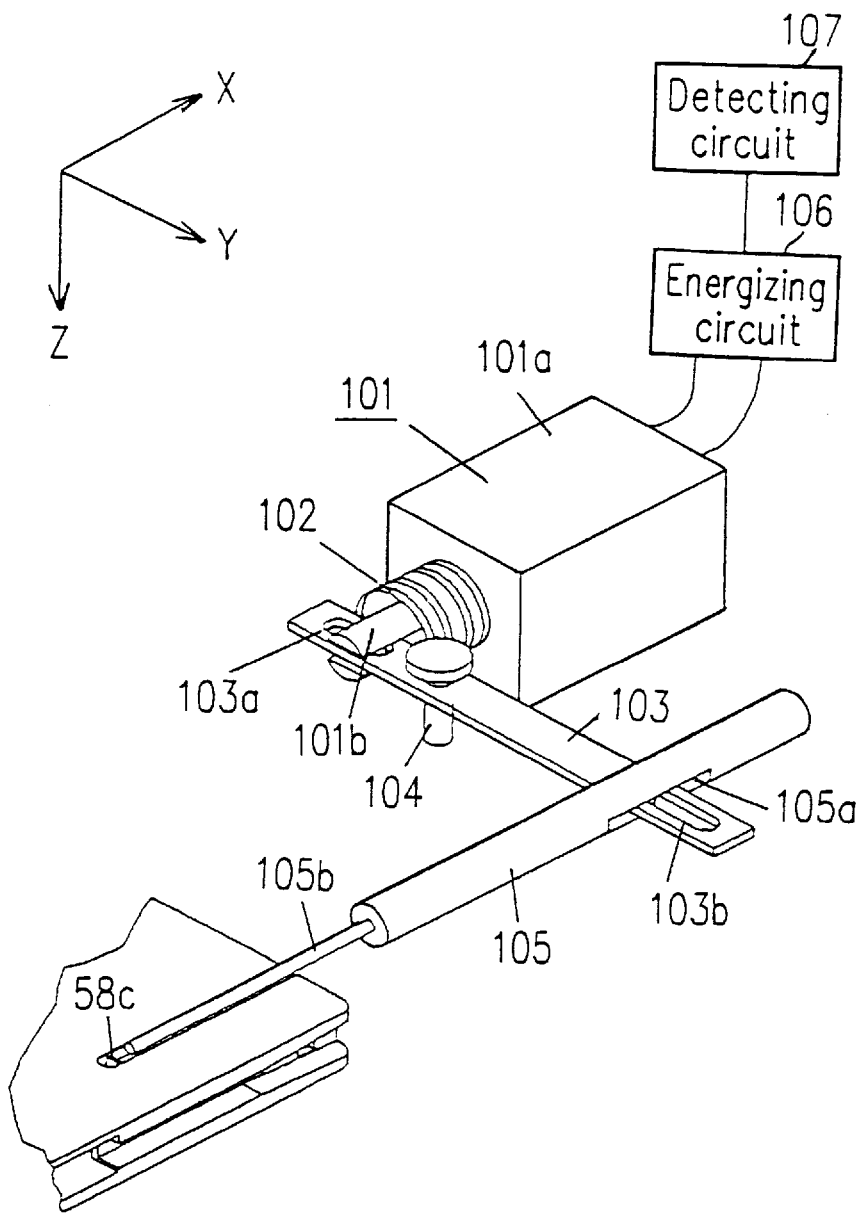
FIG. 24 is a perspective view showing the unlocking unit built into the recording/reproducing apparatus in activated position, according to Example 1.

The recording/reproducing apparatus shown in FIG. 4 has an unlocking unit for releasing the locking unit of the second-disk cartridge. The unlocking unit of the recording/reproducing apparatus will be described below. FIGS. 20 and 24 show perspective views of the unlocking unit. The unlocking unit consists of a solenoid 101, a spring 102, a connecting plate 103, a swing pin 104, a release pin 105, and an energizing circuit 106.

The solenoid 101 consists essentially of a body 101a containing an electromagnet, and an iron core 101b supported movably in X directions relative to the body 101a. The spring 102 is fitted on the iron core 101b to push the connecting plate 103 in the —X direction. The connecting plate 103 is supported swingably on the swing pin 104 fixed to the body (not shown) of the recording/reproducing apparatus. The connecting plate 103 has elongated holes 103a and 103b at both ends thereof. The iron core 101b of the solenoid 101 is connected to the connecting plate 103, with a pin, formed at the end of the iron core 101b, inserted through the elongated hole 103a. On the other hand, the elongated hole 103b is used to connect the connecting plate 103 with the release pin 105.

The release pin 105 is supported in the body of the recording/reproducing apparatus in such a manner as to be movable in X directions only. The release pin 105 has a slit 105a, and is connected to the connecting plate 103 with a pin, formed in the slit 105, inserted in the elongated hole 103b. The release pin 105 has an unlocking pin 105b at its tip, as shown in FIG. 20; the unlocking pin 105b is guided along the slit-like recess 52v to push the lock release 58c of the locking pawl 58.

The energizing circuit 106 is connected to the solenoid 101 to control the energization/deenergization of the solenoid 101. When the activation of the tray eject button 31c (FIG. 4) is detected by a detecting circuit 107, an energization command is sent to the energizing circuit 106.

The operation of the thus constructed unlocking unit will be described below.

When the tray eject button 31c is in the deactivated state, the detecting circuit 107 does not send an energization command to the energizing circuit 106, so that the energizing circuit 106 is off. Therefore, the solenoid 101 is not energized. As a result, as shown in FIG. 20, the elongated hole 103a end of the connecting plate 103 is in its extreme −X position because of the restoring force of the spring 102, which means that the elongated hole 103b end thereof is in its extreme +X position. This further indicates that the release pin 105 is also in its extreme +X position, and therefore, is separated from the lock release 58c of the locking pawl 58 on the second-disk cartridge.

When the tray eject button 31c is pressed, the detecting circuit 107 sends an energization command to the energizing circuit 106, so that the energizing circuit 106 is turned on to energize the solenoid 101. As a result, the iron core 101b is pulled in the +X direction, as shown in FIG. 24. This causes the connecting plate 103 to turn about the swing pin 104 against the restoring force of the spring 102. As a result, the elongated hole 103a end moves in the +X direction, and the elongated hole 103b end in the −X direction. With this movement of the connecting plate 103, the release pin 105 is moved in the −X direction, until the tip of the unlocking pin 105b pushes the lock release 58c of the locking pawl 58 on the second-disk cartridge and thus releases the lock.

The operation of the thus constructed second-disk cartridge and recording/reproducing apparatus will be described below.

First, description will be given of the operation performed when inserting the second-disk cartridge into the recording/reproducing apparatus.

When the second disk 51 is loaded in the second-disk cartridge and the tray 53 is in the retracted position as shown in FIG. 7, the second-disk cartridge can be inserted as-is into the recording/reproducing apparatus. On the other hand, when the second-disk cartridge is not yet loaded with the second disk 51, the second disk 51 may be loaded into the second-disk cartridge either before or after the second-disk cartridge is inserted in the recording/reproducing apparatus.

First, the description is given of the operation for the case in which the second disk 51 is loaded into the second-disk cartridge before the second-disk cartridge is inserted into the recording/reproducing apparatus.

If, in FIG. 7, the second-disk cartridge is not yet loaded with the second disk 51, the tray 53 is unlocked first. Unlocking the tray 53 can be accomplished by pressing by a finger, etc. the lock release 58c of the locking pawl 58, exposed through the hole 52q in the lower half 52b, as shown in FIGS. 13 and 19. This causes the end face 58e of the locking pawl 58 to move down in the −Z direction against the restoring force of the spring 59 of the locking unit; the end face 58e is then disengaged from the end face 53w of the locking portion 53j on the tray 53 (see FIG. 15), thus unlocking the tray 53. As a result, the tray 53 is moved about 80 mm in the −X direction relative to the case 52 by the restoring force of the spring 55. That is, the tray 53 is moved from the retracted position shown in FIG. 11 to the ejected position shown in FIG. 22. Since the movement of the tray 53 is regulated by the damper 57, the tray 53 moves slowly so that there is no danger of injury if the user touches the tray 53 in motion.

Next, the second disk 51 is held by hand, and placed onto the second-disk holding recess 53c (FIG. 9) in the tray 53. Then, the tray 53 is manually moved in the X direction into the case 52 against the restoring force of the spring 55. As the tray 53 moves, the spring 55 gradually stretches, until the locking portion 53j of the tray 53 hits the lock pawl 58. After that, with the tapered face 53n of the tray 53 pushing the tapered face 58d of the locking pawl 58 in the +X direction, the locking pawl 58 is turned against the restoring force of the spring 55 so that the end face 58e moves down in the −Z direction. In this situation, when the tray 53 moves further in the +X direction, the locking portion 53j of the tray 53 overrides the +Z side end face of the locking pawl 58. At the same time, the end face 58e of the locking pawl 58 is turned in the +Z direction by the restoring force of the spring 55, and is engaged with the end face 53w of the tray 53 (FIG. 9). The tray 53 is thus locked in the case 52, as shown in FIG. 15, accomplishing the condition shown in FIG. 7 in which the second-disk cartridge is loaded with the second disk 51 and the tray 53 is in retracted position.

An alternative way of loading the tray 53 into the case 52 is by first inserting the case 52 in the insertion slot 31a of the recording/reproducing apparatus, with the second disk 51 placed on the second-disk holding recess 53c as shown in FIG. 21, and then pushing the tray 53 into the +X direction.

Returning to the condition shown in FIG. 7, the second-disk cartridge containing the second disk 51 is held by the −X side, as with the first-disk cartridge, and is inserted in the insertion slot 31a formed in the outer housing 31 of the recording/reproducing apparatus; then, the positioning recesses 52i formed in the case 52 are chucked by holder pins (not shown) of the loading mechanism in the recording/reproducing apparatus, and the second-disk cartridge is guided in the +X direction.

At this time, the recesses 52j formed in the case 52 serve to prevent the levers (not shown) provided on the +Y and −Y sides in the recording/reproducing apparatus from interfering with the mechanism of the case 52 while the case 52 is being drawn in the +X direction.

Figure 18:
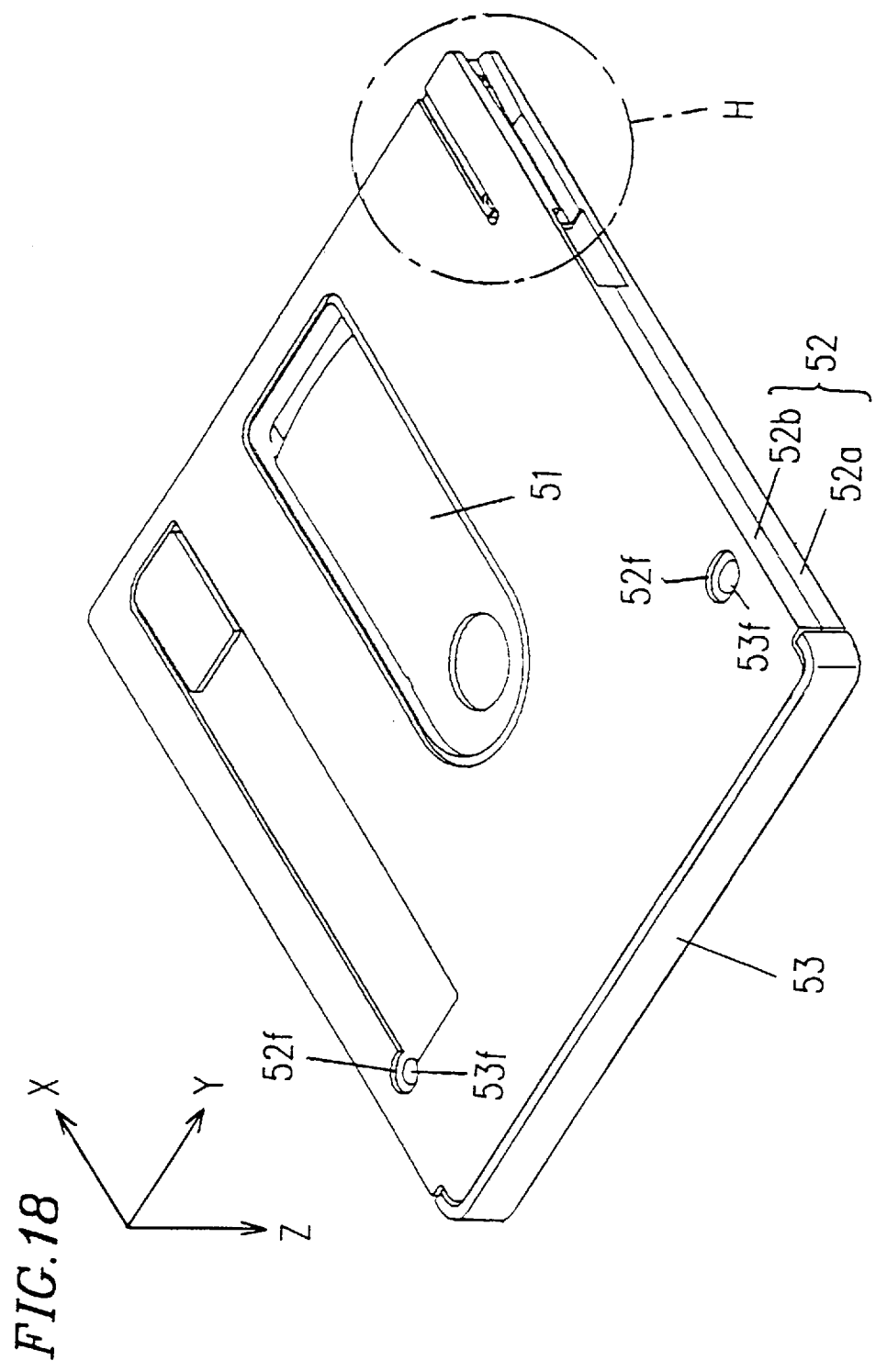
FIG. 18 is a perspective view showing the second-disk cartridge of Example 1 as viewed from a lower half side thereof, with the tray in retracted position.
Figure 19:
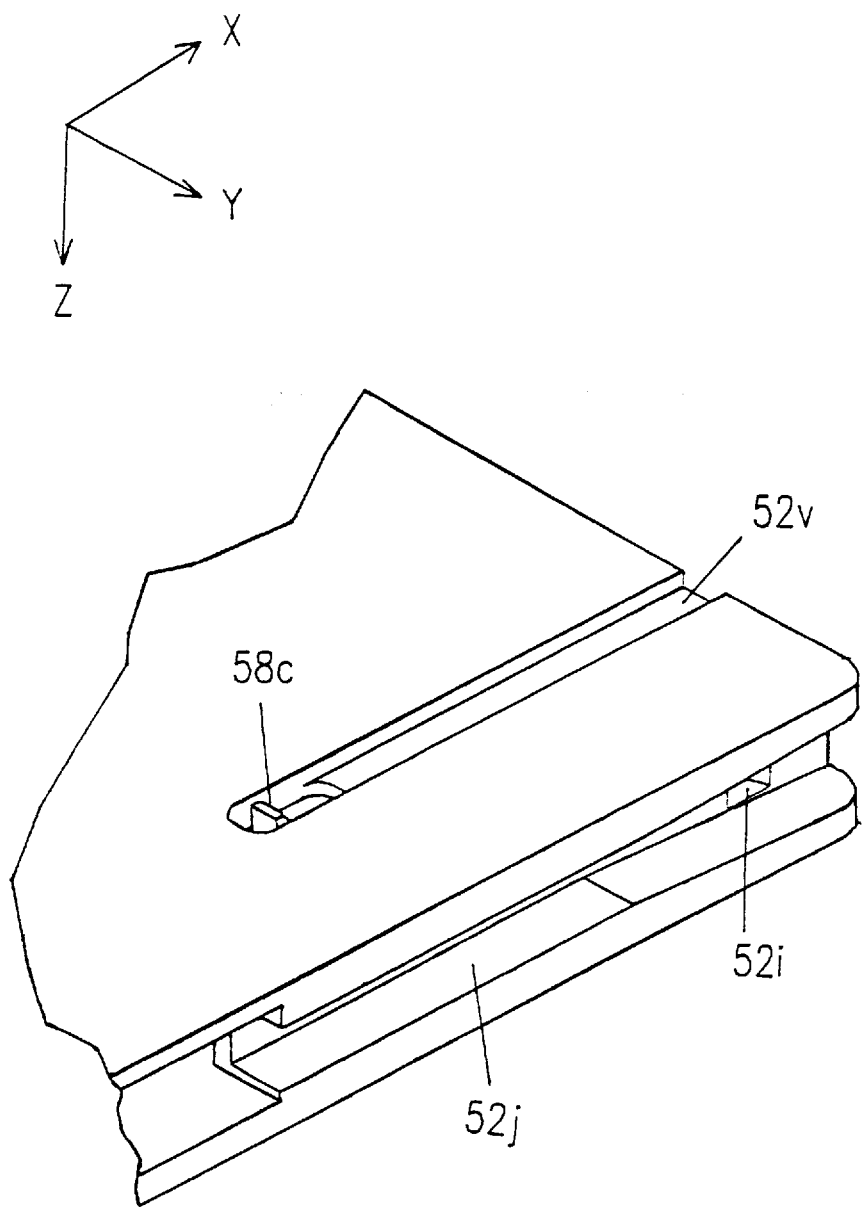
FIG. 19 is an enlarged perspective view of a portion H in FIG. 18 of the second-disk cartridge of Example 1.

Further, as with the first-disk cartridge, the second-disk cartridge is moved in the −Z direction by the action of the loading mechanism, and set in the specified position with the second positioning holes 52f and 53f; in particular, the tray 53 is accurately positioned with the positioning pins or the like (not shown) in the recording/reproducing apparatus fitting through the second positioning holes 52f in the lower half 52b and through the second positioning holes 53f in the tray 53 (see FIG. 18). The second positioning holes 52f formed in the lower half 52b are made larger than the second positioning holes 53f in the tray 53, since the case 52 needs to be positioned accurately in Z directions only, while the tray 53 with the second disk 51 directly held thereon needs to be positioned accurately in both X and Y directions.

Figure 25:
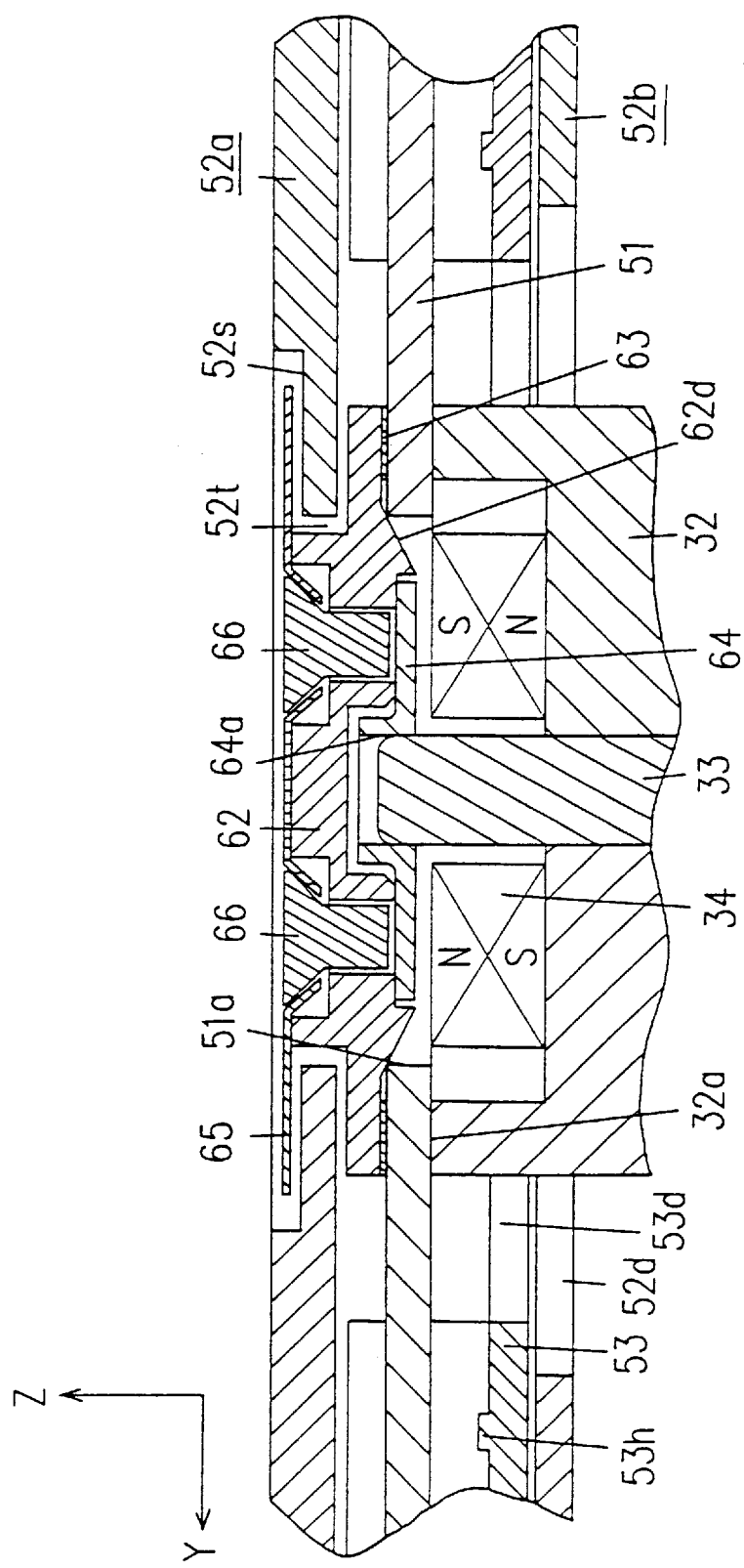
FIG. 25 is an enlarged cross-sectional view taken substantially along line F–F' in FIG. 11, showing the disk clamping device when the second-disk cartridge is mounted and positioned in the recording/reproducing apparatus, according to Example 1.

At the same time, the disk clamping device is put into action. That is, as shown in FIG. 25, the turntable 32, etc. of the recording/reproducing apparatus are inserted through the second opening hole 52d (FIG. 10) in the lower half 52b and through the second opening hole 53d (FIG. 9) in the tray 53, and the second disk 51 is mounted on the turntable surface 32a. After that, the second center hole 51a of the second disk 51 is guided concentrically with the centering part 62d of the clamp base 62, and the center hole 64a of the magnetic member 64 engages onto the motor shaft 33. At this time, the elastic member 63 is pressed in the Z direction, and the second center hole 51a is brought into contact with the centering part 62d. In this situation, the magnetic member 64 is attracted by the magnet 34 to clamp the second disk 51 in position. That is, the second disk 51 is held in the clamped position while holding the center hole 51a, and hence the information track, in concentric relationship with the motor shaft 33.

Further, a head (not shown) is inserted from the −Z side through the second opening holes 52d and 53d. With the above sequence of operations, the disk is set ready for information recording, reproduction, or erasure.

Next, description is given of the operation performed when ejecting the second-disk cartridge from the recording/reproducing apparatus.

There are two methods of ejecting the second-disk cartridge from the recording/reproducing apparatus: One is by pressing the eject button 31b, and the other is by pressing the tray eject button 31c (see FIG. 4).

First, the method of ejecting the second-disk cartridge by pressing the eject button 31b will be described. This ejection method is particularly useful when replacing the second-disk cartridge with the first-disk cartridge or with another second-disk cartridge.

When the eject button 31b on the recording/reproducing apparatus is pressed by a finger, the second-disk cartridge is moved in the +Z direction by the action of the loading mechanism, disengaging the case 52 and tray 53 from the position set by the second positioning holes 52f and 53f. At the same time, the turntable 32, head, etc. of the recording/reproducing apparatus are disengaged from the second opening hole 52d in the lower half 52b and the second opening hole 53d in the tray 53.

Figure 26:
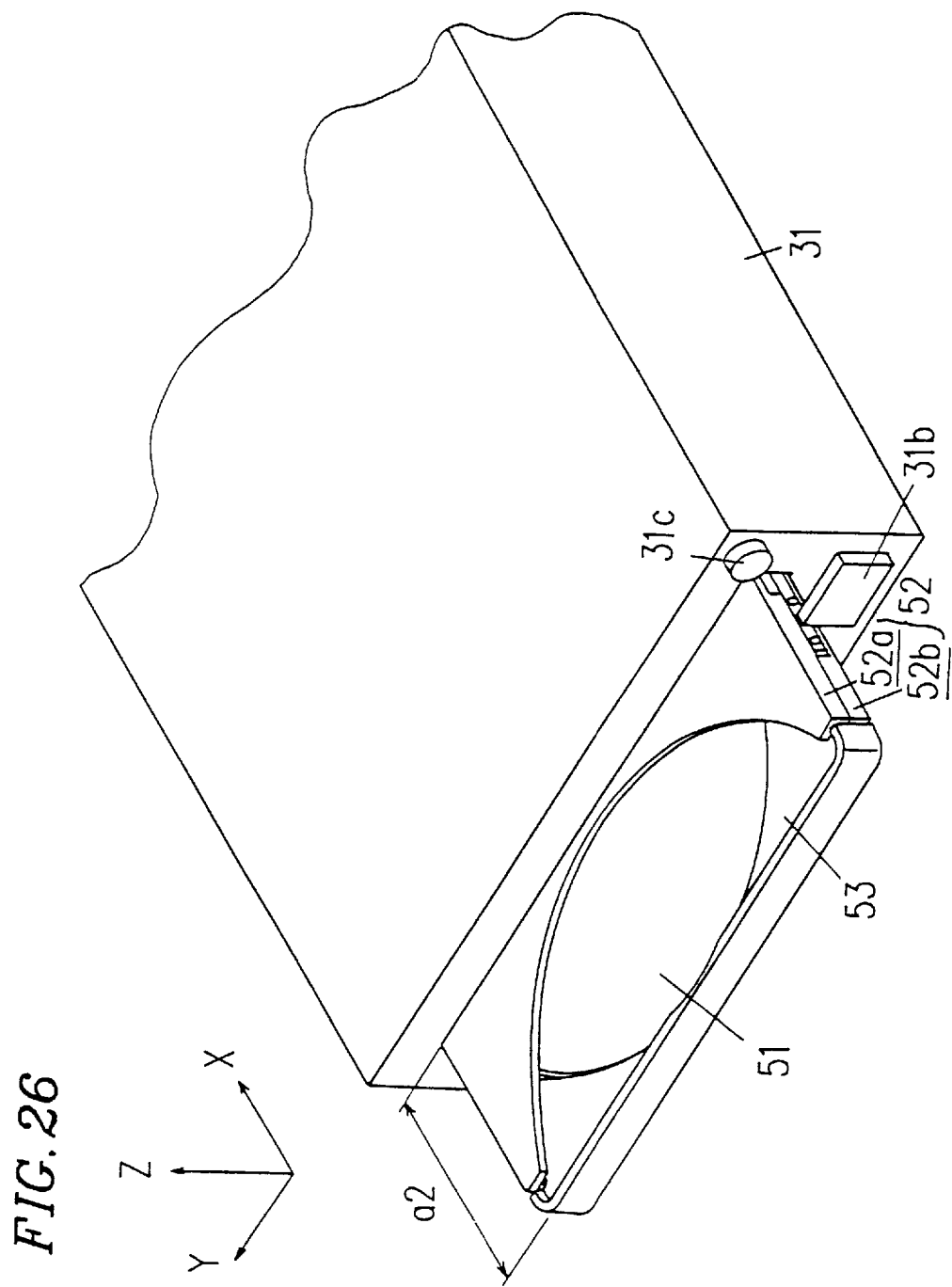
FIG. 26 is a perspective view showing the second-disk cartridge ejected from the recording/reproducing apparatus, with the tray locked in a retracted position, according to Example 1.

Then, the second-disk cartridge is ejected through the same path that it was loaded, but in the reverse direction. That is, as with the first-disk cartridge, the second-disk cartridge is guided in the −X direction, and ejected through the insertion slot 31a, as shown in FIG. 26. The dimension a2 by which the second-disk cartridge is ejected in the −X direction is, of course, chosen to be about 50 mm, as with the first-disk cartridge.

In the condition shown in FIG. 26, the second-disk cartridge can be removed from the recording/reproducing apparatus by holding the −X side of the cartridge.

Next, the method of ejecting the second-disk cartridge by pressing the tray eject button 31c will be described. This ejection method is particularly useful when replacing the second disk 51 mounted on the tray 53 with another second disk 51.

First, when the tray eject button 31c on the recording/reproducing apparatus is pressed by a finger, the second-disk cartridge is moved in the +Z direction by the action of the loading mechanism, disengaging the case 52 and tray 53 from the position set by the second positioning holes 52f and 53f. At the same time, the turntable 32, head, etc. of the recording/reproducing apparatus are disengaged from the second opening holes 52d and 53d.

After that, the unlocking pin 105b of the release pin 105 forming part of the unlocking unit provided in the −Z side of the recording/reproducing apparatus is extended to push the lock release 58c of the locking pawl 58 exposed through the hole 52q in the lower half 52, as previously described. This causes the end face 58e of the locking pawl 58 to move down in the −Z direction against the restoring force of the spring 59, and the end face 58e is disengaged from the end face 53w of the locking portion 53j, thus unlocking the tray 53.

When unlocked, the tray 53 is moved about 80 mm in the −X direction relative to the case 52 by the restoring force of the spring 55. Since this movement of the tray 53 is regulated by the damper 57, the tray 53 moves slowly.

Figure 27:
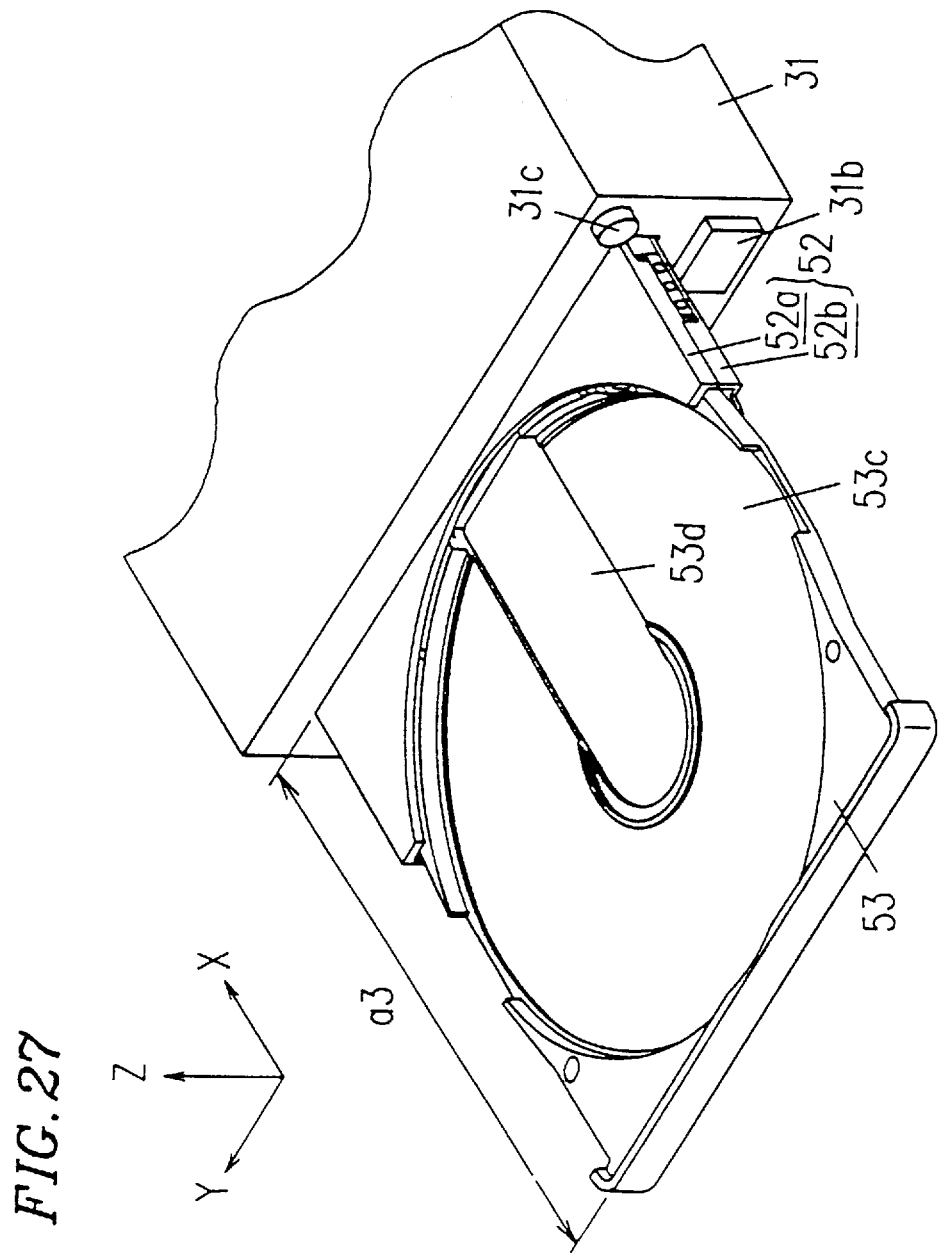
FIG. 27 is a perspective view showing the second-disk cartridge ejected from the recording/reproducing apparatus, with the tray in ejected position, according to Example 1.

Then, the second-disk cartridge is ejected through the same path that it was loaded, but in the reverse direction. That is, as with the first-disk cartridge, the second-disk cartridge is guided in the −X direction, and ejected through the insertion slot 31a, as shown in FIG. 27. The dimension a3 by which the tray 53 of the second-disk cartridge is ejected in the −X direction is about 130 mm, i.e. the sum of the ejection dimension, about 80 mm, of the tray 53 ejected from the case 52 and the ejection dimension, about 50 mm, of the case 52 itself.

In the condition shown in FIG. 27, the second disk 51 mounted on the disk holding recess 53c of the tray 53 can be removed for mounting of another second disk 51. Otherwise, the second-disk cartridge can be removed from the recording/reproducing apparatus by holding the −X side of the tray 53.

Further, in the condition shown in FIG. 27, the tray 53 may be pushed in the +X direction, with the second disk 51 removed or left on it, thus leaving the second-disk cartridge loaded in the recording/reproducing apparatus when not in use. In this case, when it becomes necessary to use the recording/reproducing apparatus for recording or reproduction of another second disk 51, the tray eject button 31c is pressed in the same manner as described above; since the tray 53 is ejected as shown in FIG. 27, the desired second disk 51 can be mounted on the second-disk holding recess 53c for use.

The constructions and advantageous effects of the present example can be summarized as follows:

(a) The telescopic structure of the second casing consisting of the case 52 and tray 53 permits the loading and unloading of the second disk 51 as desired. Further, when the second casing is locked in the retracted position, the second positioning holes 52f, 53f (second positioning means) substantially coincide in position and shape with the first positioning holes 2f (first positioning means) formed in the first-disk cartridge, and the second opening holes 52d, 53d substantially coincide in position and shape with the first opening hole 2d formed in the first-disk cartridge or are larger than the first opening hole 2d so as to include the entire area corresponding to the first opening hole 2d; this structure permits the use of the second-disk cartridge in a recording/reproducing apparatus designed for use with the first-disk cartridge. As a result, the recording/reproducing apparatus need not have two loading mechanisms. Thus, it is possible to provide a second-disk cartridge which enables a second disk 51 to be mounted and positioned in a recording/reproducing apparatus capable of mounting and positioning therein a first-disk cartridge containing a first disk 1, and which is as thin as the first-disk cartridge and is capable of holding the second disk 51 in removable fashion, without increasing the structural complexity and the size and cost of the recording/reproducing apparatus.

(b) The tray 53, which is slidable within the case 52 in directions in parallel to the direction of insertion into the recording/reproducing apparatus, can be set, as desired, either in the extended position to allow the loading and unloading of the second disk 51 or in the retracted position to allow the mounting and positioning thereof in the recording/reproducing apparatus; this construction makes it possible to set the tray 53 into the extended position in interlocking fashion with an eject action of the loading mechanism provided in the recording/reproducing apparatus for loading and unloading the second-disk cartridge. Furthermore, since the tray 53 has a second opening hole 53d which, when in the retracted position, becomes exposed through the second opening hole 52d formed in the case 52, the turntable 32 and head of the recording/reproducing apparatus can be inserted through the second opening holes 52d, 53d of the case 52 and tray 53. This enables the second disk 51 to be mounted and positioned directly onto the turntable 32. As a result, it is possible to provide a second-disk cartridge which enables a second disk 51 as contained in the second casing to be mounted directly into the recording or reproduction position in a recording/reproducing apparatus, and which is as thin as the first-disk cartridge and is easy to handle, the second disk 51 being able to be loaded in or unloaded from the second-disk cartridge not only by manual operation but in interlocking fashion with an eject action of the recording/reproducing apparatus.

(c) The spring 55 is provided as the driving means to move the tray 53 into the extended position to allow the loading and unloading of the second disk 51, in interlocking fashion with an unlocking action of the locking unit; with this construction, the second-disk cartridge can be automatically set into position to allow the loading and unloading of the second disk 51, just by pushing the locking unit either manually or using a pin or the like provided in the recording/reproducing apparatus. Therefore, there is no need to move the tray 53 by manual operation or by using the loading mechanism in the recording/reproducing apparatus. This enhances the ease of operation and permits further simplification of the construction of the recording/reproducing apparatus.

(d) Interlocking with the guiding action of the loading mechanism in the recording/reproducing apparatus to guide the second-disk cartridge or second casing, in particular, with the guiding action to guide the second casing toward the turntable 32, the second center hole 51a of the second disk 51 is centered with respect to the motor shaft 33 by the centering unit, and the magnetic member 64 is attracted by the magnet 34 provided in the turntable 32; thus, the second disk 51 can be automatically centered and clamped in position. Therefore, the recording/reproducing apparatus need not have a special mechanism for centering and clamping the second disk 51. Furthermore, since the centering unit and the magnetic member 64 are constructed so that they do not protrude beyond the external surface or −Z side surface of the case 52, the construction does not involve an increase in the height of the recording/reproducing apparatus. Thus, it is possible to provide a disk cartridge having a disk clamping device which is capable of automatically centering and clamping the second disk 51 with no hub onto the turntable 32 of the recording/reproducing apparatus, and allows a reduction in the height of the recording/reproducing apparatus, without increasing the structural complexity, cost, etc. of the recording/reproducing apparatus.

(e) In the present example, centering is accomplished by fitting the centering part 62*d* of the clamp base 62 into the second center hole 51*a* of the second disk 51, and engaging the center hole 64*a* of the magnetic member 64 onto the motor shaft 33. The position of the centering part 62*d* fitted into the second center hole 51*a* varies due to the diametrical accuracy (usually, of the order of 0.1 mm) of the second center hole 51*a*. However, since the elastic member 63 is compressed and deformed by the attraction force by which the magnet 34 attracts the magnetic member 64, the second center hole 51*a* is always held in contact with the centering part 62*d* when the second disk 51 is centered and clamped in position. In the prior known method, centering of the second disk 51 with no hub is performed by using a mechanism in which a center cone having a centering part inside the turntable is supported on a tension spring (see FIG. 37). By contrast, in the present example, since the centering is made possible just by providing the elastic member 63 on the clamp base 62, a disk clamping device that is thin and simple in construction can be provided.

(f) Interlocking with the guiding action of the loading mechanism in the recording/reproducing apparatus to guide the second disk 51, in particular, with the guiding action to guide the second disk 51 toward the turntable 32, the disk clamping device is also guided toward the turntable 32. During this guiding process, centering of the second disk 51 is performed by fitting the centering part 62*d* of the clamp base 62 into the second center hole 51*a* of the second disk 51, and engaging the center hole 64*a* of the magnetic member 64 onto the motor shaft 33 that is essentially designed to fit into the hubs 1*d*, 1*d'* of the first center holes 1*e*, 1*e'* in concentric fashion. The centering part 62*d* fitted into the second center hole 51*a* is subject to positional variation, but since the elastic member 63 is compressed and deformed by the attraction force by which the magnet 34 essentially designed to attract the hubs 1*d*, 1*d'* attracts the magnetic member 64, the second center hole 51*a* is always held in contact with the centering part 62*d* when the second disk 51 is centered and clamped in position. Thus, it is possible to provide a disk clamping device that is capable of automatically centering and clamping the second disk 51 with no hub onto the turntable 32 of the recording/reproducing apparatus that is essentially designed to clamp the first disk 1 with hubs 1*d*, 1*d'* by magnetic attraction.

(g) Since the belt 54 and spring 55 are installed along the +X and −Y side faces of the tray 53 in such a manner as to overlap the locus of the moving tray 53, the provision of the belt 54 and spring 55 does not involve an increase in the height of the second-disk cartridge.

(h) Since the movement of the tray 53 is regulated by the damper 57, the tray moves slowly, and no injury will be caused if the user touches the tray in motion.

The present invention is not limited to the first example described above, but it will be appreciated that various modifications may be made in the invention. Other examples of the invention, Examples 2–12, will be described below by comparison with Example 1. As a general rule, description of the construction, operation, reference numerals given in drawings, etc. will not be repeated where they are identical to those described in Example 1.

EXAMPLE 2

Figure 28:
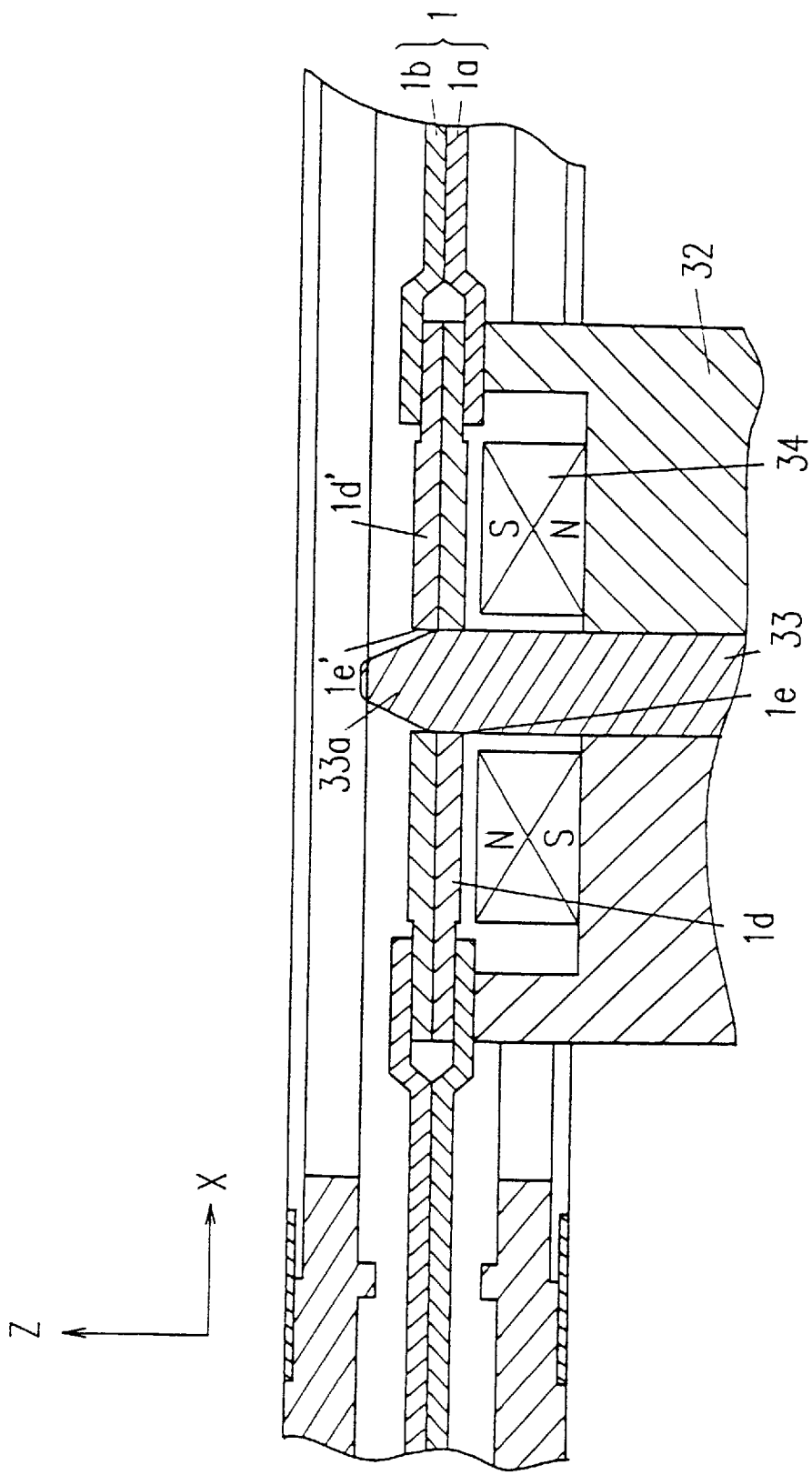
FIG. 28 is an enlarged cross-sectional view taken along line corresponding to line F–F' in FIG. 11, showing an essential portion (corresponding to portion B in FIG. 3) of a first-disk cartridge mounted and positioned in a recording/reproducing apparatus, according to Examples 2–5 of the invention.

FIG. 28 shows a first-disk cartridge according to Example 2 of the invention: shown here is an enlarged cross-sectional view of an essential portion (corresponding to portion B in FIG. 3) of the first-disk cartridge mounted and positioned in a recording/reproducing apparatus.

(1) In Example 1, the end portion of the motor shaft 33 is formed in an arc shape around its perimeter, as shown in FIG. 5; in the present example, on the other hand, the end portion 33*a* of the motor shaft 33 is tapered. With this tapered end portion 33*a*, if there occurs a substantial misalignment between the first center hole 1*e* of the first disk 1 and the center of the motor shaft 33, for example, accurate centering can be accomplished since the first center hole 1*e* is guided into position by the tapered end portion 33*a*.

Figure 29:
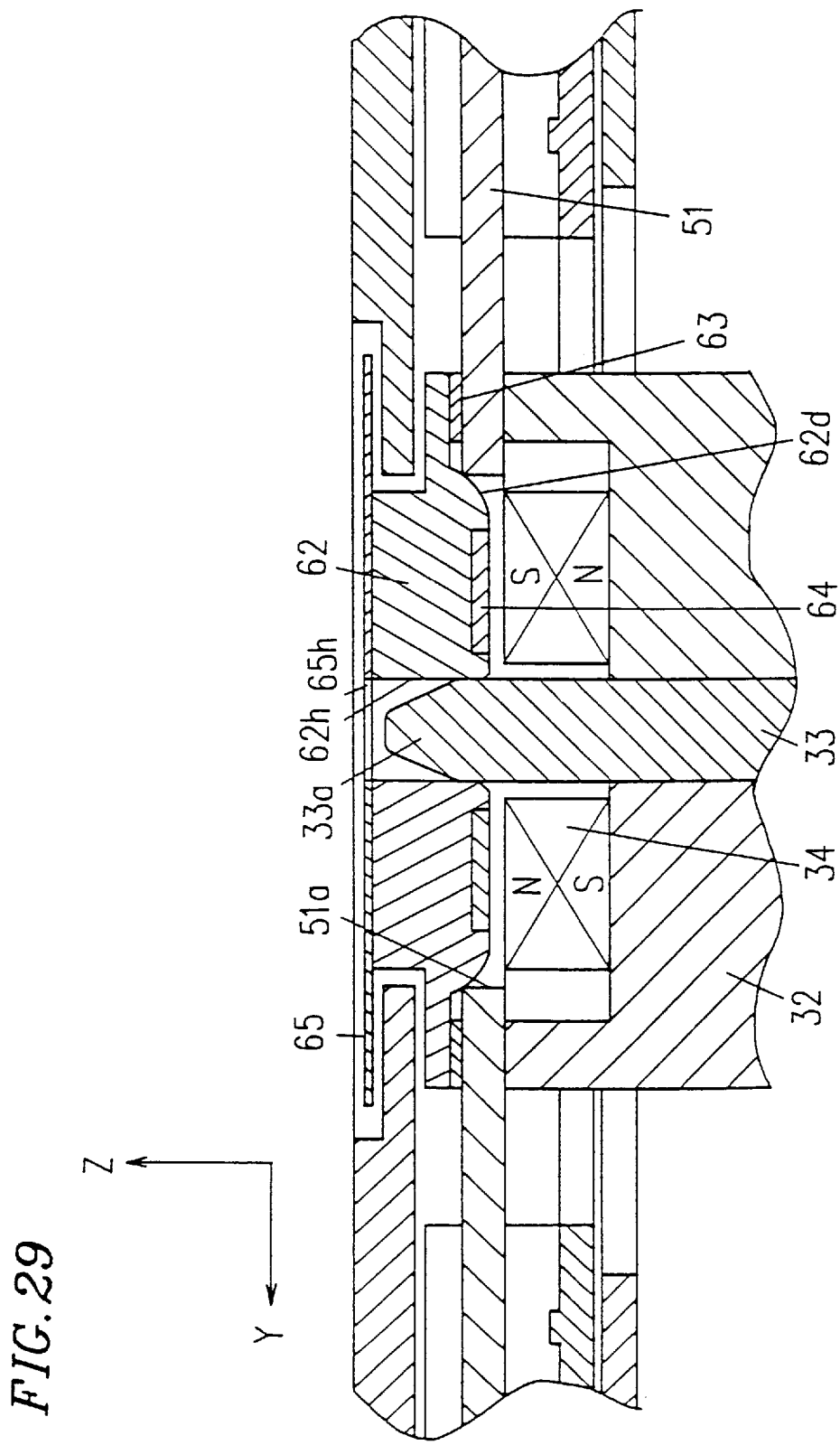
FIG. 29 is an enlarged cross-sectional view taken along line corresponding to line F–F' in FIG. 11, showing a second-disk cartridge mounted and positioned in a recording/reproducing apparatus, with a tray in retracted position, according to Example 2 of the invention.

FIG. 29 shows a second-disk cartridge according to Example 2 of the invention: shown is an enlarged cross-sectional view taken along line corresponding to line F–F' in FIG. 11, showing a portion of the second-disk cartridge mounted and positioned in a recording/reproducing apparatus, with a tray in retracted position.

(2) In Example 1, the center hole 64*a* is formed in the magnetic member 64, as shown in FIG. 25. Instead, in the present example, a center hole 62*h* is formed in the clamp base 62, as shown in FIG. 29. The center hole 62*h* in the clamp base 62 is formed so that the tapered end portion 33*a* of the motor shaft 33, when further extended, can be accommodated. Furthermore, a center hole 65*h* is formed in the clamp supporting plate 65 to permit the end portion 33*a* of the motor shaft 33 to pass through.

(3) In Example 1, the centering part 62*d* is tapered, as shown in FIG. 25. In the present example, the centering part 62*d* is formed in an arc shape or spherical shape, as shown in FIG. 29.

(4) In Example 1, the clamp supporting plate 65 is fixed to the clamp base 62 with flush head screws 66, as shown in FIG. 25. In the present example, the clamp supporting plate 65 is glued to the clamp base 62, as shown in FIG. 29.

(5) In Example 1, the Z-direction dimension of the elastic member 63 and centering part 62*d* is made very small, as shown in FIG. 25. This dimension can be changed as required. In the present example, the Z-direction dimension of the elastic member 63 and centering part 62*d* is made relatively large, as shown in FIG. 29.

EXAMPLE 3

Figure 30:
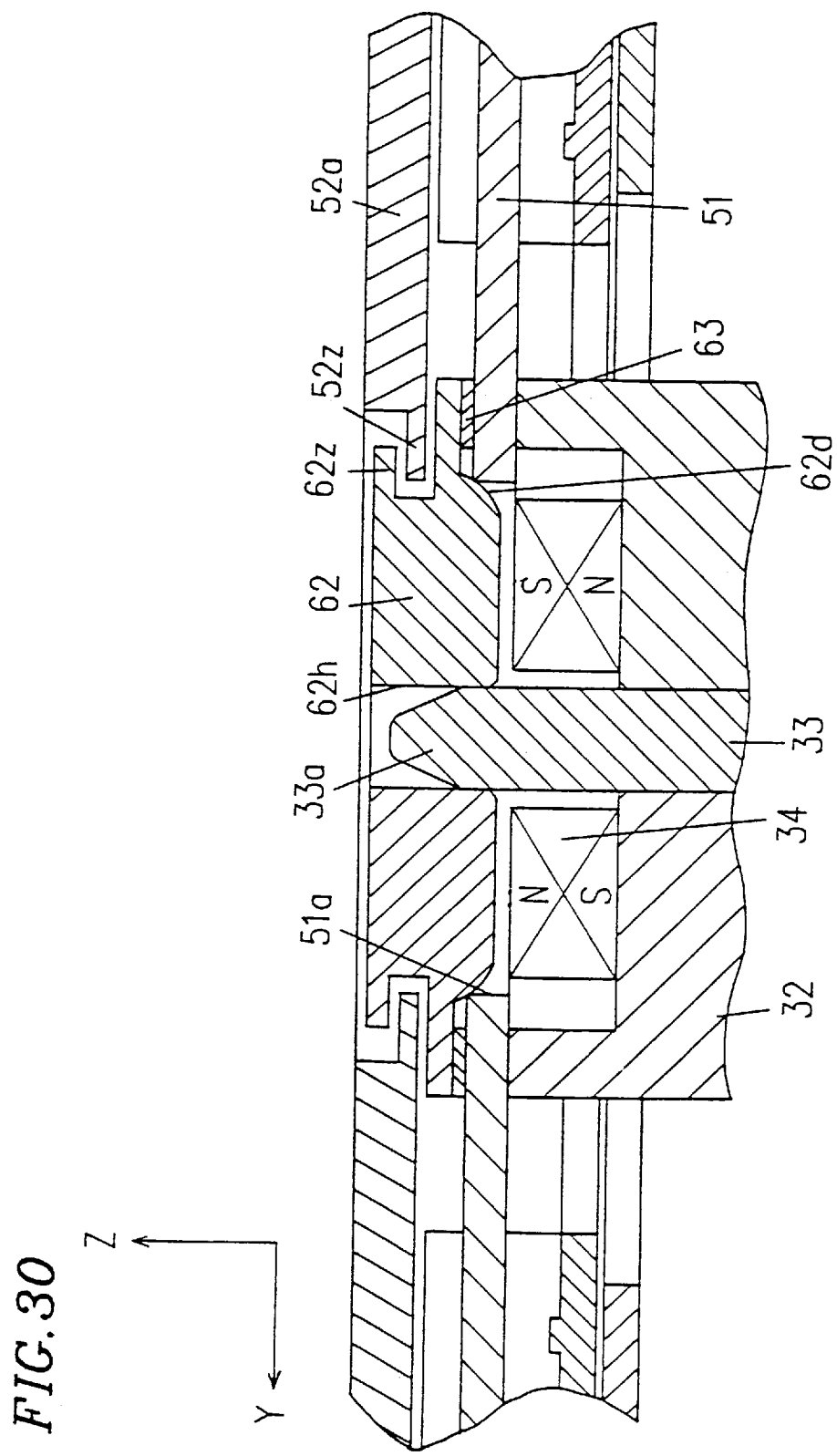
FIG. 30 is an enlarged cross-sectional view taken along line corresponding to line F–F' in FIG. 11, showing a second-disk cartridge mounted and positioned in a recording/reproducing apparatus, with a tray in retracted position, according to Example 3 of the invention.

FIG. 30 shows a second-disk cartridge according to Example 3 of the invention: shown is an enlarged cross-sectional view taken along line corresponding to line F–F' in FIG. 11, showing a portion of the second-disk cartridge mounted and positioned in a recording/reproducing apparatus, with a tray in retracted position.

The first-disk cartridge of this example is identical in construction to that of Example 2.

(1) In Example 1, the clamp supporting plate 65 is fixed to the clamp base 62 with flush head screws 66, as shown in FIG. 25, but other fixing method may be used. In the present example, a supporting part 62*z* is formed on the clamp base 62. The connection between the clamp base 62 and the upper half 52*a* is accomplished by elastically deforming an elastic deforming part 52*z* of the upper half 52*a* and thereby allowing the supporting part 62*z* to fit into position.

(2) In Example 1, the magnetic member 64 made of magnetic stainless steel is provided separately from the clamp base 62, as shown in FIG. 25. An magnetic member of another form may be used. In the present example, the clamp base 62 itself is formed from magnetic stainless steel, as shown in FIG. 30, so that it can also serve as the magnetic member. Alternatively, the clamp base 62 may be formed from soft iron and treated with rust preventive plating. In this construction, the volume of the clamp base 62 as the magnetic member can be made large, which enhances the magnetic properties and increases the clamping force for clamping the second disk 51.

(3) In the present example, as in Example 2, a center hole 62$h$ is formed in the clamp base 62 so that the tapered end portion 33$a$ of the motor shaft 33, when further extended, can be accommodated.

(4) In the present example, as in Example 2, the centering part 62$d$ is formed in an arc shape or spherical shape.

(5) In the present example, as in Example 2, the Z-direction dimension of the elastic member 63 and centering part 62$d$ is made relatively large.

EXAMPLE 4

Figure 31:
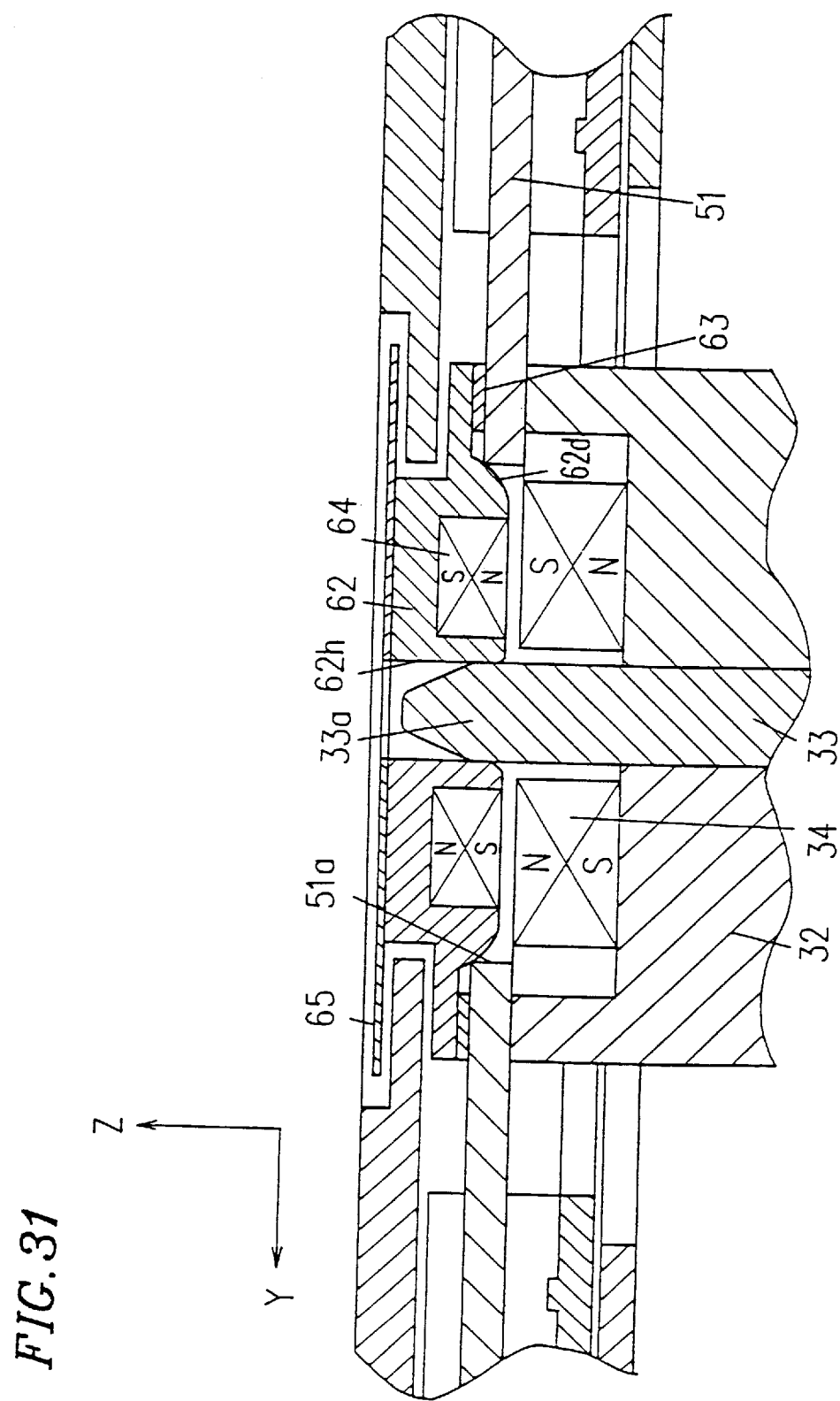
FIG. 31 is an enlarged cross-sectional view taken along line corresponding to line F–F' in FIG. 11, showing a second-disk cartridge mounted and positioned in a recording/reproducing apparatus, with a tray in retracted position, according to Example 4 of the invention.

FIG. 31 shows a second-disk cartridge according to Example 4 of the invention: shown is an enlarged cross-sectional view taken along line corresponding to line F–F' in FIG. 11, showing a portion of the second-disk cartridge mounted and positioned in a recording/reproducing apparatus, with a tray in retracted position. FIG. 32 shows a perspective view of a magnet and a magnetic member.

The first-disk cartridge of this example is identical in construction to that of Example 2.

(1) In Example 1, the clamp base 62 is formed from magnetic stainless steel. In the present example, on the other hand, the magnetic member 64 is formed from a permanent magnet magnetized with four poles, i.e. magnetized in +Z and −Z directions alternately in increments of 90 degrees, as shown in FIG. 32, as with the magnet 34 provided in the recording/reproducing apparatus.

Figure 33A:
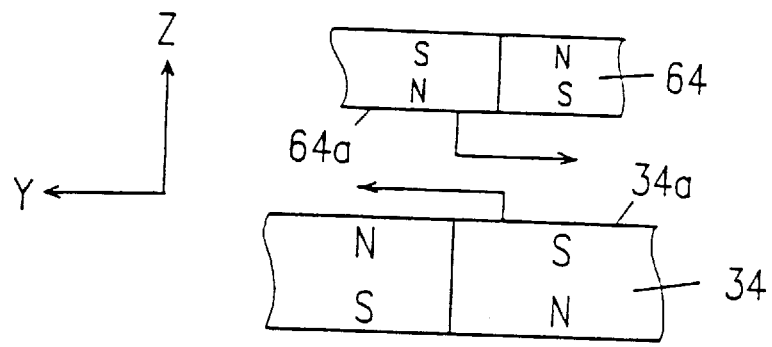
FIG. 33A is a schematic diagram showing the action of the magnet and magnetic member before clamping, according to Example 4.
Figure 33B:
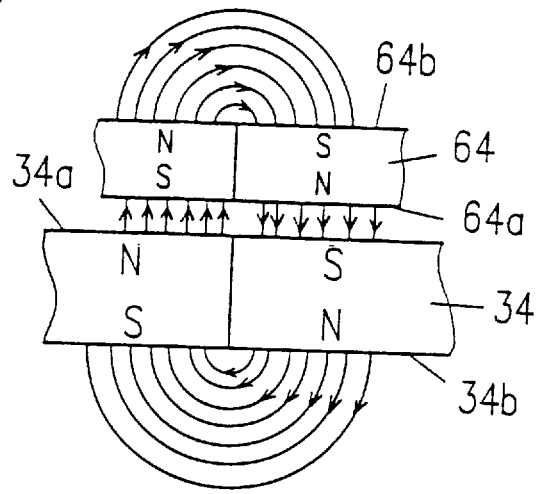
FIG. 33B is a schematic diagram showing the magnetic flux from the magnet and magnetic member during clamping, according to Example 4.
Figure 33C:
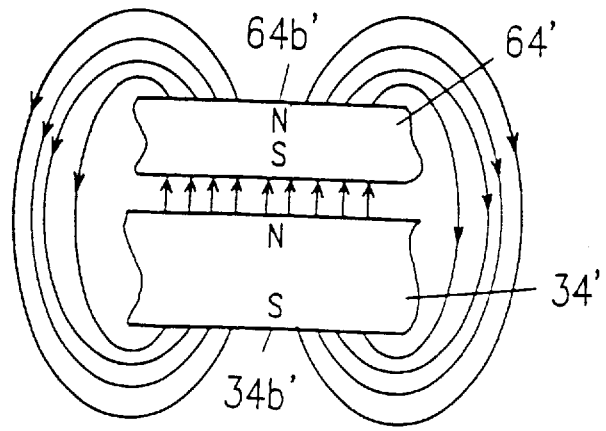
FIG. 33C is a schematic diagram showing the magnetic flux from the magnet and magnetic member during clamping, according to Example 4, when the magnet and magnetic member are both magnetized in only one direction.

FIGS. 33A to 33C are schematic diagrams for explaining the action of the magnet 34 and magnetic member 64. FIG. 33A shows the action of the magnet 34 and magnetic member 64 before clamping, and FIG. 33B shows the magnetic flux from the magnet 34 and magnetic member 64 during clamping, while FIG. 33C shows the magnetic flux from a magnet 34' and magnetic member 64', each magnetized in only one direction, during clamping.

In the above construction, when the magnetic member 64 is moved, together with the second disk 51, in the −Z direction by the action of the loading mechanism, if the N poles in the surface 34$a$ of the magnet 34 that faces the magnetic member 64 are opposite the S poles in the surface 64$a$ of the magnetic member 64 that faces the magnet 34 (therefore, the S poles in the surface 34$a$ are opposite the N poles in the surface 64$a$), then the magnetic member 64 is attracted by the magnet 34, as shown in FIG. 33B, to clamp the second disk 51 between them.

Conversely, if, as shown in FIG. 33A, the N poles in the surface 34$a$ of the magnet 34 are opposite the N poles in the surface 64$a$ of the magnetic member 64 (therefore, the S poles in the surface 34$a$ are opposite the S poles in the surface 64$a$), the magnet 34 and magnetic member 64 repel each other. As a result, the turntable 32 (magnet 34) and the clamp base 62 (magnetic member 64) turn relative to each other, as shown by the arrows in FIG. 33A, until the position shown in FIG. 33B is reached where the magnetic member 64 is attracted by the magnet 34 to clamp the second disk 51 between them.

In any middle position between the above two positions, since like poles repel each other, the turntable 32 (magnet 34) and the clamp base 62 (magnetic member 64) turn relative to each other, and enter the position shown in FIG. 33B to clamp the disk in position.

If the magnetic member 64 is moved in the −Z direction with the N poles in the surface 34$a$ of the magnet 34 positioned exactly opposite the N poles in the surface 64$a$ of the magnetic member 64 (therefore, the S poles in the surface 34$a$ are positioned exactly opposite the S poles in the surface 64$a$), since there always occur slight inclination, magnetic property variations, positional displacement, etc. during the movement, the turntable 32 and the clamp base 62 turn relative to each other without fail. Therefore, there is no possibility of accomplishing clamping with like poles positioned opposite each other, but the disk is always clamped when the position shown in FIG. 33B is attained.

In this case, as can be seen from the magnetic flux lines during clamping shown in FIG. 33B, the flux lines emerging from the N poles in the surface 34$b$ of the magnet 34 and in the surface 64$b$ of the magnetic member 64, substantially return to the S poles, adjacent to the respective N poles, in the same surfaces, without passing through areas of high magnetic resistance.

However, in the case of the magnet 34' and magnetic member 64' magnetized in only one direction (+Z direction), as shown in FIG. 33C, the flux lines emerging from the surface 64'$b$ of the magnetic member 64' substantially pass through areas of large magnetic resistance from the +Z to the −Z side before entering the surface 34'$b$ of the magnet 34. Thus, according to Example 4, the magnetic resistance of the magnetic member 64 and magnet 34 can be further reduced, and the clamping force can thus be further increased.

(2) In the present example, as in Example 2, a center hole 62$h$ is formed in the clamp base 62 so that the tapered end portion 33$a$ of the motor shaft 33, when further extended, can be accommodated. Furthermore, a center hole 65$h$ is formed in the clamp supporting plate 65 to permit the end portion 33$a$ of the motor shaft 33 to pass through.

(3) In the present example, as in Example 2, the centering part 62$d$ is formed in an arc shape or spherical shape.

(4) In the present example, as in Example 2, the Z-direction dimension of the elastic member 63 and centering part 62$d$ is made relatively large.

EXAMPLE 5

Figure 34:
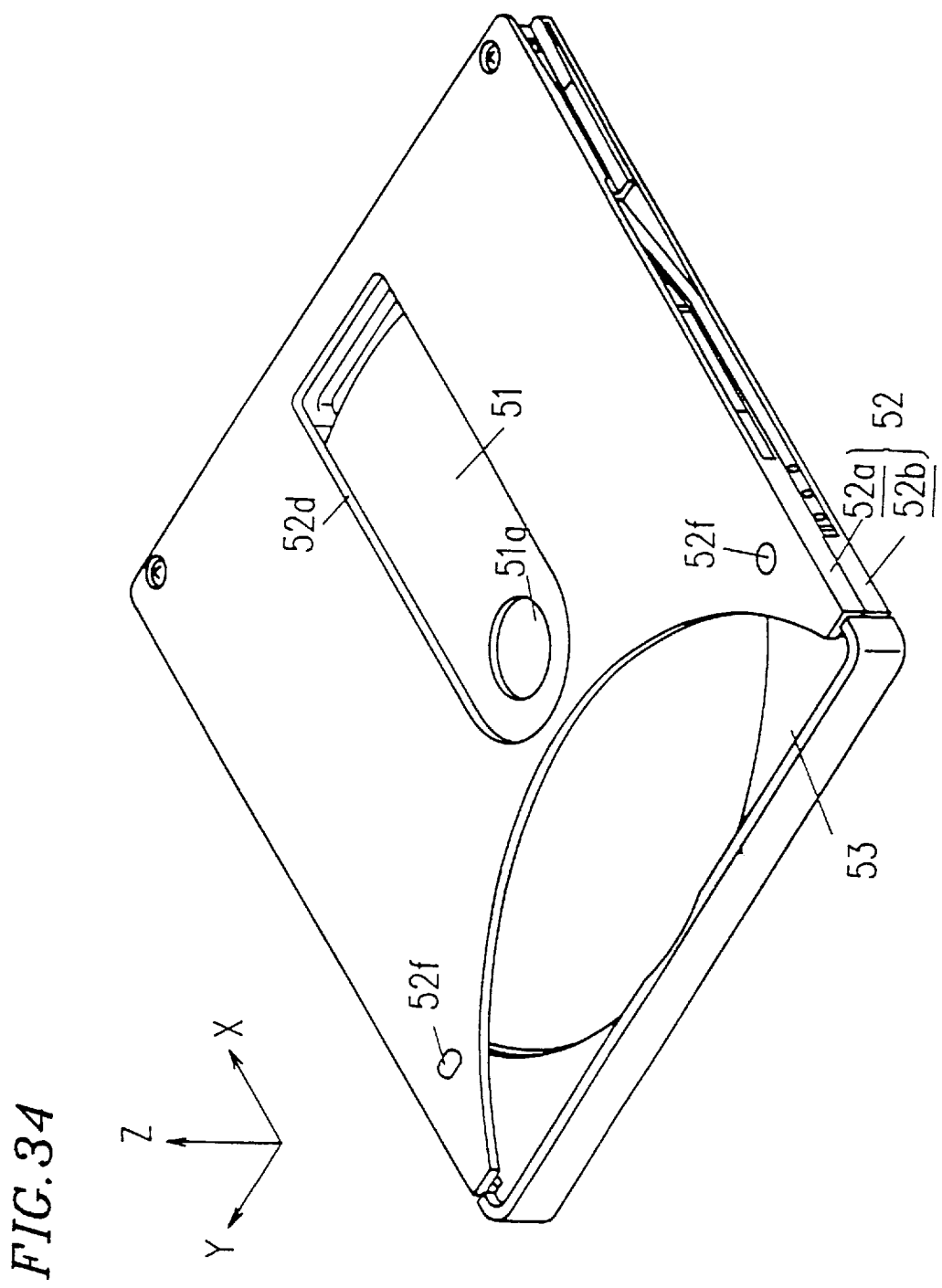
FIG. 34 is a perspective view of a second-disk cartridge, with a tray in retracted position, according to Example 5 of the invention.
Figure 35:
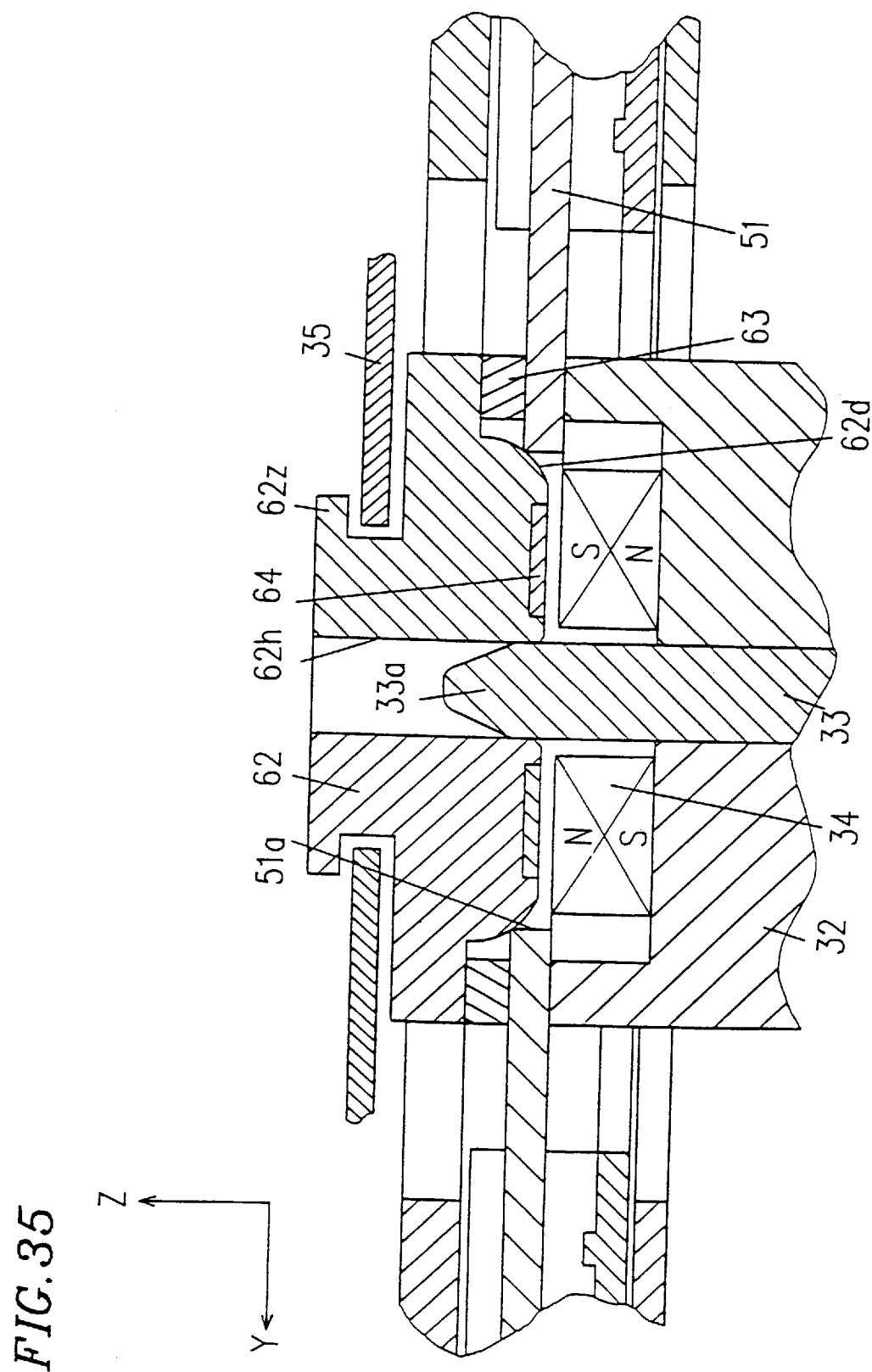
FIG. 35 is an enlarged cross-sectional view taken along line corresponding to line F–F' in FIG. 11, showing the second-disk cartridge of Example 5 mounted and positioned in a recording/reproducing apparatus, with the tray in retracted position.

FIG. 34 shows a perspective view of a second-disk cartridge according to Example 5 of the invention, with a tray 53 in the retracted position. FIG. 35 is an enlarged cross-sectional view taken along line corresponding to line F–F' in FIG. 11, showing the second-disk cartridge mounted and positioned in a recording/reproducing apparatus, with the tray 53 in the retracted position.

The first-disk cartridge of this example is identical in construction to that of Example 2.

(1) In Example 1, the second opening holes 52$d$, 53$d$ are not formed on the +Z side, as shown in FIG. 7, so that mounting and positioning is possible only when the cartridge is inserted with the lower half 52$b$ facing the turntable 32. In the present example, on the other hand, the second opening hole 52$d$ is formed also in the upper half 52$a$, as shown in FIG. 34, so that the cartridge can be mounted and positioned whether it is inserted with the lower half 52$b$ facing the turntable 32 or with the upper half 52$a$ facing the turntable 32.

In this case, while the second opening hole 52d, similar to that formed in the lower half 52b, is formed in the upper half 52a, the second opening hole 53d of similar shape is not formed in the tray 53. This can be considered as forming a second opening hole 53d in the tray 53 that exposes the entire +Z side of the second disk 51. Further, a pair of second positioning holes 52f is formed in the upper half 52a as second positioning means for the +Z side. These second positioning holes 52f on the +Z side consist of a round hole and an elongated hole, and correspond in position and shape to the first positioning hole 2f. The second positioning holes 52f serve to accurately position the second-disk cartridge when inserted with the upper half 52a facing the turntable 32. In this case, no particular positioning is performed for the tray 53 itself, but the positioning of the tray 53 is determined by positioning the upper half 52a. Therefore, the upper half 52a needs to be positioned accurately.

Furthermore, contrary to the construction of Example 1, the second opening holes 52d and second positioning holes 52f may be formed only in the upper half 52a so that mounting and positioning is possible only when the cartridge is inserted with the upper half 52a facing the turntable 32.

(2) In Example 1, the clamp supporting plate 65 is fixed to the clamp base 62 with flush head screws 66, as shown in FIG. 25, but other fixing method may be used. In the present example, a supporting part 62z is formed on the clamp base 62. In this case, a clamp support 35 is formed on the loading mechanism, and the supporting part 62z is fit into the clamp support 35.

(3) In the present example, the Z-direction dimension of the elastic member 63 and centering part 62d is made larger than that in Example 2.

(4) In the present example, as in Example 2, a center hole 62h is formed in the clamp base 62 so that the tapered end portion 33a of the motor shaft 33, when further extended, can be accommodated.

(5) In the present example, as in Example 2, the centering part 62d is formed in an arc shape or spherical shape.

EXAMPLE 6

Figure 36:
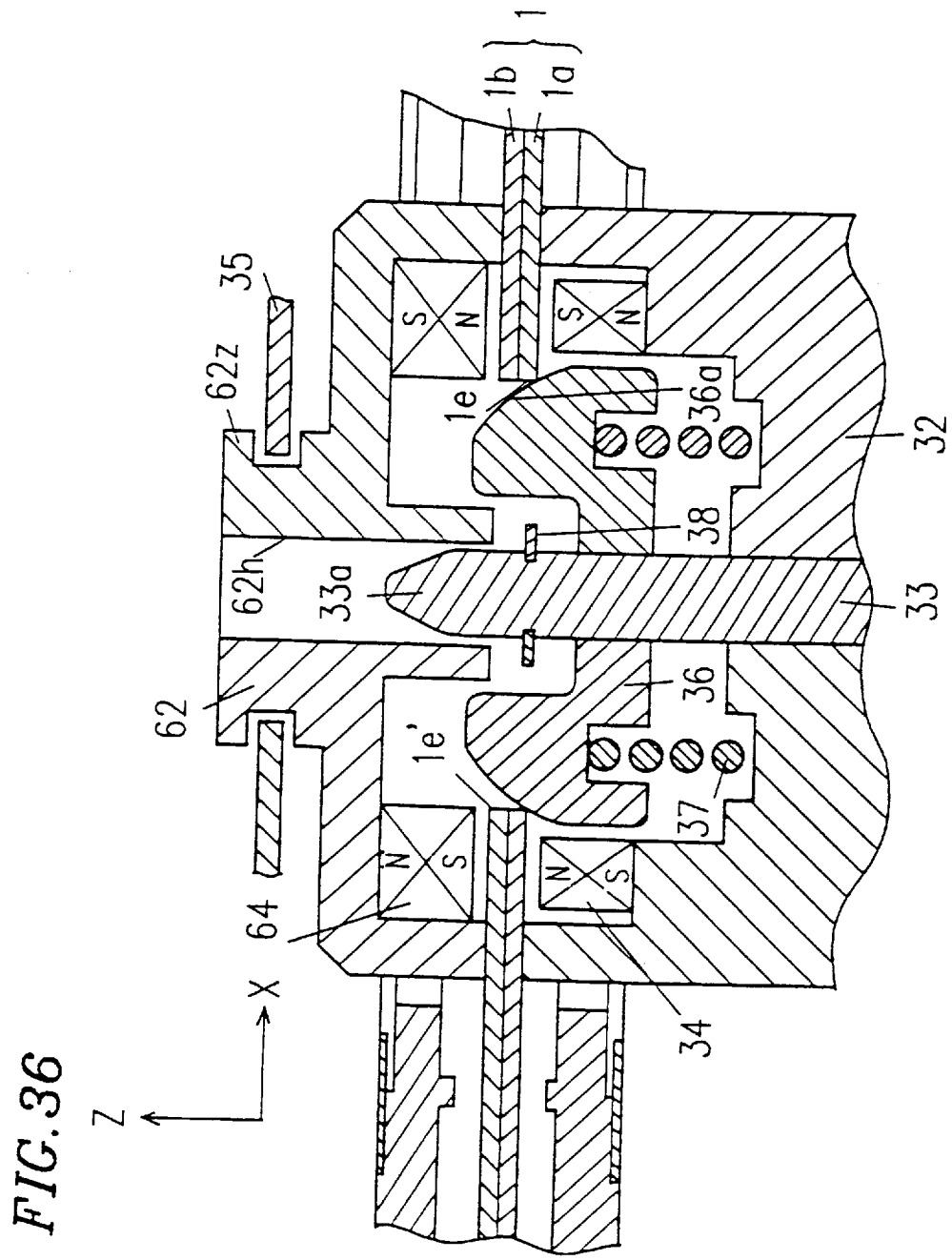
FIG. 36 is an enlarged cross-sectional view taken along line corresponding to line F–F' in FIG. 11, showing an essential portion (corresponding to portion B in FIG. 3) of a first-disk cartridge mounted and positioned in a recording/reproducing apparatus, according to Example 6 of the invention.

FIG. 36 is an enlarged cross-sectional view showing an essential portion (corresponding to portion B in FIG. 3) of a disk cartridge mounted and positioned in a recording/reproducing apparatus, according to Example 6 of the invention.

(1) In Example 1, the hubs 1d, 1d' of the first disk are attracted by the magnet 34, and the first center holes 1e, 1e' are caused to engage on the motor shaft 33, to accomplish the centering, as shown in FIG. 5. On the other hand, in the present example, the first disk 1 consists only of substrates 1a, 1b bonded together and having a thickness of, for example, about 0.6 mm, and does not have a hub, as shown in FIG. 36. The first center holes 1e, 1e' of the first disk 1 are centered by the centering part 36a of the center cone 36 which is urged in the +Z direction by the spring 37 and mounted slidably along the motor shaft 33. An E-ring 38 is fixed into a groove formed in the end portion of the motor shaft 33. The E-ring 38 limits the travel of the center cone 37 in the +Z direction.

The clamp base 62 is rotatably supported on the support 35 of the loading mechanism, and the magnetic member 64 formed from a permanent magnet fixed to the clamp base 62 is attracted by the magnet 34, to clamp the first disk 1 between them. The magnet 34 and the magnetic member 64 are each magnetized with eight poles, that is, in +Z and −Z directions alternately in increments of 45 degrees, as shown in FIG. 38. Their action is substantially the same as described in Example 4, and will not be repeated here. In the present example, as in Example 4, the magnetic resistance of the magnetic member 64 and magnet 34 can be further reduced, and the clamping force can thus be further increased.

In Examples 4 and 6, the magnet 34 and the magnetic member 64 are each magnetized with four or eight poles, but it will be appreciated that the same effect can be obtained as long as the magnet 34 and the magnetic member 64 are magnetized with an even number of poles, including two, so that the magnet 34 and the magnetic member 64 can be brought together with unlike poles facing each other. Therefore, the magnet 34 and the magnetic member 64 need only be divided into different regions of different magnetization directions so that unlike poles can be brought opposite each other, and the magnetization direction need not necessarily be changed at equal angular intervals.

Figure 37:
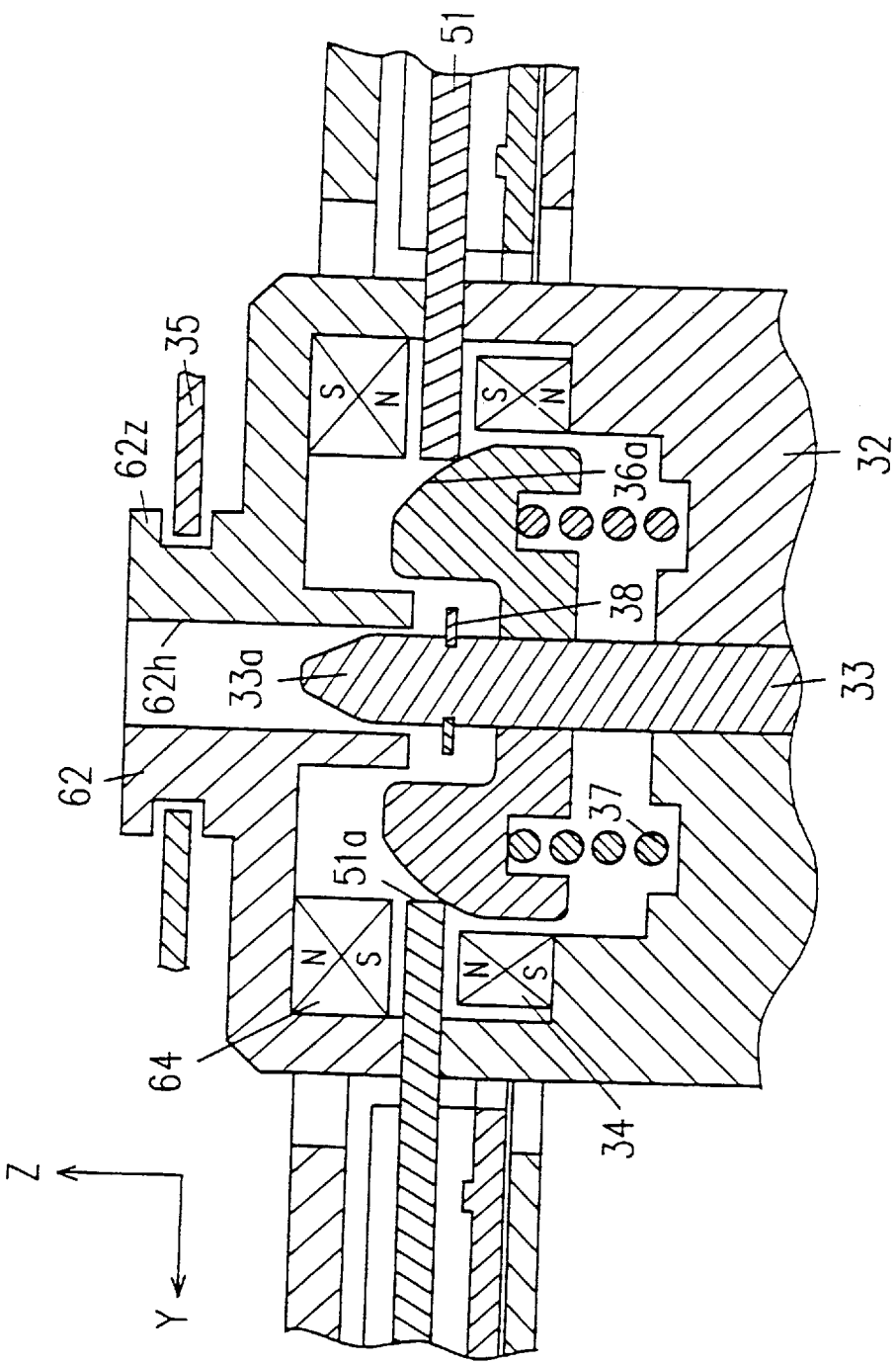
FIG. 37 is an enlarged cross-sectional view taken along line corresponding to line F–F' in FIG. 11, showing a second-disk cartridge mounted and positioned in a recording/reproducing apparatus, with a tray in retracted position, according to Example 6.

FIG. 37 is an enlarged cross-sectional view taken along line corresponding to line F–F' in FIG. 11, showing a second-disk cartridge mounted and positioned in a recording/reproducing apparatus, with a tray 53 in the retracted position. FIG. 38 shows a perspective view of the magnet and the magnetic member.

(2) In Example 1, centering is performed by fitting the centering part 62d into the second center hole 51a of the second disk 51, and engaging the center hole 64a onto the motor shaft 33, and the second disk 51 is clamped by having the magnetic member 64 attracted by the magnet 34, as shown in FIG. 25. On the other hand, in the present example, centering is performed by fitting the centering part 36a of the center cone 36 into the second center hole 51a of the second disk 51, the second center hole 51a having approximately the same diameter as that of the first center holes 1e, 1e' of the first disk 1, and the magnetic member 64 is attracted by the magnet 34 to clamp the second disk 51 between them, as shown in FIG. 37.

In the present example, a center hole 62h, slightly larger in diameter than the motor shaft 33, is formed in the clamp base 62, as shown in FIGS. 36 and 37, to enable the clamp base 62, etc. to be roughly centered with respect to the motor shaft 33. This serves to suppress the vibrations, etc. caused when the clamp base 62, etc. are rotated off center.

EXAMPLE 7

Figure 39:
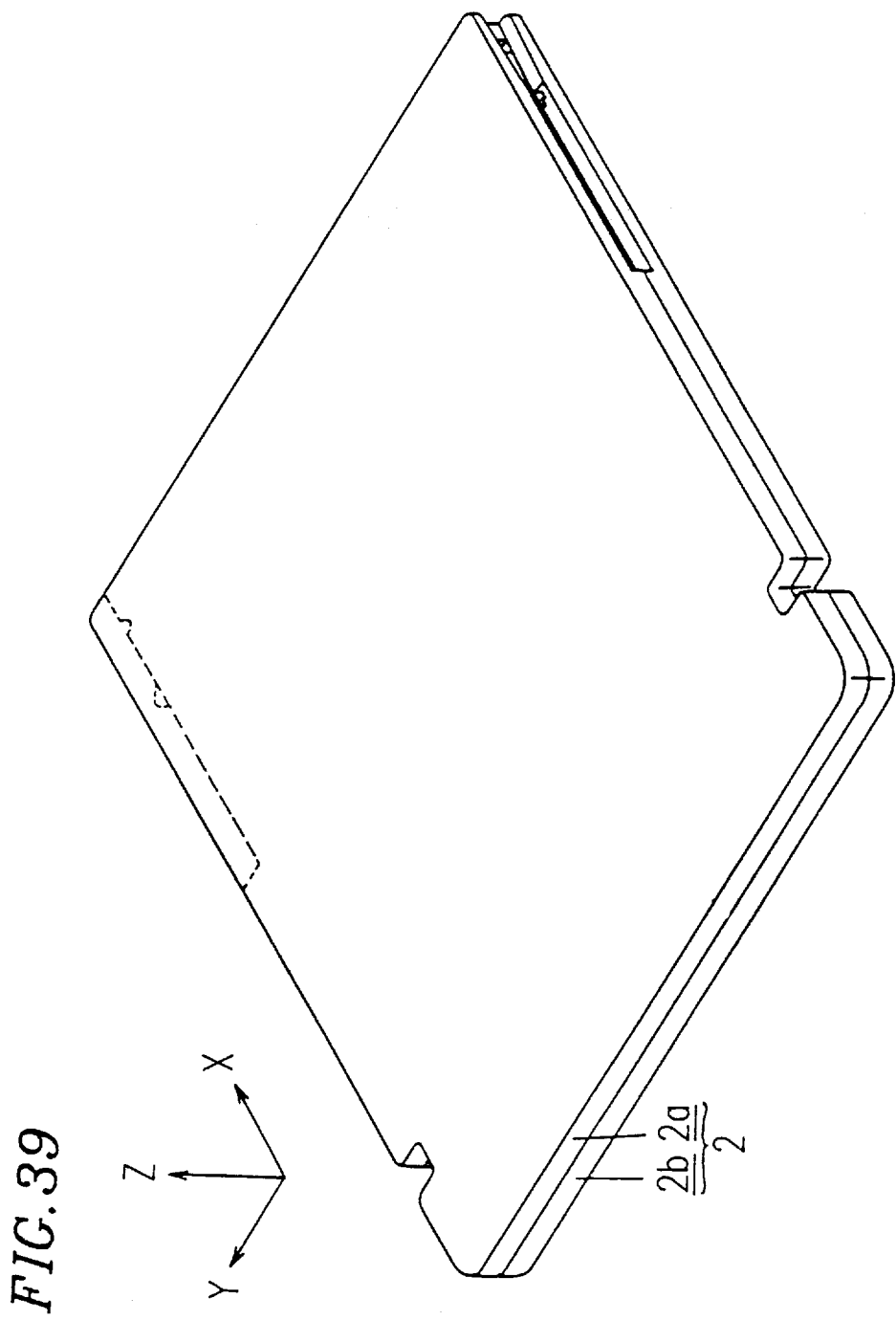
FIG. 39 is a perspective view of a first-disk cartridge according to Example 7 of the invention, showing the condition in which the first-disk cartridge is not mounted in a recording/reproducing apparatus.

FIG. 39 is a perspective view of a first-disk cartridge according to Example 7 of the invention, showing the condition in which the first-disk cartridge is not mounted in a recording/reproducing apparatus.

(1) In Example 1, the first opening hole 2d is also formed in the upper half 2a, as shown in FIG. 2, so that the first disk 1 can be mounted on the turntable 32 whether the first-disk cartridge is inserted with the lower half 2b facing the turntable 32 or, conversely, with the upper half 2a facing the turntable 32. By contrast, in the present example, as shown in FIG. 39, the first opening hole 2d is not formed in the upper half 2a so that the first disk 1 can be mounted on the turntable 32 only when the first-disk cartridge is inserted with the lower half 2b facing the turntable 32.

EXAMPLE 8

Figure 40:
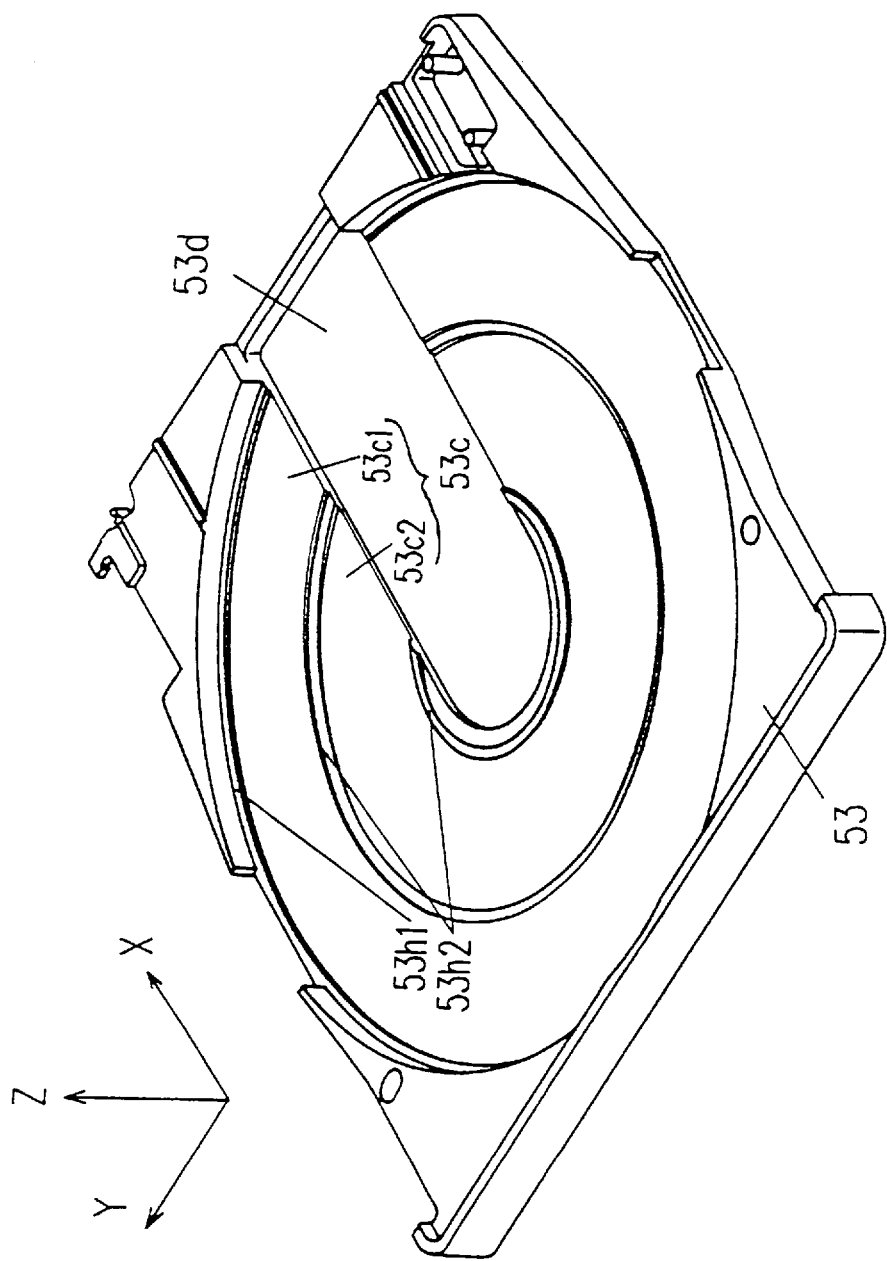
FIG. 40 is a perspective view showing a tray of a second-disk cartridge according to Example 8 of the invention.

FIG. 40 shows a perspective view of a tray of a second-disk cartridge according to Example 8 of the invention.

(1) In Example 1, the tray 53 has a second-disk holding recess 53c capable of holding the largediameter (about 120 mm) second disk 51, as shown in FIG. 9. This construction can be modified as required. In the present example, as shown in FIG. 40, the second-disk holding recess 53*c* of the tray 53 consists of a second-disk holding recess 53*c*1 capable of holding the large-diameter (about 120 mm) second disk 51, and a second-disk holding recess 53*c*2 capable of holding a smaller-diameter (for example, about 80 mm) second disk 51. Therefore, the protrusions 53*h* formed to support the non-data areas of the two different kinds of second disks 51 consists of a protrusion 53*h*1 for supporting the outer non-data area of the larger-diameter second disk 51, and protrusions 53*h*2 for supporting the inner and outer non-data areas of the smaller-diameter second disk 51.

EXAMPLE 9

Figure 41:
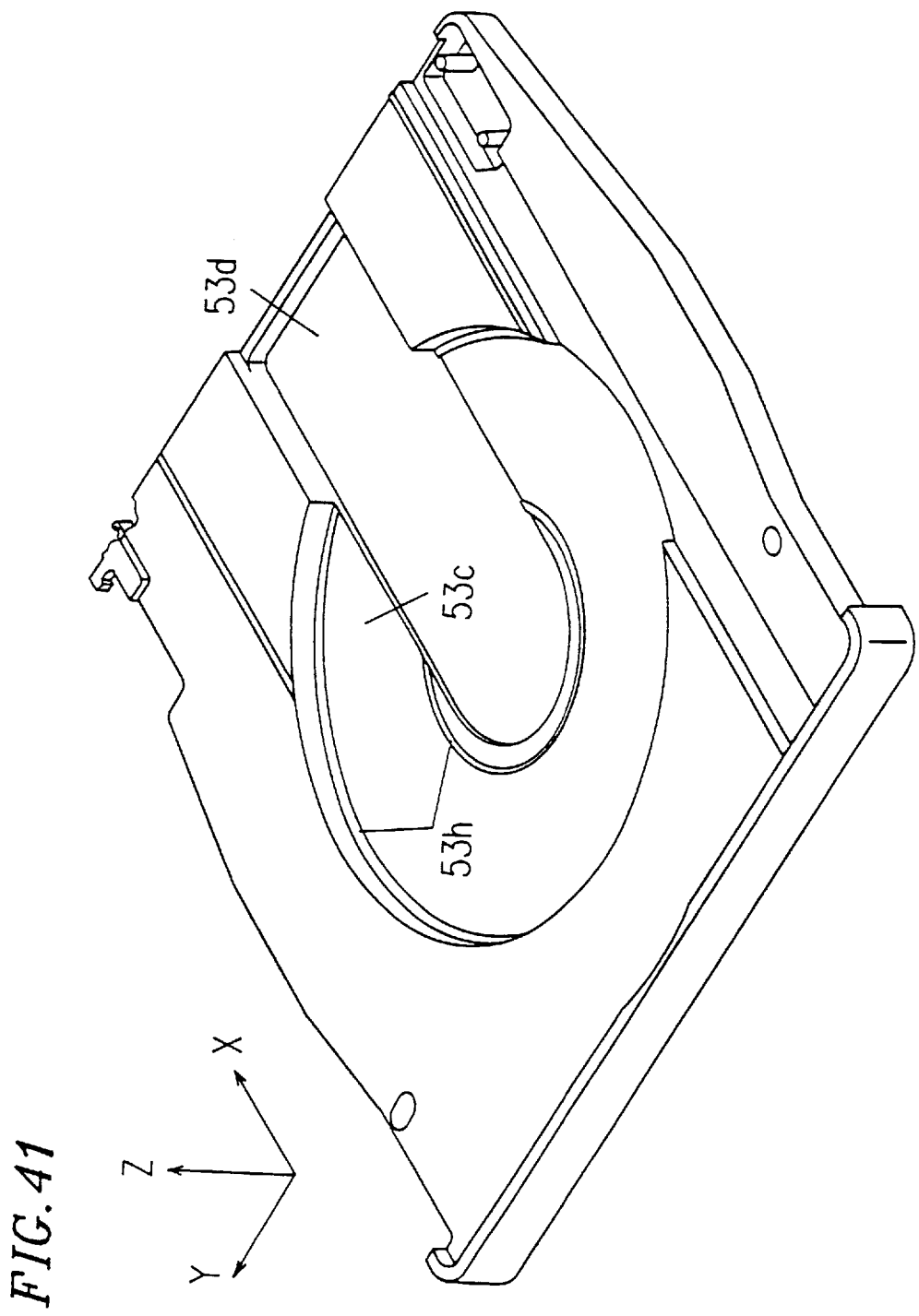
FIG. 41 is a perspective view showing a tray of a second-disk cartridge according to Example 9 of the invention.

FIG. 41 shows a perspective view of a tray of a second-disk cartridge according to Example 9 of the invention.

(1) As shown in FIG. 41, the second-disk holding recess 53*c* in this example can hold only a small-diameter (for example, about 80 mm) second disk 51. Inside the second-disk holding recess 53*c* are formed protrusions 53*h* for supporting the inner and outer non-data areas of the small-diameter second disk 51.

EXAMPLE 10

Figure 42:
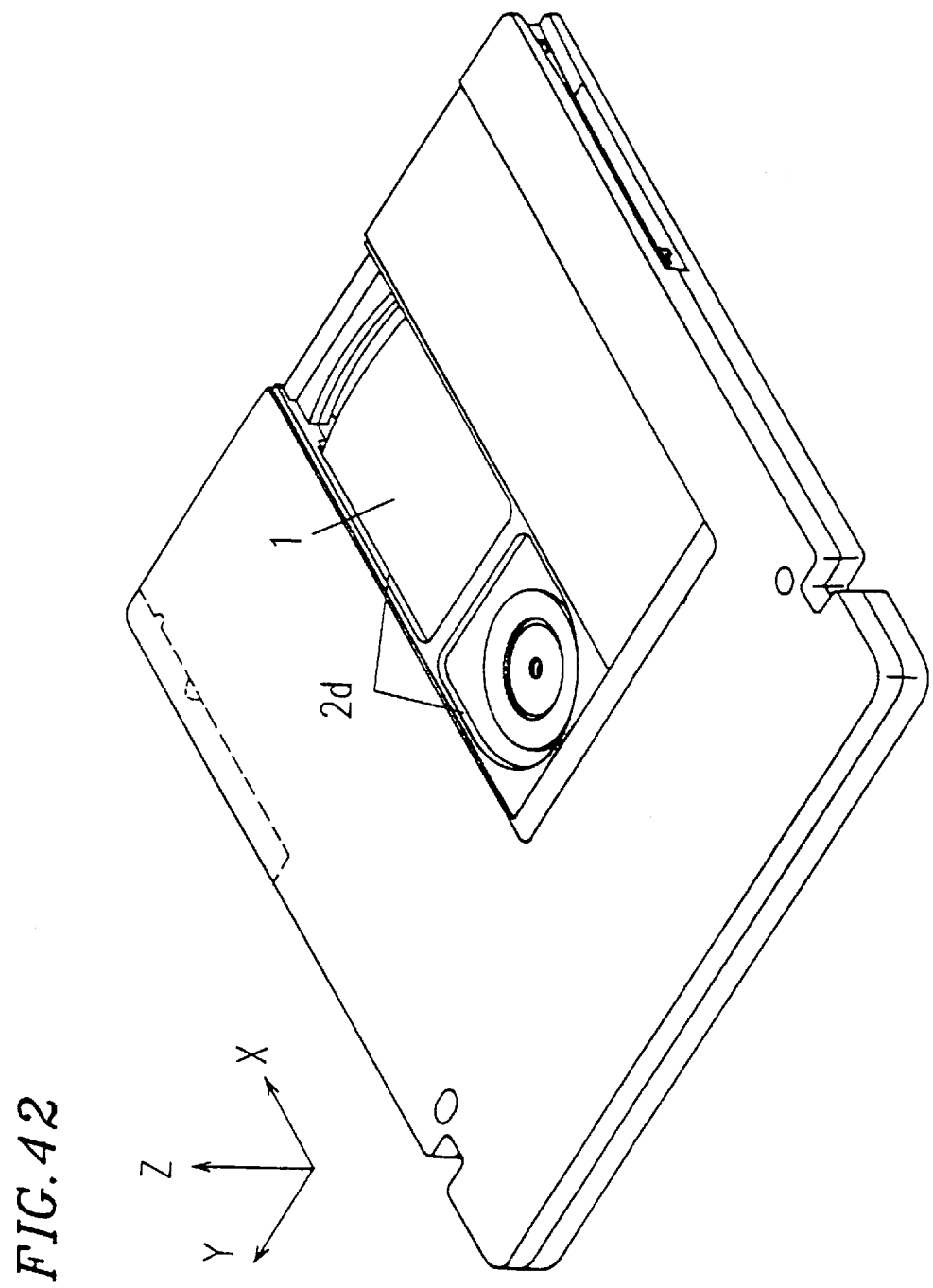
FIG. 42 is a perspective view of a first-disk cartridge mounted and positioned in a recording/reproducing apparatus, according to Example 10.

FIG. 42 shows a perspective view of a first-disk cartridge mounted and positioned in a recording/reproducing apparatus, according to Example 10 of the invention.

(1) In Example 1, as shown in FIG. 2, only one opening hole 2*d* is formed to permit the insertion of both the turntable 32 and head. This construction can be modified as required. In the present example, a hole for insertion of the turntable 32 and a hole for insertion of the head are formed separately as shown in FIG. 42, and designated together as the first opening hole 2*d*. This construction serves to increase the rigidity of the first-disk cartridge.

Figure 43:
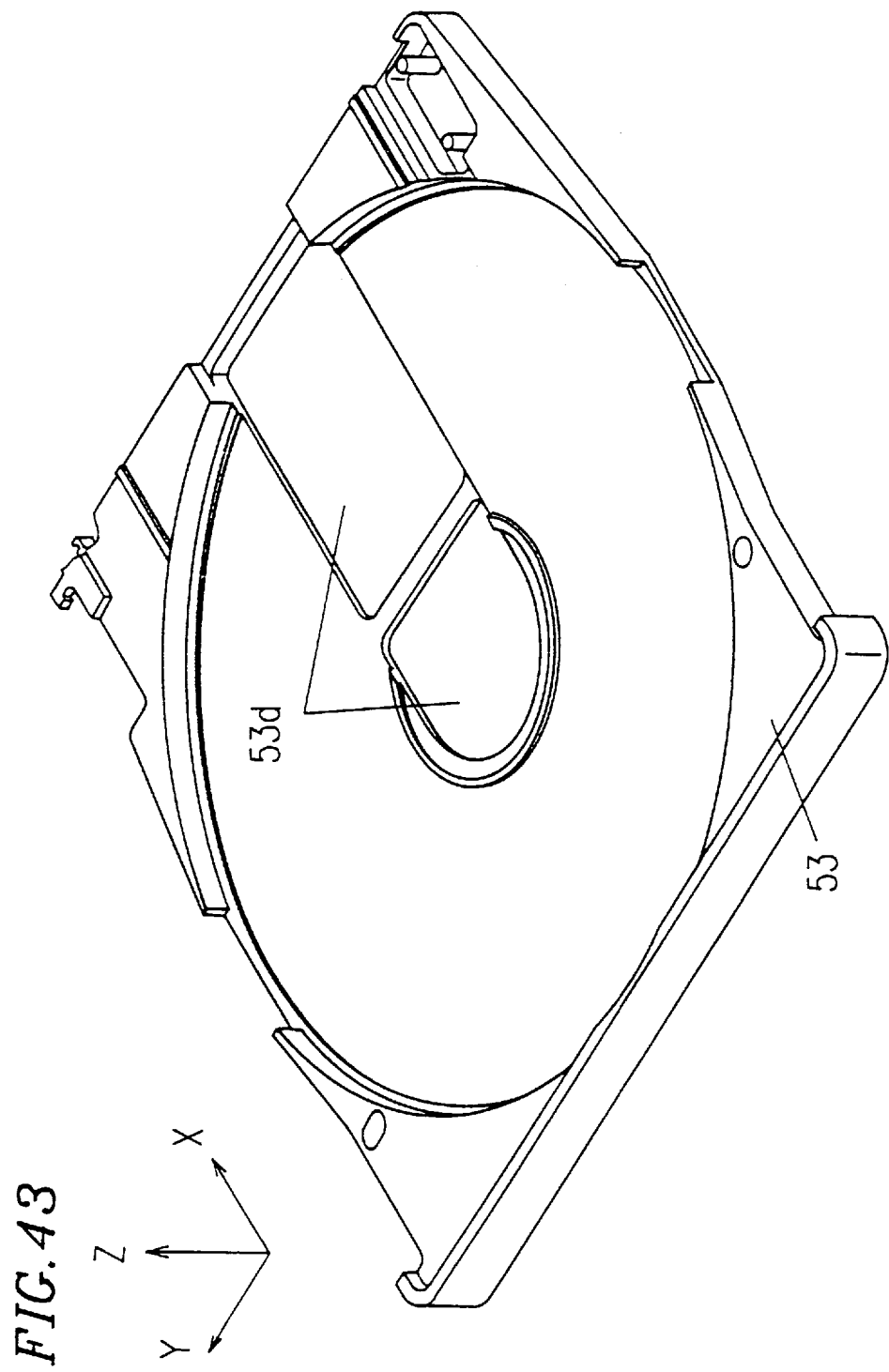
FIG. 43 is a perspective view showing a tray of a second-disk cartridge according to Example 10 of the invention.
Figure 44:
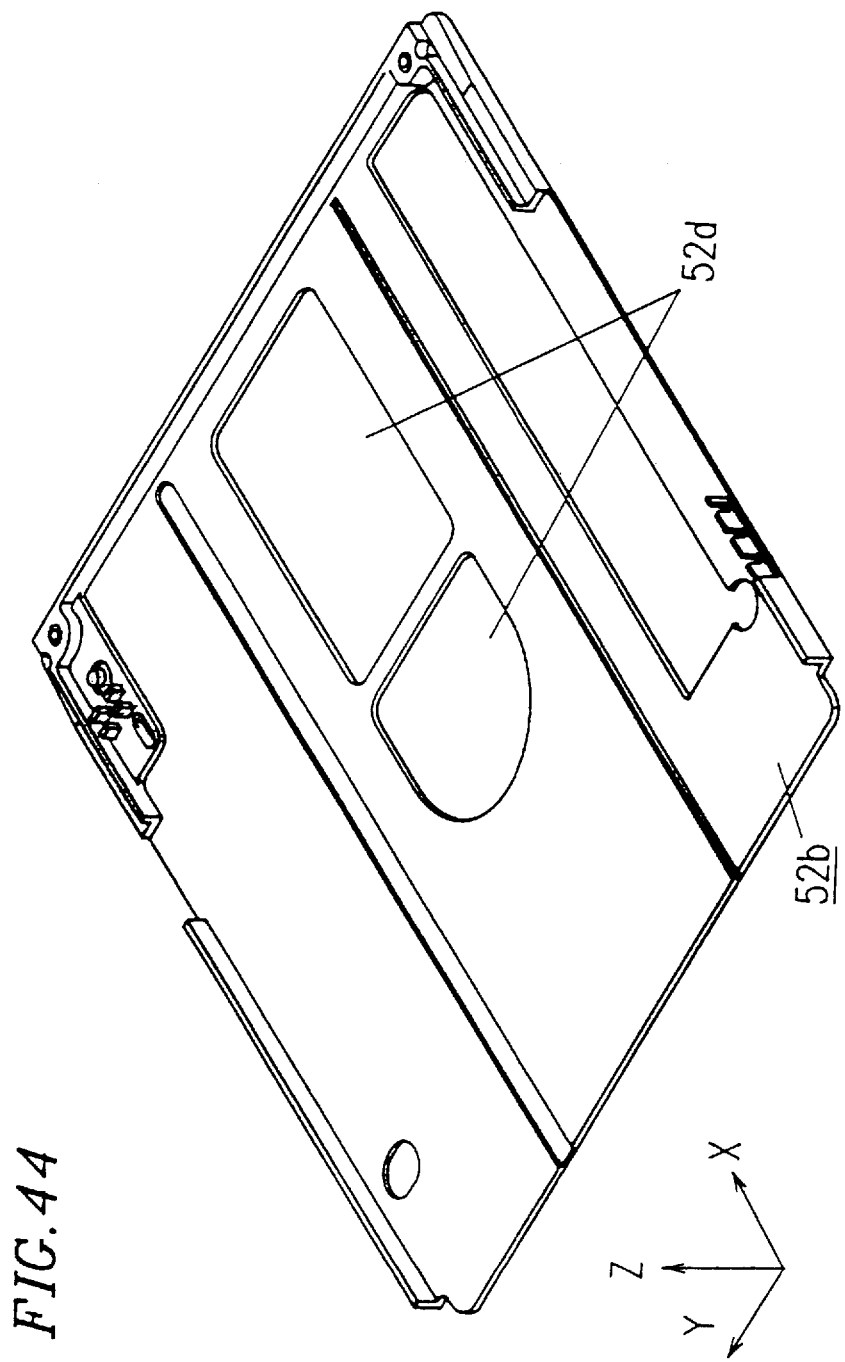
FIG. 44 is a perspective view showing a lower half (case) of the second-disk cartridge of Example 10.

FIG. 43 shows a perspective view of a tray 53 of a second-disk cartridge according to the present example, and FIG. 44 shows a perspective view of a lower half 52*b* (case) of the second-disk cartridge.

(2) In corresponding relationship to the above (1), two second openings 53*d* and two second openings 52*d* are formed in the tray 53 and the lower half 52*b*, respectively, as shown in FIGS. 43 and 44. Alternatively, the tray 53 and the lower half 52*b* may be formed with single second openings 53*d* and 52*d*, respectively, as in Example 1, as shown in FIGS. 9 and 10.

EXAMPLE 11

Figure 45:
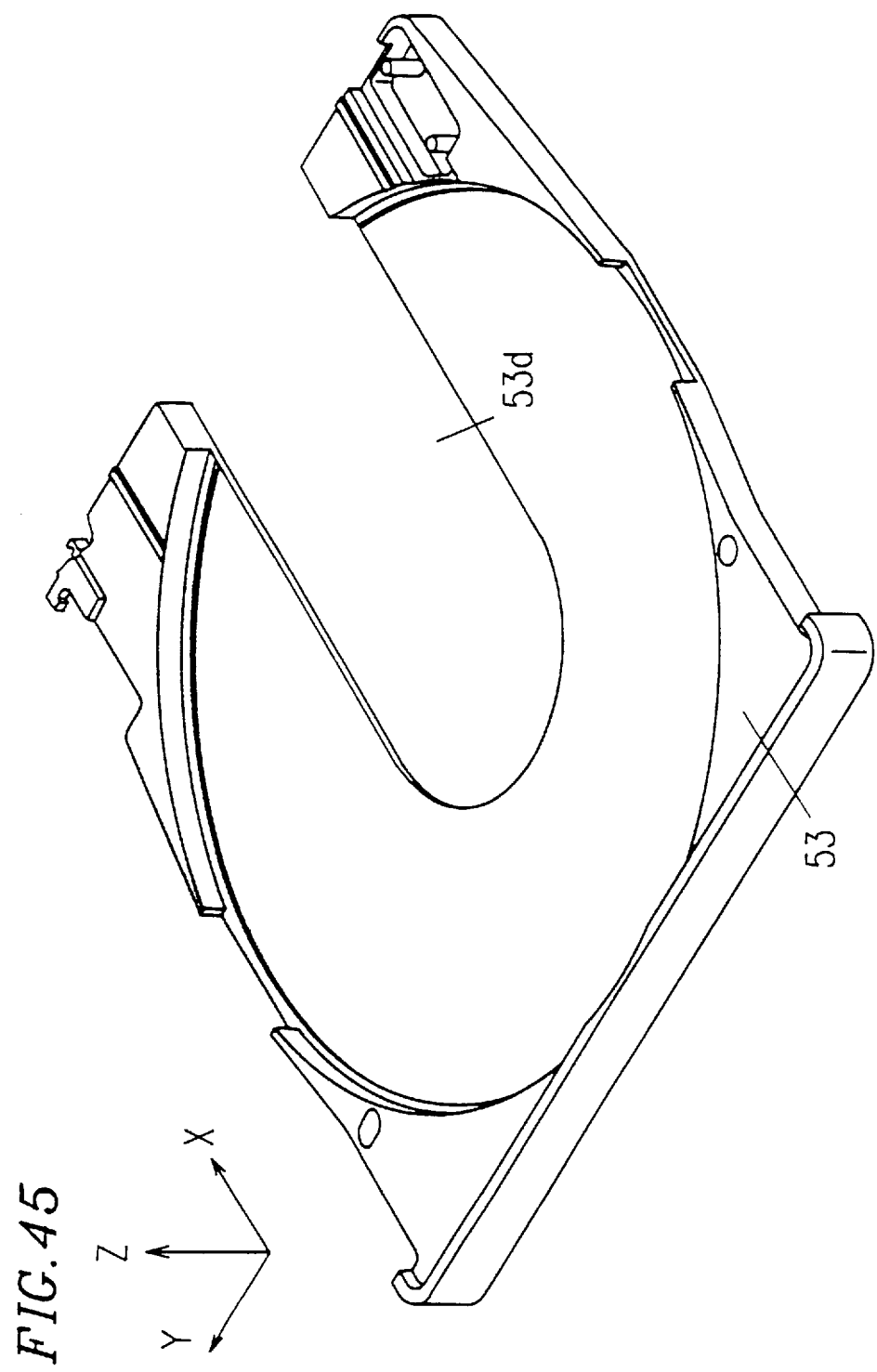
FIG. 45 is a perspective view showing a tray of a second-disk cartridge according to Example 11 of the invention.
Figure 46:
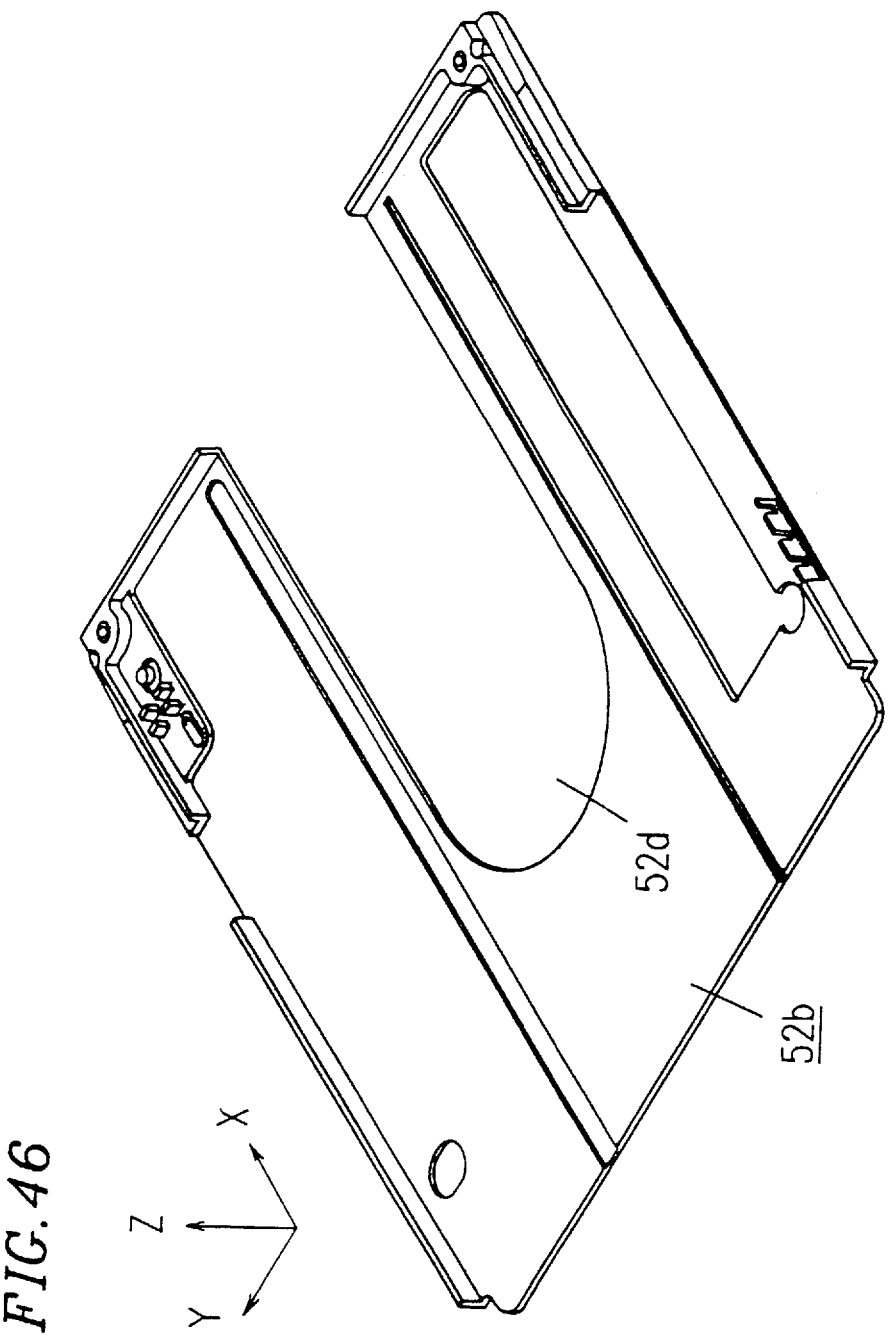
FIG. 46 is a perspective view showing a lower half (case) of the second-disk cartridge of Example 11.

FIG. 45 shows a perspective view of a tray 53 of a second-disk cartridge according to Example 11 of the invention, and FIG. 46 shows a perspective view of a lower half (case) of the second-disk cartridge.

(1) In Example 1, the second opening hole 53*d* in the tray 53 and the second opening hole 52*d* in the lower half 52*d* are formed as closed holes. This can be modified as required. Basically, the second opening holes should only be formed larger than the first opening hole 2*d* so as to include the entire area corresponding to the first opening hole 2*d*. In the present example, the second opening holes 53*d* and 52*d* are made larger than the first opening hole 2*d* and opened in the +X direction.

EXAMPLE 12

Figure 47:
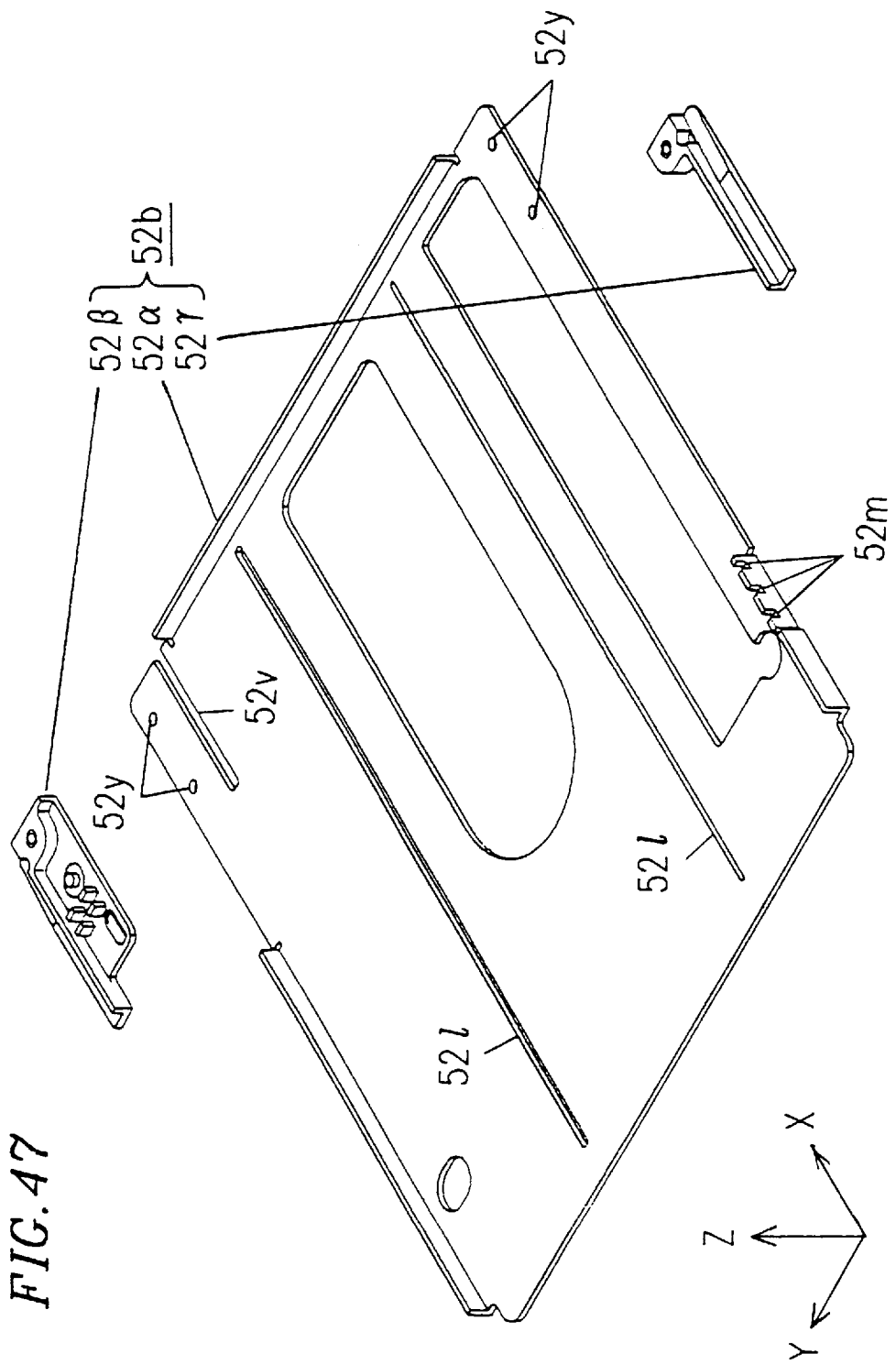
FIG. 47 is a perspective view showing a lower half (case) of a second-disk cartridge according to Example 12 of the invention.

FIG. 47 shows a perspective view of a lower half 52*b* of a second-disk cartridge according to Example 12 of the invention.

(1) In Example 1, the lower half 52*b* shown in FIG. 10 is formed as a one-piece construction by molding ABS resin or the like. By contrast, in the present example, the lower half 52*b* is constructed, for example, of a lower half base 52α and lower half protruding parts 52β and 52γ. In this case, the lower half base 52α is formed from a metal plate such as a stainless steel plate, while the lower half protruding parts 52β and 52γ having projections and depressions and complex in shape are each formed in one piece from ABS resin or the like. After that, the lower half protruding parts 52β and 52γ. are bonded to the lower half base 52α by adhesion or other means. To position the lower half protruding parts 52β and 52γ on the lower half base 52α for bonding, cylindrically shaped projections (not shown) formed on the −Z sides of the lower half protruding parts 52β and 52γ are fitted into positioning holes 52*y* formed in the lower half base 52α.

In the present example, other parts than the lower half protruding parts 52β and 52γ are formed directly in the lower half base 52χ. The positioning recesses 52*m* and the slit-like recess 52*v*, for example, are formed in the lower half base 52χ itself, and only the lower half protruding parts 52β and 52γ, which are difficult to form from metal sheets, are formed as separate parts, thus constituting the lower half 52*b* with a minimum number of parts (three parts).

Figure 14:
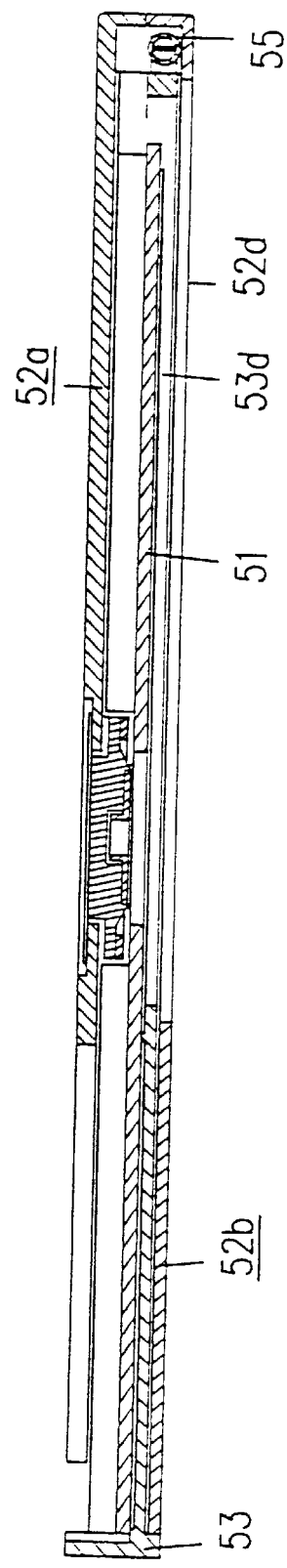
FIG. 14 is a cross-sectional view of the second-disk cartridge of Example 1 taken along line C–C' in FIG. 11.

If mounting compatibility with the first-disk cartridge is to be preserved, the lower half 52*b* needs to be constructed to hold a tray 53 thereon, which inevitably requires the thickness of the lower half 52*b* be reduced, as is apparent from FIG. 14 in Example 1. According to the present example, since the lower half base 52α can be formed from metal, sufficient rigidity can be secured even if the thickness is reduced. On the other hand, in Example 1, since the whole construction can be formed in one piece from ABS resin or the like, including the parts corresponding to the lower half protruding parts 52β and 52γ in Example 12 having projections and depressions and complex in shape, the cost and the number of parts can be reduced.

The same effect can be obtained if the upper half 52*a* also is constructed partially from metal sheets.

(2) In Example 1, the step-like recesses 52*l*, shown in FIG. 10, are provided for smoothly guiding the tray 53 in X directions. By contrast, in the present example, slit-like openings 52*l* are formed as the guide members, as shown in FIG. 47, which engage on the protrusions (not shown) formed on the −Z side of the tray 53 and extending in X direction, allowing the tray 53 to slide smoothly in X directions relative to the lower half 52*b*, i.e, the case 52. The protrusions (not shown) on the tray 53 and the openings 52*l* formed in the lower half 52*b* are made shorter than the corresponding parts in Example 1 so that the lower half 52*b* will not be separated by the openings 52*l* at the −X side.

Besides the modifications of Example 1, as disclosed above in Examples 2–12, the following modifications also fall within the scope of the present invention.

(1) In Example 1, the recess 2*j* in the first-disk cartridge and the recess 52*j* in the second-disk cartridge are formed substantially identical in form, but this can be modified as required. For example, the recess 52*j* may be made larger than the recess 2*j* so as to include the entire area corresponding to the recess 2*j*.

(2) In Example 1, the spring 55 as driving means is constructed from a tension spring, but this can be replaced by other driving means. For example, the driving means may be provided on the loading mechanism in the recording/reproducing apparatus, or the driving means may be constructed from a spiral spring or a compression spring.

(3) In Example 1, the second-disk cartridge is specifically constructed to be compatible with recording/reproducing apparatus designed for use with the first-disk cartridge. Instead, the second-disk cartridge may be constructed specifically for other type of recording/reproducing apparatuses designed for use only with the second-disk cartridge.

(4) In Examples 1–12, the first disk 1 and the second disk 51 have been described as optical disks, but it will be appreciated that any type of disk can be used. For example, phase-change optical disks, magneto-optic disks, or removable magnetic disks may be used.

The present invention is not limited to the contents disclosed in Examples 1–12 or to the above enumerated modifications, but it will be recognized that many modifications may be made in the invention without departing from the spirit thereof.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk clamping device for enabling a second disk with a second center hole to be mounted on a turntable of a recording or reproducing apparatus capable of mounting thereon a first disk with a hub formed from a magnetic material and having a first center hole smaller than said second center hole, said disk clamping device being contained in a disk cartridge for holding therein said second disk and comprising:

a clamp base supported rotatably at a position opposite said turntable;

an elastic member, fixed to a second disk mounting face of said clamp base, for holding said second disk against said turntable, wherein said clamp base is not biased by a spring; and a magnetic member, formed from a magnetic material, fixed to said clamp base and attracted by a magnet provided in said turntable to attract said hub, wherein at least one of said clamp base and said magnetic member is provided with a centering part that engages said second disk via said second center hole of said second disk, and at least one of said clamp base and said magnetic member is provided with a center hole that is formed concentrically with said centering part and that engages concentrically a motor shaft that drives said turntable for rotation.

2. A disk clamping device for enabling a second disk to be mounted on a turntable of a recording or reproducing apparatus having a magnet that consists of two or an even number of regions greater than two, adjacent regions being magnetized in opposite directions, said disk clamping device being contained in a disk cartridge for holding therein said second disk and comprising:

a clamp base, supported rotatably at a position opposite said turntable, for holding said second disk against said turntable;

an elastic member fixed to a second disk mounting face of said clamp base and capable of elastic deformation in a thickness direction of said second disk, wherein said clamp base is not biased by a spring; and a magnetic member having a permanent magnet that is fixed to said clamp base and opposite said magnet, and consists of the same number of regions as the even number of regions of said magnet, adjacent regions being magnetized in opposite directions, wherein at least one of said clamp base and said magnetic member is provided with a centering part that engages said second disk via a second center hole formed in said second disk, and at least one of said clamp base and said magnetic member is provided with a center hole that is formed concentrically with said centering part and that engages concentrically a motor shaft that drives said turntable for rotation, said elastic member works in combination with said centering part of said clamp base to lock said second center hole into place in said centering part.

3. A disk clamping device for enabling a second disk with a second center hole to be mounted on a turntable of a recording or reproducing apparatus capable of mounting thereon a first disk with a hub formed from a magnetic material and having a first center hole smaller than said second center hole, said disk clamping device being contained in a disk cartridge for holding therein said second disk and comprising:

a clamp base supported rotatably at a position opposite said turntable;

an elastic member, fixed to a second disk mounting face of said clamp base, for holding said second disk against said turntable, said elastic member being a disc-shaped sponge which is fixed to a mounting face of the clamp base, wherein said clamp base is not biased by a spring; and a magnetic member, formed of a magnetic material, fixed to said clamp base and attracted by a magnet provided in said turntable to attract said hub, wherein said clamp base includes a centering part that engages said second center hole of said second disk, and a motor shaft that drives said turntable for rotation engages a center hole of the magnetic member, said clamp base further including an even number of regions of alternating polarity magnetization, said regions matching in number alternately polarized regions of the magnet of the turntable, said magnetic member is formed of a magnetic stainless steel and the center hole of the magnetic member for fitting the magnetic member onto the motor shaft has a diameter of about 3 mm.

4. A disk clamping device as in claim 3, wherein the magnetic member is fixed to the clamp base so that the center hole of the magnetic member is aligned substantially concentrically with the centering part of the clamp base.

5. A disk clamping device as in claim 4 further comprising a clamp supporting plate to which the clamp base is fixed, the clamp supporting plate being formed for rotatably supporting the clamp base.

* * * * *

UNITED STATES PATENT AND TRADE MARK OFFICE
CERTIFICATE OF CORRECTION

PATENT NO. : 5,870,376
DATED : February 9, 1999
INVENTOR(S) : Miyazaki et al.

It is certified that error appears in the above-identified patent and that said Letters Patent is hereby corrected as shown below:

Cover page, item [56] References Cited, list the following:

U.S. PATENT DOCUMENTS 5,208,802   5/1993   Suzuki et al.

FOREIGN PATENT DOCUMENTS 4-362560   12/1992   Japan
4-356766   12/1992   Japan
3-25336    5/1991    Japan Signed and Sealed this Twenty-seventh Day of July, 1999

Attest:

Q. TODD DICKINSON

*Attesting Officer*          *Acting Commissioner of Patents and Trademarks*